United States Patent

Itoh et al.

[11] Patent Number: 6,147,802
[45] Date of Patent: Nov. 14, 2000

[54] POLARIZATION LUMINAIRE AND PROJECTION DISPLAY

[75] Inventors: Yoshitaka Itoh; Kunio Yoneno; Junichi Nakamura, all of Nagano-ken; Tadaaki Nakayama, Mishima-gun, all of Japan

[73] Assignee: Seiko Epson Corporation, Tokyo, Japan

[21] Appl. No.: 08/619,663

[22] PCT Filed: Jul. 21, 1995

[86] PCT No.: PCT/JP95/01448

§ 371 Date: Feb. 6, 1997

§ 102(e) Date: Feb. 6, 1997

[87] PCT Pub. No.: WO96/20422

PCT Pub. Date: Jul. 4, 1996

[30] Foreign Application Priority Data

Dec. 28, 1994 [JP] Japan .................................. 6-326813
Feb. 20, 1995 [JP] Japan .................................. 7-031024
Mar. 9, 1995 [JP] Japan .................................. 7-050175

[51] Int. Cl.$^7$ .................................................. G02B 5/30
[52] U.S. Cl. .................. 359/500; 359/494; 359/495; 359/496; 349/5; 349/9; 349/194; 353/20
[58] Field of Search .................................. 349/201, 194, 349/193, 96, 9, 5, 8; 353/20; 362/19; 359/500, 495, 494, 483, 485, 496

[56] References Cited

U.S. PATENT DOCUMENTS

| Re. 26,506 | 12/1968 | Rogers .................................. 362/19 |
| 5,098,184 | 3/1992 | van den Brandt et al. ............. 353/102 |
| 5,184,248 | 2/1993 | De Vaan et al. ......................... 359/483 |
| 5,283,600 | 2/1994 | Imai ......................................... 353/34 |
| 5,601,351 | 2/1997 | Van Den Brandt ...................... 353/20 |
| 5,626,408 | 5/1997 | Heynderickx et al. ................... 353/20 |
| 5,648,859 | 7/1997 | Hirabayashi et al. .................... 349/9 |
| 5,900,977 | 5/1999 | Hikmet ..................................... 349/96 |

FOREIGN PATENT DOCUMENTS

| 0451034 | 10/1991 | European Pat. Off. .................... 349/9 |
| 508413 A2 | 10/1992 | European Pat. Off. ........ G02B 27/28 |

(List continued on next page.)

OTHER PUBLICATIONS van den Brandt et al., "New Plusfactors in an LCD–Projector", IEEE 1991, San Diego, CA, pp. 151–154.

Imai et al., "A Novel Polarization Converter for High–Brightness Liquid Crystal Light Valve Projector", Eurodisplay 1992, pp. 257–260.

"Magneto–Optic Beam Splitter", IBM Technical Disclosure Bulletin, vol. 32, No., 4B, Sep. 1, 1989, p. 438–439.

*Primary Examiner*—Cassandra Spyrou
*Assistant Examiner*—John Juba, Jr.
*Attorney, Agent, or Firm*—Oliff & Berridge, PLC

[57] ABSTRACT

A polarization luminaire of the present invention has a light source, an optical integrator, a polarized light splitting means and a polarization conversion means. The polarized light splitting means splits a light emitted from the light source into two kinds of polarized lights. The polarization directions of the two kinds of polarized lights are perpendicular to each other and travel in directions separated by an angle of less than 90 degrees. The polarization conversion means modifies the two kinds of polarized lights to have the same polarization direction. The polarized light splitting means is placed on the entrance side or the outputting side of a first lens plate of the optical integrator, or is placed within a second lens plate. A prism beam splitter having a polarized light splitting film that includes a thermally stable dielectric multi-layer film may be used as the polarized light splitting means. The present invention utilizes most of the polarized lights by causing the polarized lights to have the same polarization direction. Further, uniform brightness is emitted. Consequently, the polarization luminaire of the present invention is suited for use in a projection display.

2 Claims, 45 Drawing Sheets

FOREIGN PATENT DOCUMENTS

| | | | |
|---|---|---|---|
| 576072 A1 | 12/1993 | European Pat. Off. | G02B 27/28 |
| 0-646-828-A1 | 4/1995 | European Pat. Off. | G02F 1/13 |
| 935663 | 1/1956 | Germany . | |
| 61-102626 | 5/1986 | Japan | G02F 1/13 |
| 61-90584 | 5/1986 | Japan | G02F 1/03 |
| 63-121821 | 5/1988 | Japan | G02F 1/133 |
| 63-168622 | 7/1988 | Japan | G02F 1/13 |
| 63-271313 | 11/1988 | Japan | G02B 27/28 |
| 1-265228 | 10/1989 | Japan | G02F 1/133 |
| 2-128103 U | 10/1990 | Japan | G02B 5/30 |
| 2-308204 | 12/1990 | Japan | G02B 5/30 |
| 3-122631 | 5/1991 | Japan | G02B 27/10 |
| 403223811 | 10/1991 | Japan | 349/9 |
| 5-19208 | 1/1993 | Japan | G02B 27/28 |
| 5-72417 | 3/1993 | Japan | G02B 27/28 |
| 5-181135 | 7/1993 | Japan | G02F 1/1335 |
| 5-196891 | 8/1993 | Japan | G02B 27/28 |
| 6-202094 | 7/1994 | Japan | G02F 1/1335 |
| 6-289387 | 10/1994 | Japan | G02F 1/1335 |
| 6-324329 | 11/1994 | Japan | G02F 1/1335 |
| 7-225379 | 8/1995 | Japan | G02F 1/1335 |
| 7-294906 | 11/1995 | Japan | G02F 1/1335 |
| WO 94/22042 | 3/1994 | WIPO . | |

(EMBODIMENT 1)

(LIQUID CRYSTAL POLARIZED LIGHT SPLITTING UNIT)
103

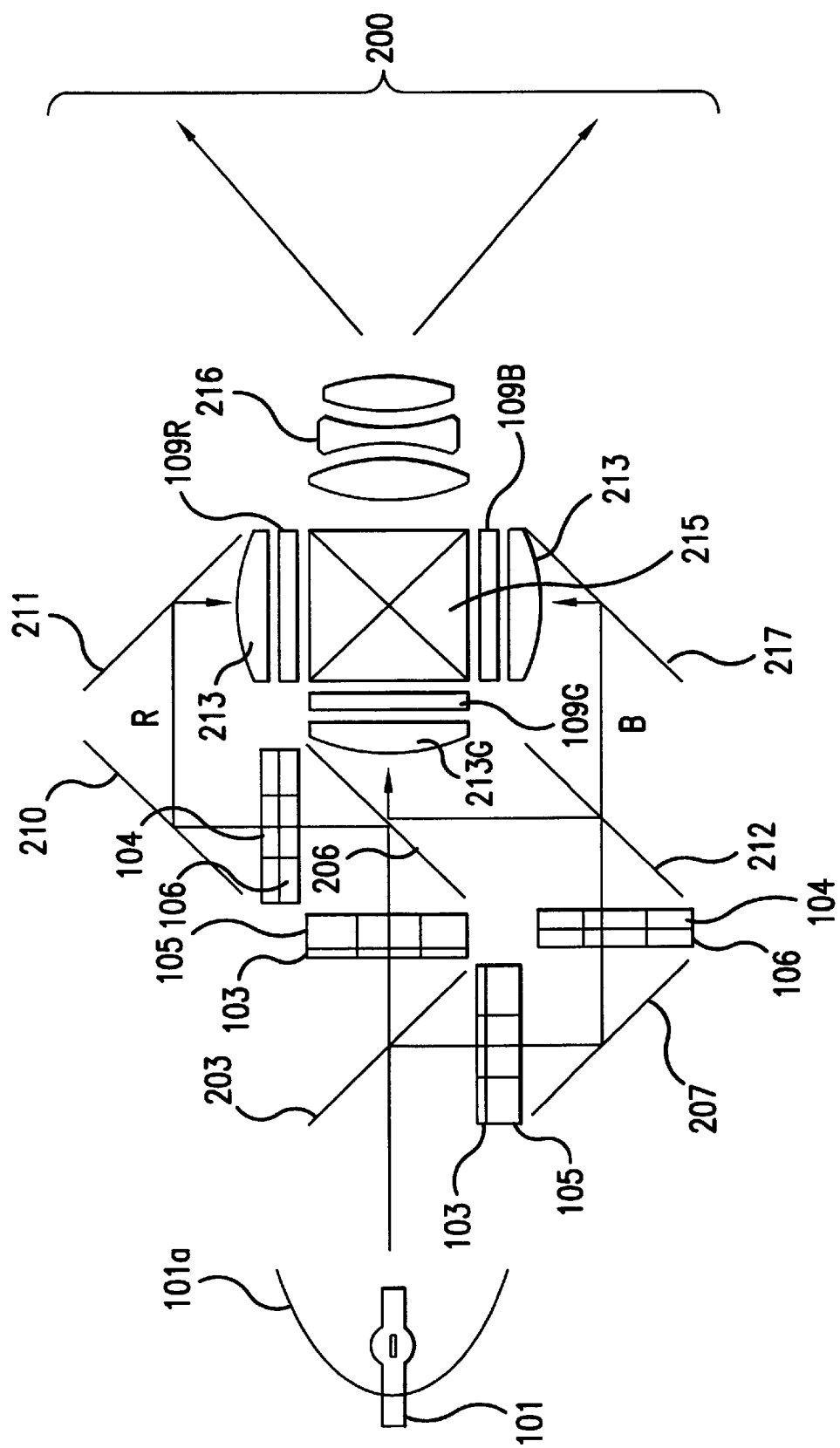

POLARIZATION LUMINAIRE AND PROJECTION DISPLAY

TECHNICAL FIELD

The present invention relates to a polarization luminaire for uniformly illuminating a rectangular illumination area or the like with polarized light waves in which the polarization direction thereof is made to be uniform. Further, the present invention relates to a projection display for modulating polarized light, which has been emitted from this polarization luminaire, by means of a light valve and for enlarging an image and displaying the image on a screen.

BACKGROUND ART

Hitherto, a system of the optical integrator using two lens plates has been known as an optical system for uniformly illuminating a rectangular illumination area of a liquid crystal light valve or the like. The system of the optical integrator is disclosed in, for example, Japanese Patent Public Disclosure No. 3-11806/1991 Official Gazette and has already been put to practical use.

Ordinary projection displays, which use liquid crystal light valves of the type adapted to modulate polarized light, can utilize only single kind of polarized light. It is, therefore, important for obtaining a light projected image to enhance the utilization efficiency of light.

An object of the present invention is to propose a luminaire suitable for using in a projection display or the like, which uses a liquid crystal light valve of the type adapted to modulate polarized light, as an illuminating system.

More particularly, the object of the present invention is to propose a polarization luminaire that is provided with a system of the optical integrator and a polarization conversion system and can efficiently utilize polarized light and further can achieve uniform illumination. Furthermore, another object of the present invention is to propose a projection display provided with this newly proposed polarization luminaire.

DISCLOSURE OF THE INVENTION

A polarization luminaire of the present invention has: a light source for emitting polarized lights whose polarization directions are random; and a system of the optical integrator that is provided with a first lens plate consisting of a plurality of lenses and with a second lens plate consisting of a plurality of lenses. The polarized light radiated from the light source is projected on the entrance plane of each of the lenses of the second lens plate through the first lens plate in such a manner as to form a secondary light source image thereon. Further, an object is radiated with light emitted from the second lens plate. This polarization luminaire of the present invention further has: polarized light splitting means for splitting a light emitted from the light source into two kinds of polarized lights whose polarization directions are perpendicular to each other and whose traveling directions are apart from each other by an angle of less than 90 degrees; and polarization conversion means for causing the two kinds of polarized lights to have the same polarization direction. Moreover, this polarization luminaire of the present invention employs a configuration in which the polarized light splitting means is placed on one of an entrance side and an exit side of the first lens plate of the system of the optical integrator.

Here, note that in the case where a region illuminated with polarized light emitted from the system of the optical integrator is oblong in the same manner as a rectangle or the like, it is preferable that a splitting direction, in which two lights split by the polarized light splitting means are separated from each other, is the direction of the length of the region.

Further, it is desirable that the shape of each of the lenses composing the second lens plate of the system of the optical integrator is similar to that of each of the lenses composing the first lens plate.

An element having a structure (namely, a liquid crystal structure), in which a liquid crystal layer is sandwiched between a prism substrate and a glass substrate and an interface between the liquid crystal layer and the prism substrate is formed as a multi-stage surface inclined at an angle of less than 90 degrees to the optical axis of the means, may be employed as the polarized light splitting means.

A prism beam splitter, which is provided with a polarized light splitting film constituted by a dielectric multi-layer film and is adapted to split a polarized light emitted from the light source, whose polarization direction is random, into two kinds of polarized lights, whose polarization directions are perpendicular to each other, and is further adapted to emit the two kinds of polarized lights respectively in directions forming a deviation angle of less than 90 degrees, may be employed, instead of this element using a liquid crystal, as the polarized light splitting means.

The following configurations can be employed as that of the prism beam splitter.

(1) A prism beam splitter having the following configuration can be employed. This prism beam splitter has a flat quadrangular prism and a triangular prism whose inclined surface portion is joined to one of opposed side surface portions of the quadrangular prism. In a joint portion between the quadrangular prism and the triangular prism, the polarized light splitting film is formed. A reflection film for reflecting single kind of polarized lights, which is transmitted by the polarized light splitting film, in a predetermined direction is formed on the other of the opposed side surface portions of the quadrangular prism.

As the aforementioned triangular prism, a triangular prism containing liquid can be employed.

(2) A prism beam splitter having the following configuration can be employed. This prism beam splitter has a first flat quadrangular prism and a second flat quadrangular prism whose side surface portion is joined to one of opposed side surface portions of the first quadrangular prism. In a joint portion between the first and second quadrangular prisms, the polarized light splitting film is formed. A reflection film for reflecting single kind of polarized lights, which is transmitted by the polarized light splitting film, in a predetermined direction is formed on the other of the opposed side surface portions of the first quadrangular prism.

(3) A prism beam splitter having the following configuration can be employed. This prism beam splitter has a flat quadrangular prism and a plurality of triangular prisms whose inclined surface portions are joined to one of opposed side surface portions of the quadrangular prism. In a joint portion between the quadrangular prism and the triangular prisms, the polarized light splitting film is formed. A reflection film for reflecting single kind of polarized lights, which is transmitted by the polarized light splitting film, in a predetermined direction is formed on the other of the opposed side surface portions of the quadrangular prism.

As the triangular prism described hereinabove, a triangular prism containing liquid can be employed.

(4) A prism beam splitter having the following configuration can be employed. This prism beam splitter has a first triangular prism, on the inclined surface of which the polarized light splitting film is formed, and a second triangular prism, on the inclined surface of which a reflection film for reflecting single kind of polarized lights, which is transmitted by the polarized light splitting film, in a predetermined direction is formed. While the first and second triangular prisms are in a state in which the space therebetween is filled with liquid, the first and second triangular prisms are formed in such a manner as to be integral with each other.

(5) A prism beam splitter having the following configuration can be employed. This prism beam splitter has a plurality of quadrangular-prism-like prism composite elements, each of which has: a flat quadrangular prism; a first triangular prism whose inclined surface portion is joined to one of opposed side surface portions of the quadrangular prism; and a second triangular prism whose inclined surface portion is joined to the other of the opposed side surface portions of the quadrangular prism. In each of the prism composite elements, the polarized light splitting film is formed in the joint portion between the quadrangular prism and the first triangular prism, and a reflection film is formed in the joint portion between the quadrangular prism and the second triangular prism. The prism composite elements are aligned in a line in a direction perpendicular to the optical axis of the system of the optical integrator in such a way that the polarized light splitting films become parallel. The reflection film reflects to output the randomly-polarized light having been emitted from the light source portion to the next prism on one side, and reflects the polarized light which is transmitted by the polarized light splitting film formed in the same prism composite element in a predetermined direction on the other side.

In this case, the prism composite elements are set in such a manner that the polarized light splitting films are inclined at about 45 degrees to the optical axis of the system of the optical integrator.

(6) A prism beam splitter having the following configuration can be employed. This prism beam splitter has a plurality of quadrangular-prism-like prism composite elements, in each of which the polarized light splitting film is formed. The prism composite elements are aligned in a line in a direction perpendicular to the optical axis of the system of the optical integrator in such a way that the polarized light splitting films extends nearly in the same direction.

(7) A prism beam splitter having the following configuration can be employed. This prism beam splitter has a plurality of quadrangular-prism-like prism composite elements, in each of which the polarized light splitting film is formed. The prism composite elements are aligned in a line in a direction perpendicular to the optical axis of the system of the optical integrator. Moreover, on both sides of the optical axis of the system of the optical integrator, the polarized light splitting films extend nearly in the opposite directions.

Incidentally,. in the case that the prism beam splitter has a prism composite element as described above, the width measurement of this prism composite element can be set as follows. If each of the lenses composing the first lens plate of the system of the optical integrator is a rectangular lens, the width measurement of the prism composite element can be set at (1/n) of the width measurement of this rectangular lens (incidentally, n is an integer which is equal to or larger than 1).

Further, a deviation prism can be disposed between the polarized light splitting means and the system of the optical integrator. Alternatively, a deviation prism can be placed between the light source and the polarized light splitting means. In this case, the deviation prism can be formed in such a way as to be integral with an entrance side of the polarized light splitting means. Further, the deviation prism, the polarized light splitting means and the first lens plate of the system of the optical integrator may be formed as an element having a single-piece construction.

Next, in the case of employing a prism beam splitter as the polarized light splitting means, the prism beam splitter may be disposed on the optical path between the first lens plate and the second lens plate, instead of being placed nearer to the light source side than the first lens plate of the system of the optical integrator. In this case, a prism beam splitter having the following configuration has only to be employed. Namely, this prism beam splitter has a flat quadrangular prism and a rectangular prism whose inclined surface portion is joined to one of opposed side surface portions of the quadrangular prism. In a joint portion between the quadrangular prism and the rectangular prism, the polarized light splitting film is formed. A reflection film for reflecting single kind of polarized lights, which is transmitted by the polarized light splitting film, in a predetermined direction is formed on the other of the opposed side surface portions of the quadrangular prism. The two orthogonally intersecting surfaces of the rectangular prism are used as a surface of incidence and an exit surface. Polarized light is incident on the surface of incidence thereof and is then split by the polarized light splitting film into two kinds of polarized lights that are subsequently reflected by the reflection film and are finally outputted from the exit surface thereof in such a manner as to be separated and outputted therefrom, respectively, at angles which are nearly symmetric with the optical axis.

In this case, after the first lens plate of the system of the optical integrator is disposed on the surface of incidence of the rectangular prism in a state, in which the first lens is joined thereto and further, the deviation prism is disposed at a position, which is nearer to the light source side than the position of the first lens, light emitted from the light source has only to be incident on the first lens plate at a certain angle of incidence which is not a right angle. Needless to say, the deviation prism may be disposed between the first lens plate and the surface of incidence of the rectangular prism. Alternatively, the deviation prism may be disposed between the exit surface of the prism beam splitter and the second lens plate.

Next, an optical system using first and second condensing mirror plates, each of which consists of mirrors, instead of the first lens plate may be employed as the system of the optical integrator. Namely, the polarization illumination device employing such an optical system has: a light source; a polarized light splitting means that has a structure, in which a polarized light splitting film constituted by a dielectric multi-layer film is sandwiched between two rectangular prisms, and is operative to split an output light of the light source into p-polarized light and s-polarized light, whose polarization directions are orthogonal to each other, by is means of this polarized light splitting film; a first condensing mirror plate that comprises a plurality of condensing mirrors, each of which has a rectangular appearance, and is operative to condense the p-polarized lights emitted from the polarized light splitting means and to form a plurality of secondary light source images represented by the p-polarized lights; a second condensing mirror plate that has nearly the same size and shape as of the first condensing mirror plate and is operative to condense the s-polarized lights emitted from the polarized light splitting means and to form a plurality of secondary light source images, which are represented by the s-polarized lights, at positions slightly different from positions where the plurality of secondary light source images represented by the p-polarized lights are formed; first and second quarter-wave plates that are disposed between the first condensing mirror plate and the polarized light splitting means and between the second condensing mirror plate and the polarized light splitting means; and a light condenser lens plate, which comprises lenses of the same number as of the condensing mirrors composing the first or second condensing mirror plate, and a half-wave plate that are placed in the vicinity of the positions, at which the plurality of secondary light source images represented by the p-polarized lights are formed, and the positions at which the plurality of secondary light source images represented by the s-polarized lights are formed.

Here, note that a deviation prism can be formed between the light source and the polarized light splitting means.

Further, deviation prisms can be disposed between the polarized light splitting means and the first condensing mirror plate and between the polarized light splitting means and the second condensing mirror plate, respectively.

In the case of using a deviation prism, the deviation prism may be formed in such a manner as to be integral with the polarized light splitting means. Further, the deviation prism may be formed in such a way as to be integral with the first condensing mirror plate. Alternatively, the deviation prism may be formed in such a way as to be integral with the second condensing mirror plate.

The polarized light splitting means can be constituted by a flat polarized light splitting plate.

Further, a liquid-filled prism may be used as the rectangular prism composing the polarized-splitting means.

Moreover, in the case that a region illuminated with polarized light emitted from the system of the optical integrator is oblong in the same manner as a rectangle or the like, it is preferable that a separating direction, in which two kinds of secondary light source images formed by the two condensing mirror plates are separated from each other, is made to coincide with the direction of the length of the region.

Furthermore, it is desirable that the shape of each of the lenses composing the condenser lens plate is similar to that of each of the condensing mirrors composing the first and second lens plates.

Next, in the case that a prism beam splitter is employed as the polarized light splitting means, a configuration, in which the prism beam splitter may be placed within the second lens plate, may be employed, instead of the configurations, in which the prism beam splitter is disposed at a position nearer to the light source than the first lens of the system of the optical integrator as above described, and in which the prism beam splitter is disposed on the optical path between the first lens plate and the second lens plate as stated above.

The polarization luminaire of the present invention having the former configuration instead of the latter configurations comprises: a light source for emitting polarized lights, whose polarization directions are random; a first lens plate that comprises a plurality of condenser lenses, each of which has a rectangular appearance, and is operative to condense polarized lights emitted from the light source and to form a plurality of secondary light source images represented by the polarized lights; a second lens plate that is placed in the vicinity of a position, at which the plurality of secondary light source images are formed, and has a condenser lens array, a polarized light splitting prism array, a half-wave plate and an exit side lens; the condenser lens array comprises condenser lenses of the same number as of the condenser lenses composing the first lens plate; the polarized light splitting prism array being operative to split a polarized light, whose polarization direction is random, into a p-polarized light and an s-polarized light and comprises a plurality of polarizing beam splitters and a plurality of reflecting mirrors; the half-wave plate being placed on the side of the exit surface of the polarized light splitting prism array; and the exit side lens being disposed on the side of the exit surface of the half-wave plate.

In this case, it is similarly desirable that the shape of each of the condenser lenses composing the second lens plate is similar to that of each of the condenser lenses composing the first lens plate.

Further, a deviation prism can be placed between the light source and the first lens plate. In this case, the deviation prism can be formed in such a way as to be integral with the first lens plate.

Moreover, lenses of a decentered system may be used as the condenser lenses composing the first lens plate. Similarly, decentered lenses may be used as the condenser lenses composing the condenser lens array of the second lens plate.

Furthermore, it is preferable that the lateral width of each of the condenser lenses composing the condenser lens array of the second lens plate is made to be equal to that of the polarizing beam splitter.

Incidentally, the quarter-wave and half-wave plates used in each of the aforementioned configurations can be made of TN (twisted nematic) liquid crystals.

On the other hand, the present invention relates to a projection display provided with a polarization luminaire having each of the aforesaid configurations. Namely, a projection display that comprises: a luminaire; a modulation means having a liquid crystal light valve which is operative to modulate polarized light included in luminous flux radiated from this luminaire and to cause the light to contain image information; and a projection optical system for throwing the modulated luminous flux onto a screen and for displaying an image thereon, wherein the luminaire has each of the aforesaid configurations.

Here, note that projection displays are roughly classified into devices of a type (particularly, referred to as a single-plate type), each of which uses a single liquid crystal light valve, and devices of another type, each of which uses a plurality of liquid crystal light valves and that in the case of attaching importance to the brightness and the display quality of an image, the projection display of the latter type using a plurality of liquid crystal light valves is usually used. The projection display using a plurality of liquid crystal light valves is required to split luminous flux according to the number of the liquid crystal and thus needs a mechanism therefor.

Therefore, an ordinary projection display has: a color light splitting means for splitting luminous flux, which is radiated from the luminaire, into at least two luminous fluxes; and light synthesis means for synthesizing a synthetic luminous flux from the modulated luminous flux after modulated by the modulation means, wherein the synthetic luminous flux obtained by the color synthesis means is applied to a screen through the projection optical system and a color image is displayed thereon.

BRIEF DESCRIPTION OF DRAWINGS

FIG. 1 is a diagram for illustrating an optical system of a polarization luminaire embodying the present invention, namely, Embodiment 1 of the present invention.

FIG. 2 is a schematic diagram for schematically illustrating the configuration of an optical system of an example of a projection display into which the polarization luminaire illustrated in FIG. 1 is incorporated;

FIG. 3 is a diagram for illustrating the configuration of another example of a projection display into which the polarization luminaire illustrated in FIG. 1 is incorporated.

FIG. 4 is a diagram for illustrating another polarization luminaire embodying the present invention, namely, Embodiment 2 of the present invention.

FIG. 12 is a diagram for illustrating another polarization luminaire embodying the present invention, namely, Embodiment 10 of the present invention.

FIG. 19 is a schematic diagram for schematically illustrating a polarization luminaire embodying the present invention, namely, Embodiment 14 of the present invention.

FIG. 21 is a schematic diagram for schematically illustrating a polarization luminaire embodying the present invention, namely, Embodiment 16 of the present invention.

FIG. 29 is a diagram for illustrating another polarization luminaire embodying the present invention, namely, Embodiment 22 of the present invention.

BEST MODE FOR CARRYING OUT THE INVENTION

Figure 1A:
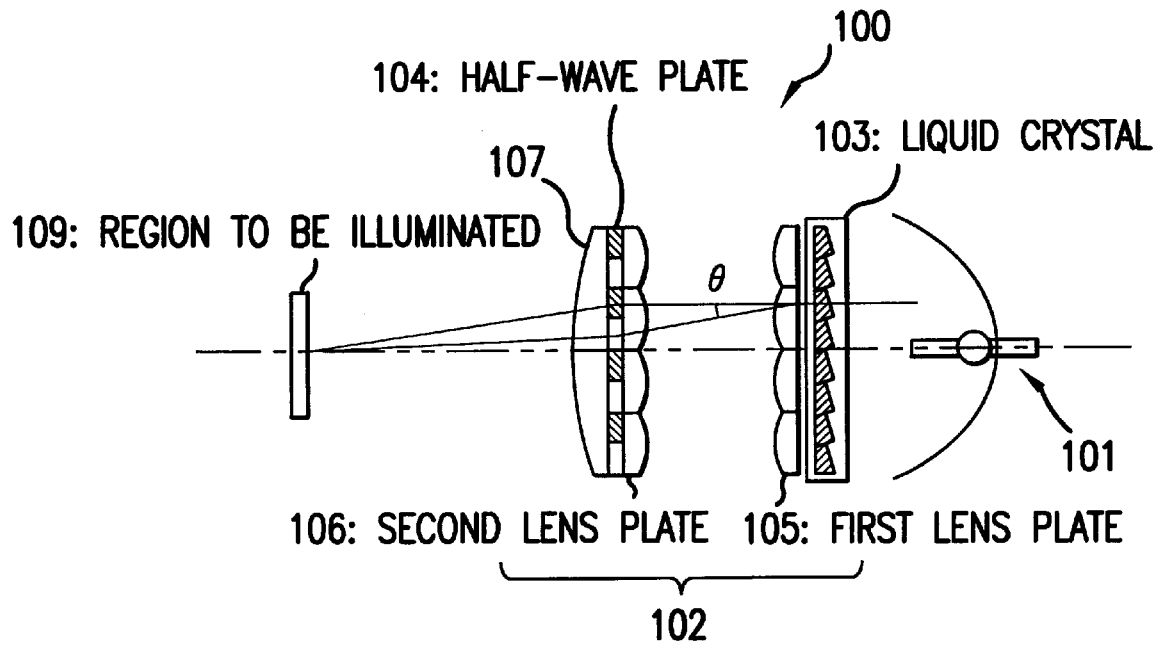
FIG. 1(A) is a schematic diagram for schematically illustrating the configuration thereof.

Hereinafter, modes for carrying out the present invention will be described by referring to the accompanying drawings.

Incidentally, in the following description of each of embodiments of the present invention, same reference characters designate corresponding parts. Thus the repeated description of the corresponding parts will be avoided.

Embodiment 1

Embodiment 1 of the present invention will be described by referring to FIG. 1. As shown in FIG. 1(A), a polarization luminaire 100 of the present invention is provided with a light source 101, a system of the optical integrator 102, a polarized light splitting unit 103 using a liquid crystal, and a half-wave plate 104 serving as a polarization conversion element. The system of the optical integrator 102 comprises a first lens plate 105 and a second lens plate 106. The polarized light splitting unit 103 is placed on the side of the entrance surface of the first lens plate 105, namely, placed to the side of the light source 101. The half-wave plate 104 is formed on the exit surface of the second lens plate 106 in such a way as to be integral therewith. Further, a field lens 107 is stuck onto the exit surface of this half-wave plate 104.

Figure 1B:
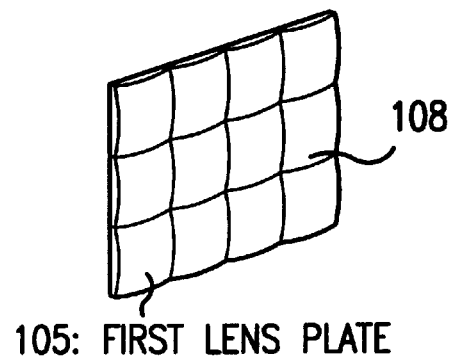
FIG. 1(B) is a perspective view of a first lens plate thereof.

As shown in FIG. 1(B), the first lens plate 105 of the system of the optical integrator 102 is provided with a plurality of rectangular microlenses 108. The second lens plate 106 is also provided with a plurality of rectangular microlenses, whose number is equal to that of the lenses 108 and whose shapes are similar to those of the lenses 108.

Polarized light, which is radiated from the light source 101 and has a random polarization direction (actually considered as a mixed light which comprises a p-polarized light and a s-polarized light), is made to be incident on the polarized light splitting unit 103, whose primary component is a liquid crystal, and is then split into a p-polarized light and an s-polarized light, which are slightly different in outgoing angle from each other, according to an outgoing angular dependence of this polarized light splitting unit 103, which corresponds to each polarized light. As shown in this figure, the polarized light is split into the p-polarized and s-polarized lights, whose outgoing directions are different from each other by an angle θ. The two kinds of polarized lights having outputted from the polarized light splitting unit 103 are then made to be incident on the first lens plate 105 of the system of the optical integrator 102. Further, a pair of secondary light source images comprising images of the light source one of which is represented by the p-polarized light and the other is represented by the s-polarized light, are formed in the proximity of the focal point of each of the rectangular lenses 108 composing the first lens plate, namely, inside each of the rectangular lenses of the corresponding second lens plate 106.

The number of pairs of secondary light source images is equal to the number of the rectangular lenses composing the first lens plate. Here, the half-wave plate 104 is placed on the exit side of the second lens plate 106 correspondingly to each of the positions, at which the secondary light source images are respectively formed, so that when single kind of the polarized lights (for example, the p-polarized light) passes through this half-wave plate 104, this polarized light undergoes a rotatory polarization and is put into a state in which the plane of polarization of this polarized light is complete with the plane of polarization of the other polarized light (for instance, the s-polarized light). Thereafter, the luminous flux, whose polarization directions are uniform, are collected through a field lens 107 placed to the exit side of the first lens plate onto a region 109 to be illuminated. This region 109 is almost uniformly illuminated with such luminous flux. Therefore, all of the luminous flux radiated from the light source 101 come to be incident on the region 109 in principle.

Figure 1C:
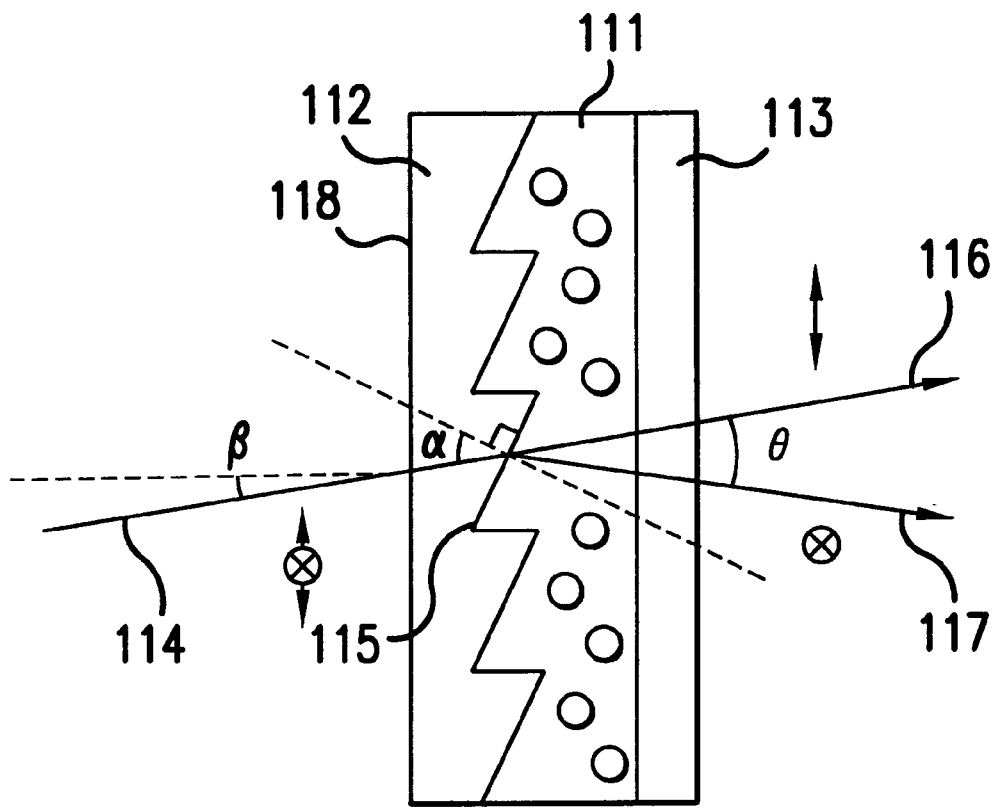
FIG. 1(C) is a schematic diagram for schematically illustrating the configuration of a polarized light splitting unit thereof.

FIG. 1(C) illustrates the configuration of the polarized light splitting unit 103 in which a liquid crystal layer 111 is sandwiched between a prism substrate 112, which has serrate grooves, and a glass substrate 113. Molecules of the liquid crystal are aligned in parallel with the grooves of the prism substrate 112 (namely, are in homogeneous alignment), so that a luminous flux entering perpendicularly on the substrate is split into an extraordinary ray and an ordinary ray corresponding to the molecules of the liquid crystal, which are separated directionally. It is now assumed that an unpolarized light 114 entering nearly perpendicularly on the flat surface of the prism substrate 112 is incident on the inclined surface of the groove of the prism substrate 112 at an angle α. When the refractive index $n_0$ of the molecule of the liquid crystal corresponding to the ordinary ray is equal to that nc of the prism substrate 112 corresponding thereto, an ordinary ray 116 is not refracted at the inclined surface 115 but travels in a straight line, whereas an extraordinary ray 117 is refracted. Thereby, there is caused an angular difference θ between the direction in which the ordinary ray travels and the extraordinary ray travels. When n, denotes the refractive index of the liquid crystal corresponding to the extraordinary ray, the following equation holds approximately.

$$\alpha = \arctan\{\sin\theta/(\cos\theta - n_0/n_1)\}$$

If the prism substrate 112 is made of PMMA, the refractive index thereof becomes 1.48 or so. Thus, the refractive index of the ordinary ray to the liquid crystal can be selected in such a way as to be nearly equal to that of the prism substrate. The angle θ can be increased with increasing the difference of the refractive index between the ordinary fay and the extraordinary ray relative to the liquid crystal. Currently, liquid crystals, each of which has the difference of the refractive index of 0.25 or so, are commercially available. In the case that a metal halide lamp is used as the light source 101 for supplying an incident luminous flux, the diverging angles of output light with respect to the principal ray range between +5 degrees or so. The diverging angles of output light, however, can be limited to the range extending from 3 to +3 degrees or so by using a lamp, whose arc length is short, and further contriving the optical system. Thereupon, if the angle θ between the polarized lights is at least 6 degrees, both of the polarized lights can be completely separated from each other. The angle α determined by substituting such values for the aforementioned equation is 37 degrees. Thus, the angle formed between the flat surface and the inclined surface of the prism substrate 112 is about 37 degrees. Consequently, the prism substrate can be easily produced by using organic substance such as polymethylmethacrylate or polycarbonate.

Incidentally, in practice, as illustrated in FIG. 1(C), incident luminous flux is incident on the entrance surface 118 of the prism substrate 112 at a regular angle θ. Thereby, the principal beams of the entire luminous flux obtained by splitting the polarized light becomes perpendicular to the polarized light splitting unit. Consequently, the entire optical system can be easily configured. An angle β is equal to the angle θ/2. Thus, when the angle θ is 6 degrees, the angel β is 3 degrees. Practically, the light source has only to be tilted slightly.

In point of the efficiency, it is better that the refractive index of the extraordinary ray relative to the liquid crystal is equalized with that relative to the prism substrate 112. In the case of this method, the ordinary ray 116 is refracted. The ordinary ray, however, is a p-polarized light to be outputted from the inclined surface 115 of the prism- substrate 112 and the angle of incidence on an interface is close to Brewster angle, so that the reflection loss can be limited to 1% or less. Thus, if a anti-reflection coat is applied to the interface between the prism substrate and the air, the transmittance of the luminous flux can be theoretically increased to 97% or more.

The polarized light splitting unit 103 illustrated in FIG. 1(C) is made by using a liquid crystal. The polarized light splitting unit, however, can be produced by using an organic film, in principle- For example, the retardation film can be made at a low price if the serrate grooves are formed by being stamped. Further, it is thought that such a retardation film is thermally stable. Moreover, even if monomers are aligned instead of the molecules of the liquid crystal and are polymerized by using ultraviolet rays or heat, a thermally stable polarized light splitting unit can be obtained.

In the system of the optical integrator, the shape of a rectangular lens 121 is similar to that of the region 109 to be illuminated. Because of the oblong rectangular shape of the screen of TV, the shape of the rectangular lens 121 becomes oblong rectangle in accordance with the shape of the screen of TV in the case that a system of the optical integrator is incorporated into a projection display.

Figure 1D:
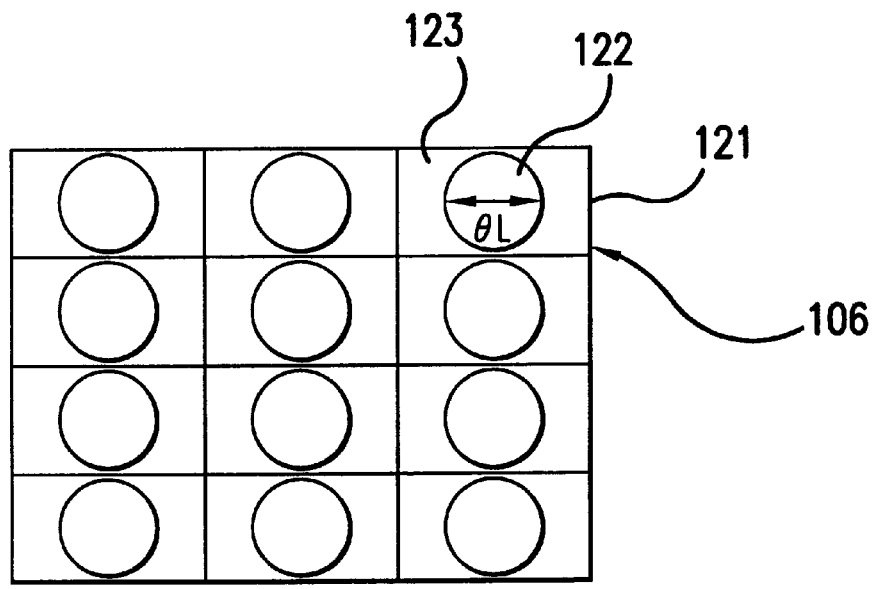
FIG. 1(D) is a diagram for illustrating a secondary light source image formed on a second lens plate thereof.
Figure 1E:
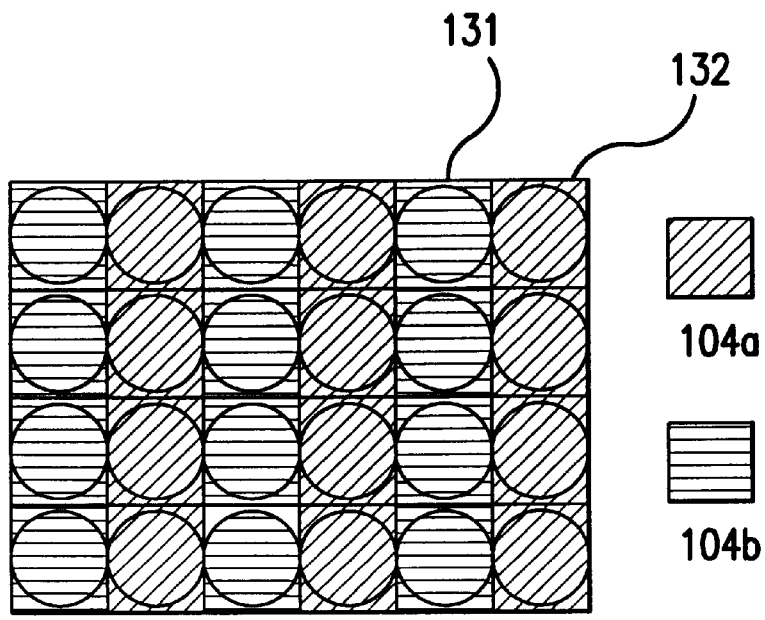
FIG. 1(E) is a diagram for illustrating the configuration of a half-wave plate thereof.

In the case of an ordinary system of the optical integrator 102 which does not use a polarized light splitting unit, a secondary light source image is formed at the center of each of the rectangular lenses of the second lens plate 106. When the diverging angle of light emitted from the light source is within a and the distance between the first lens plate 105 and the second lens plate 106 is L, the secondary light source image is formed within a circular region 122 having a diameter of EL in the central portion of each of the rectangular lenses 121, as shown in FIG. 1(D). Here, it is seen that in both sides of each of the rectangular lenses 121, there are rather large areas 123 which contain no secondary light source images. Thus, the polarization luminaire of the present invention performs the polarization conversion by utilizing this region 123. In the case of this embodiment, on the second lens plate 106, as shown in FIG. 1(E), two kinds of secondary light source images 131 and 132 respectively corresponding to both of the two kinds of polarized lights are formed on each of the rectangular lenses 121. The distance between both of the secondary light source images is equal to the diameter θL of each of the secondary light source image, so that the secondary light source images are separated just as shown in this figure. Moreover, each of the secondary light source images goes into a corresponding one of the rectangular lenses 121. Needless to say, the phenomenon described hereinabove occurs only in the case that the region to be illuminated is oblong. However, if the size of each of the secondary light source image can be reduced sufficiently, such a phenomenon applies in the case that the region to be illuminated is not oblong.

As illustrated in FIG. 1(E), retardation layers 104a and 104b composing the retardation film 104 are disposed like stripes, correspondingly to the secondary light source images 131 and 132 represented by the two kinds of polarized lights, respectively. It is thought that there are the cases where the planes of polarization of the polarized lights are rotated 45 degrees by the layers 104a and 104b of this retardation film so as to make the planes of polarization of the polarized lights extend in the same direction, and where the retardation film is constituted only by single kind of the retardation layer and the plane of polarization of the polarized light of only one kind is turned 90 degrees by the half-wave plate 104, similarly as in the case of this embodiment. Incidentally, in the case of this embodiment, this retardation film 104 is sandwiched between the second lens plate 106 and the field lens 107 and is bonded thereto as shown in FIG. 1(A), so that the reflection loss due to the interface can be eliminated.

Additionally, in the case of this embodiment, the polarized light splitting unit 103 is placed prior to the first lens plate 105. Instead of this, the polarized light splitting unit 103 may be placed between the first lens plate 105 and the second lens plate 106.

Projection display Using Polarization Luminaire of Embodiment 1

FIG. 2 schematically illustrates the configuration of the projection display using the polarization luminaire 100 illustrated in FIG. 1. In FIG. 2, same reference characters designate the composing elements of the polarization luminaire 100 illustrated in FIG. 1.

In a projection display 200 of this example, the light source 101 is a halogen lamp, a metal halide lamp, a xenon lamp or the like. The luminous flux radiated therefrom are reflected by a reflection mirror 101a and thus become those of nearly_@parallel. Among the luminous flux, the bundle of the red rays are transmitted by a blue-and-green reflection dichroic mirror 203, which is adapted to reflect green and blue rays, and bundles of green and blue rays are reflected thereon. Subsequently, the bundle of the red rays are reflected by a double-sided total reflection mirror 206 and total reflection mirrors 210 and 211 in sequence. Thereafter, the bundle of the reflected red rays reach a liquid crystal light valve 109R through a condenser lens 213. The bundle of the green rays are first reflected by a total reflection mirror 207 and is next reflected by a green reflection dichroic mirror 212. Then, the bundle of the reflected green rays are further reflected by a double-sided total reflection mirror 206. Thereafter, the bundle of the reflected green rays reach a corresponding liquid crystal light valve 109G through a condenser lens 213. The bundle of the blue rays are first reflected by a total reflection mirror 207 and are then transmitted by a green reflection dichroic mirror 212. Next, the bundle of the transmitted blue rays are reflected by a total reflection mirror 217. Subsequently, the bundle of the reflected blue rays are incident on a liquid crystal light valve 109B through the condenser lens 213, similarly as in the case of the bundles of other color rays. Each of the three liquid crystal light valves 109 is adapted to modulate the bundle of rays of a corresponding color and causes the rays to contain image information representing an image of the corresponding color. A dichroic prism 215 synthesizes these bundles of the modulated rays respectively corresponding to the colors. In the dichroic prism 215, two dielectric multi-layer films which is adapted to reflect a bundle of red rays and the other is adapted to reflect a bundle of blue rays, are formed crosswise. Further, the synthetic rays pass through a projection lens 216 so that an image is formed therefrom on a screen.

The system of the optical integrator 102 is disposed correspondingly to the bundle of the rays divided by the blue-and-green reflection dichroic mirror 203. Regarding the red rays, the first lens plate 105 and the second lens plate 106 are placed prior to and posterior to the double-sided total reflection mirror 206. Regarding the bundles of the green and blue rays, the first lens plate 105 and the second lens plate 106 are placed prior to and posterior to the total reflection mirror 207. It is important that each of the total reflection mirrors is placed between the lens plates. A dichroic mirror may be inserted between the lens plates. In this case, bundles of rays, whose angles of incidence are nonuniform, are incident on the dichroic mirror. Thus, owing to the angular dependence of the dielectric multi-layer film, inconsistencies in colors are liable to occur on the screen. Further, as a result of employing the configuration as illustrated in FIG. 2, a substantial working distance becomes equal to the distance from second lens plate 106 to the liquid crystal light valve 109. In comparison with the case that no system of the optical integrator is provided therein, the substantial working distance becomes half of that in such a case. In practice, the efficiency in utilizing the bundles of the rays becomes nearly twice that in the case that no system of the optical integrator is provided therein. The display non-uniformity is eliminated almost completely.

As described above, the liquid crystal polarized light splitting unit 103 is mounted on the entrance side of the first lens plate 105 of the system of the optical integrator 102. Further, the half-wave plate 104 serving as the polarization conversion element is disposed on the exit surface of the second lens plate 106.

In the case of this projection optical system, the back focus of the projection lens 216 is short. Thus, the optical system can be easily designed in such a manner that the numerical aperture of the projection lens is large while the size thereof is kept small. Consequently, the maximum effects of the optical integrator can be achieved.

Further, in the case of projection displays (namely, liquid crystal projectors) currently put to practical use, liquid crystal light valves of the types adapted to modulate polarized light are used. Therefore, half of the nonpolarized light radiated from the light source is absorbed by a polarizing plate and is thus converted into heat. Consequently, reduction in the efficiency in utilizing the light as well as the necessity of cooling the polarizing plate for preventing heat being produced therefrom becomes a problem. However, in the case of this example, a polarized light converting system is added to the system of the optical integrator. Further, most of luminous fluxes radiated from the light source are converted into a single kind of polarized lights and are utilized. Thus, the efficiency in utilizing the light is enhanced. Moreover, the polarizing plate (not shown) can be restrained from producing heat.

FIG. 3 illustrates another example of the configuration of the projection display using the polarization luminaire illustrated in FIG. 1. In FIG. 3, there is shown an example of the projection display using two liquid crystal light valves.

Figure 3A:
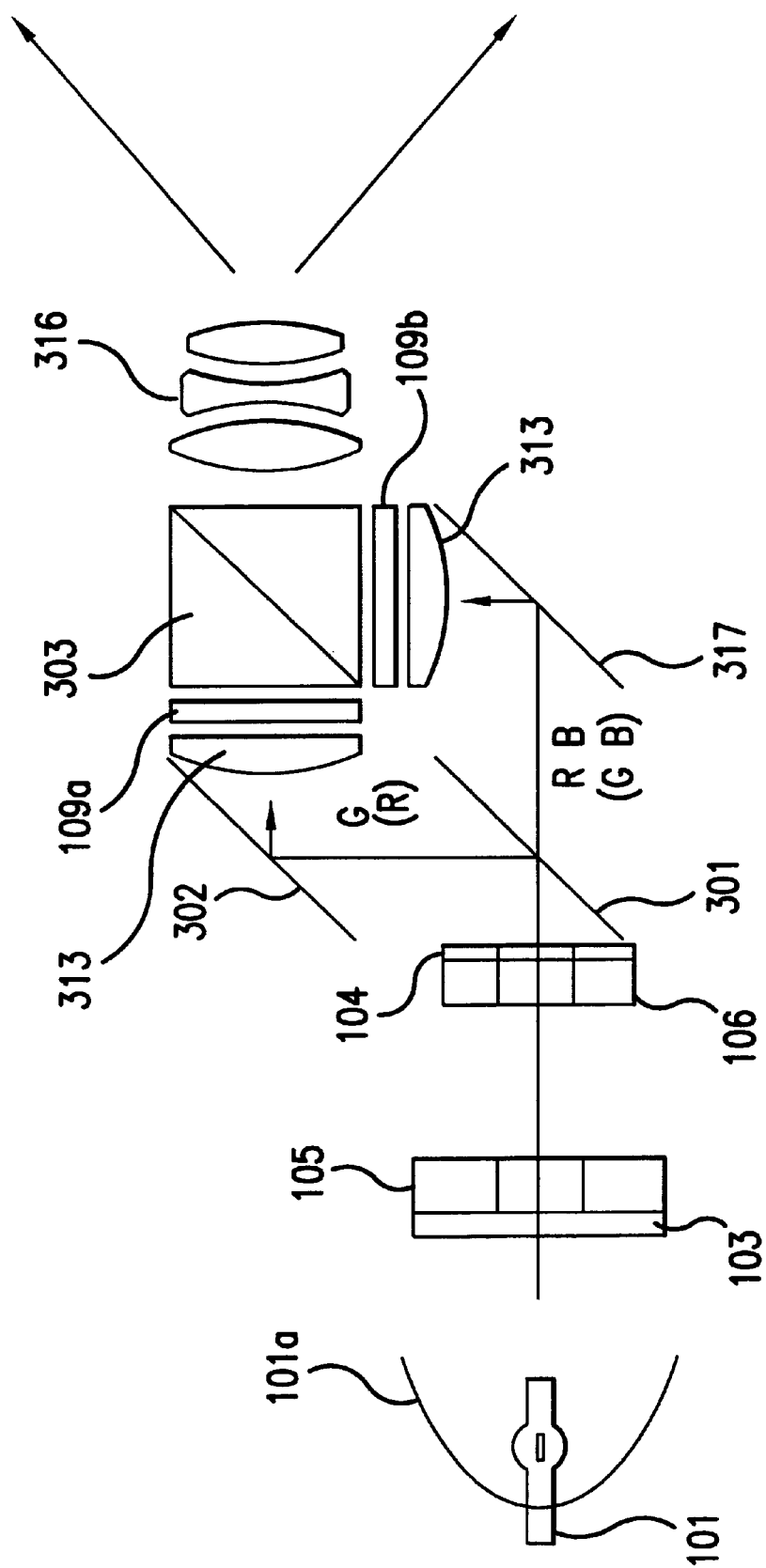
FIG. 3(A) is a schematic diagram for schematically illustrating the configuration of an optical system thereof.

As illustrated in FIG. 3(A), in the case of a projection display 300 of this example, luminous flux radiated from the light source 101 pass through the system of the optical integrator, which consists of the first lens plate 105 and the second lens plate 106, after reflected by the reflection mirror 101a. Next, a white luminous flux is divided by a green reflection dichroic mirror 301 into a bundle of green rays and a bundle of magenta rays. The bundle of green rays and the bundle of magenta rays are reflected by the total reflection mirror 302 and 317, respectively. Then, the reflected bundles of rays are incident on liquid crystal light valves 109a and 109b through a condenser lens 313, respectively. Subsequently, the modulated bundles of rays are synthesized by a dichroic prism for synthesizing the bundle of green rays and the bundle of magenta rays. Thereafter, the synthetic rays are applied through a projection lens 316 and an image is displayed.

Figure 3B:
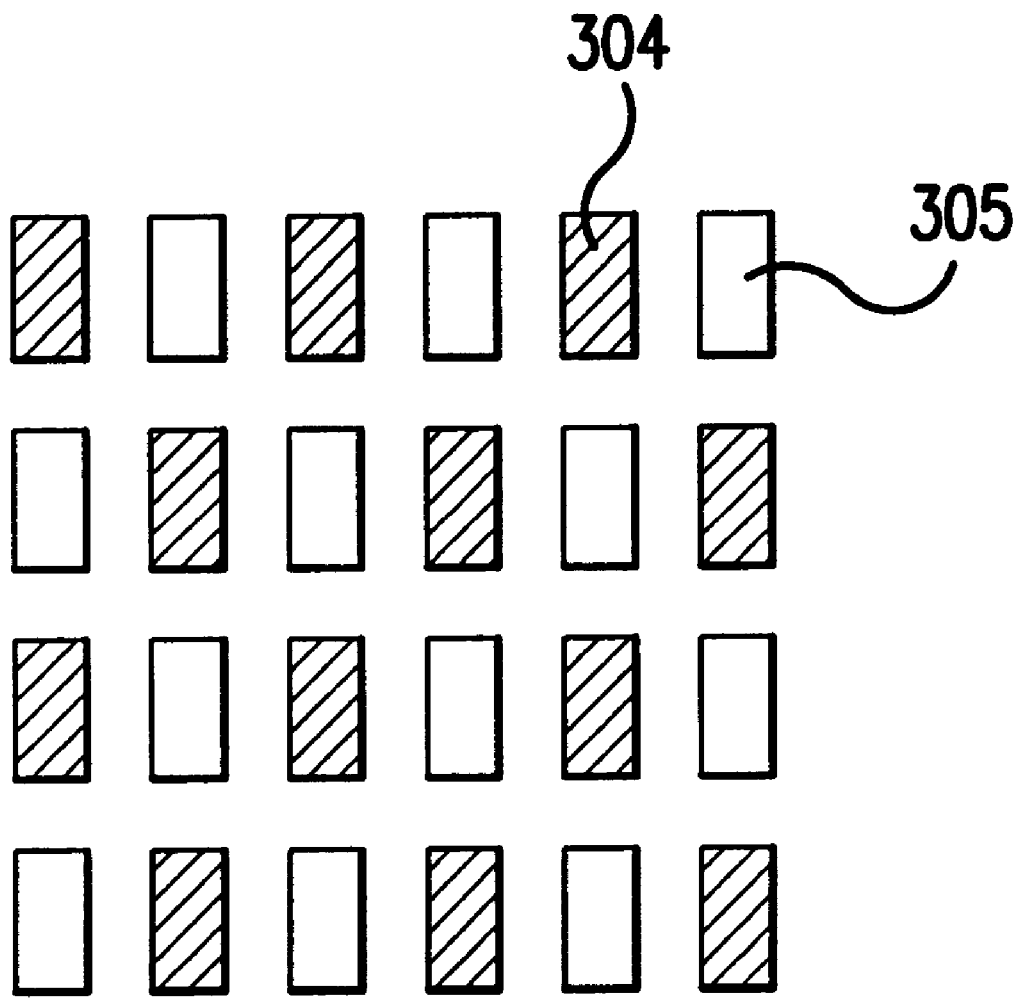
FIG. 3(B) is a diagram for illustrating the configuration of a color filter thereof.

In this configuration, there are two liquid crystal light valves. It is, thus, necessary to provide color filters in the panel of one of the light valves and to separate and modulate two color bundles of rays. FIG. 3(B) is a diagram for illustrating the configuration of pixels of the liquid crystal light valve 109b. As shown in this figure, red transmitting filters 304 and blue transmitting filters 305 are placed alternately.

This configuration uses only two liquid crystal light valves. Thus, the configuration of the optical system is simplified very much in contrast with the example illustrated in FIG. 2. Moreover, a single liquid crystal light valve is used for green light. Therefore, the resolution of this example is hardly inferior to that of the example illustrated in FIG. 2. Furthermore, the brightness of a projected image is determined mostly by that of the green light. Hence, the brightness of the image in the case illustrated in FIG. 3(A) is not so inferior to that of the image in the case of the example illustrated in FIG. 2. Consequently, in the case of displaying an ordinary image, the use of such a simplified configuration proves almost no problem, except the case that it is necessary to concurrently display three colors at a single pixel as in the case of a screen of a computer system.

Incidentally, the color reproducibility of the example illustrated in FIG. 3(A) is not sufficient, namely, red and blue are reproduced insufficiently. Thus, the spectral distribution of the light source had better be regulated in such a way that the quantity of red and blue are a somewhat larger than those of the ordinary cases. For example, in the case of a three-band luminescent metal halide lamp, a halide corresponding to each primary color is added thereto. A certain metal halide lamp, which is currently commercially available, is filled with halides such as lithium, thallium and indium. In this case, lithium and indium correspond to red and blue, respectively. Thus, these halides have only to be added to the lamp in such a way that the quantities of these halides are a little larger than those thereof to be usually added.

Metal halide lamps for displaying images, which are presently commercially available, have a common drawback in that red shortage is liable to occur. Thus, there can be contrived a method, by which a single liquid crystal light valve is prepared for modulating a bundle of red rays and a common panel is also prepared for modulating bundles of green and blue rays, as an example of modification of the system illustrated in FIG. 3(A). In contrast with an ordinary projection display which employs a method of reducing the quantity of green light so as to make up for a shortage of red light, a method of this example can obtain a sufficient quantity of red light and thus can obviate the necessity of reducing the quantity of green light. Therefore, the quantity of a projected image is nearly equal to that obtained by the aforementioned projection display, and the projection display of this example is suited to display an ordinary image.

The back focus of a projection lens is short in the case of the projection display of this example as well as that of aforementioned example. Thus, in spite of using the optical integrator, the projection display of this example can be designed in such a manner that the projection lens is small, and the entire configuration of the projection display of this example can be simplified very much. Further, the resolution and the brightness of a projected image are not so inferior to those obtained by the aforementioned example, and the projection display of this example is very suitable for displaying an ordinary image.

Embodiment 2

The polarization luminaire of Embodiment 1 employs the optical system which uses a liquid crystal material as the polarized light splitting means. In this optical system, the efficiency in utilizing light is improved. Thus, the polarization luminaire of Embodiment 1 excels in the respect that a bright projected image can be obtained. The refractive index of the liquid crystal material, however, highly depends on temperature. Therefore, if such a liquid crystal material is incorporated into the light source system of the projection display in which the temperature may vary significantly, there is the fear that the polarized light splitting angle formed between the polarized lights obtained by splitting a light becomes unstable.

In the case of this embodiment, a luminaire being capable of stably exerting the good performance even in the environment, in which a significant change in temperature may occur, is realized by using a prism beam splitter, which excels in the temperature dependence of the polarized light splitting angle, as the polarized light splitting means.

Figure 4A:
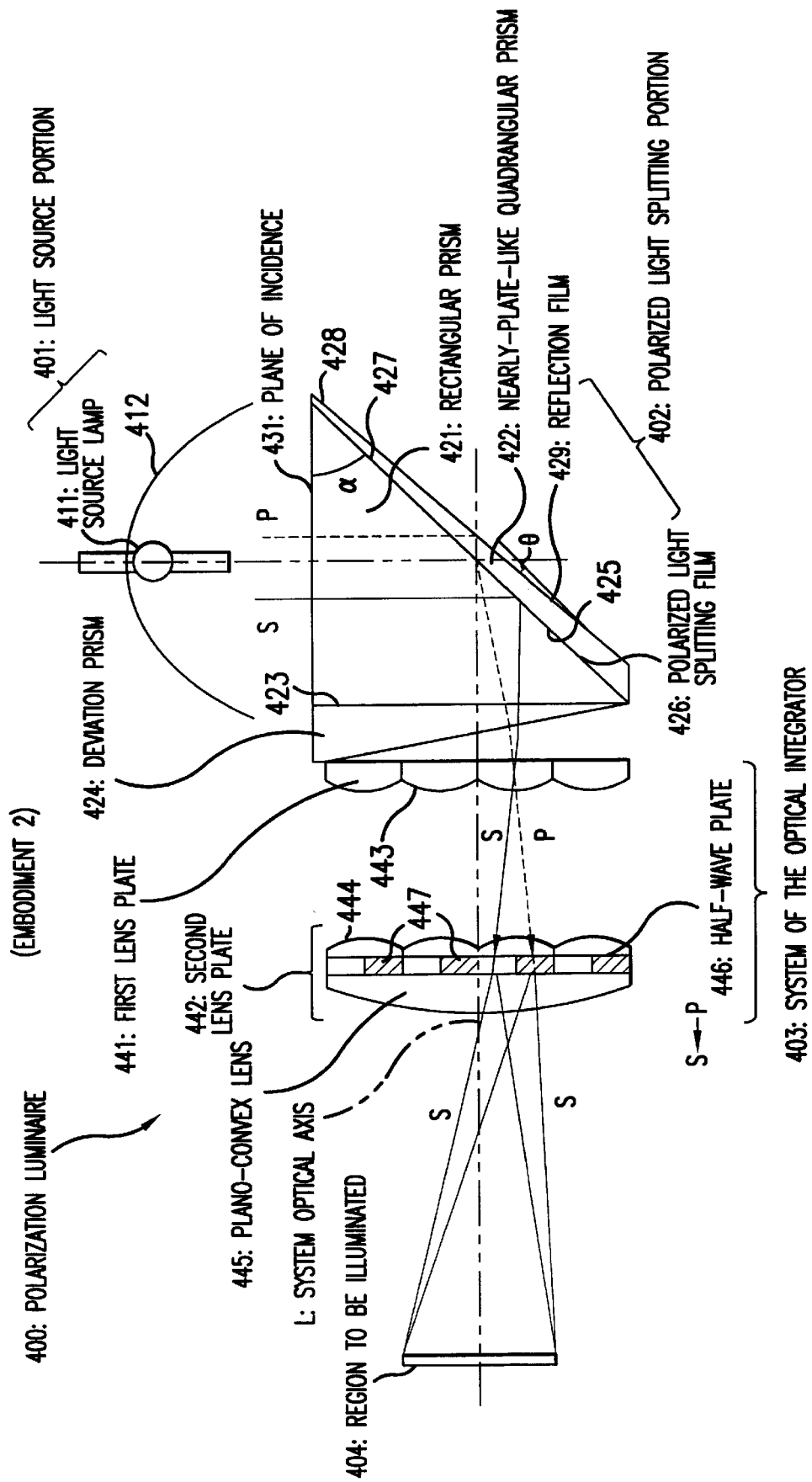
FIG. 4(A) is a schematic diagram for schematically illustrating the configuration of an optical system thereof.

FIG. 4 shows a plan view of the general configuration of the polarization luminaire of this embodiment. As shown in FIG. 4(A), the polarization luminaire 400 of this embodiment has a light source portion 401, a polarized light splitting portion 402 and a system of the optical integrator 403, which are placed along a system optical axis L. This luminaire is set in such a way that light radiated from the light source portion 401 reaches a rectangular region 404 to be illuminated, through the polarized light splitting portion 402 and the system of the optical integrator 403.

The light source portion 401 is mostly composed of a light source lamp 411 and a paraboloidal reflector 412. Polarized lights having random polarization directions (hereunder referred to simply as randomly-polarized lights), which are radiated from the light source lamp 401, are reflected by the paraboloidal reflector 412 in a single direction and thus become a nearly parallel luminous flux that are then incident on the polarized light splitting portion 402. Here, note that an ellipsoidal reflector or a spherical reflector may be used in place of the paraboloidal reflector 412.

The polarized light splitting portion 402 is an improvement over ordinary beam splitters and is mostly composed of a triangle-pole-like rectangular prism (namely, a triangular prism) 421 and a flat quadrangular prism 422. In the case of this embodiment, a deviation prism 424 is optically bonded onto an exit surface 423 of the polarized light splitting portion 402.

Figure 4B:
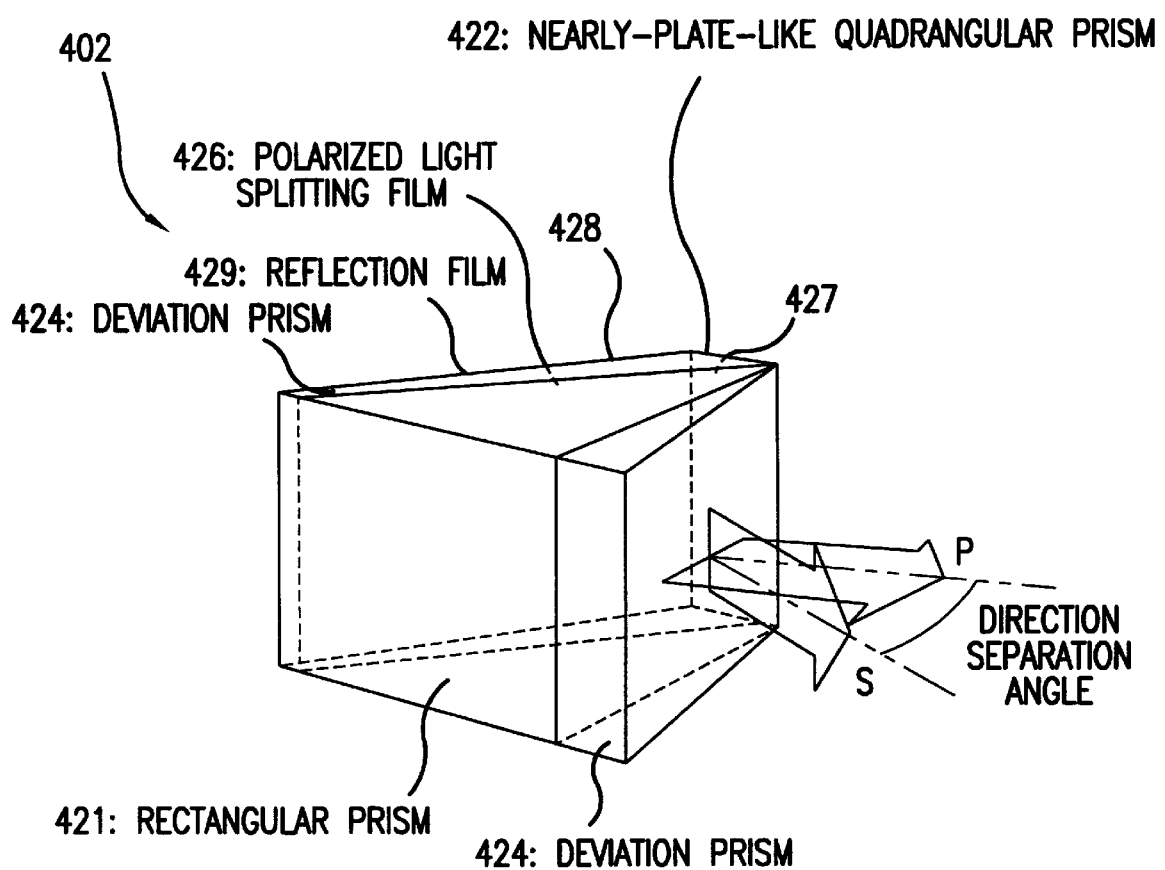
FIG. 4(B) is a diagram for illustrating the configuration of a polarized light splitting portion thereof.

As illustrated in FIG. 4(B), a polarized light splitting film 426 is formed on an inclined surface portion 425 of the rectangular prism 421. A first side-surface portion 427 of the quadrangular prism 422 is optically bonded onto the inclined surface portion 425 of the rectangular prism 421 in such a way that this polarized light splitting film 426 is sandwiched between these prisms. A reflection film 429 is formed on a second side-surface portion 428, which is opposite to the first side-surface portion 427 thereof, of the quadrangular prism 422. The polarized light splitting film 426 is formed in such a manner as to be inclined at an angle α to a entrance surface 431 of the polarized light splitting portion 402. In the case of this embodiment, the angle α is 45 degrees. The reflection film 429 is formed in such a way as to be inclined at an angle θ to the polarized light splitting film 426. Incidentally, the angle a formed between the polarized light splitting film 426 and the entrance surface 431 is not limited to 45 degrees and may be set according to the angle of incidence of a light flux radiated from the light source portion 401.

In the case of this embodiment, the rectangular prism 421 and the quadrangular prism 422 are made of a thermally stable glass material. The polarized light splitting film 426 is constituted by a dielectric multi-layer film made of an inorganic material. The reflection film 429 is constituted by an ordinary aluminum evaporation film.

The system of the optical integrator 403 having the first lens plate 441 and the second lens plate 442 is placed therein as a stage subsequent to the polarized light splitting portion 402 and the deviation prism 424. As above described by referring to FIG. 1(B), each of the first lens plate 441 and the second lens plate 442 is a composite lens element having microlenses 443 and 444 which number is equal to each other. Here, note that each of the microlenses of the first lens plate 441 has a laterally elongated rectangular shape similar to that of the region 404 to be illuminated.

Moreover, in the case of this embodiment, in the second lens plate 442, a half-wave plate 446 acting as the polarization conversion element is formed between a set of the microlenses 444 and a plano-convex lens 445. The half-wave plate 446 is formed at a position at which a secondary light source image is formed by the first lens plate 441, in such a manner as to extend in a direction perpendicular to the system optical axis L, after performing a process which will be described later. Further, retardation layers 447 formed in the half-wave plate 446 are formed in such a manner as to correspond to positions at which secondary light source images are formed from the p-polarized light among the secondary images formed from the s-polarized light and the p-polarized light, with regularity.

In the polarization luminaire 400 having such a configuration, randomly-polarized lights are radiated from the light source portion 401 and are then incident on the polarized light splitting portion 402, as illustrated in FIG. 4(A). The randomly-polarized lights having been incident on the polarized light splitting portion 402 can be considered as mixed-lights of p-polarized lights and s-polarized lights. In the polarized light splitting portion 402, the mixed-lights are separated laterally (incidentally, vertically as viewed in FIG. 4(A)) by the polarized light splitting film 426 into two kinds of polarized lights, namely, the p-polarized lights and the s-polarized lights. Namely, a s-polarized light component included in the randomly-polarized light is reflected by the polarized light splitting film 426, so that a traveling direction is changed. In contrast, a p-polarized light component included therein is transmitted by the polarized light splitting film 426 without any change and is first reflected by the reflection film 429. Here, the reflection film 429 is formed in such a way as to be inclined at an angle θ to the polarized light splitting film 426. The traveling directions of the two kinds of the polarized lights are made to be slightly different from each other by an angular difference 2θ in the transverse direction (which corresponds to the vertical direction as viewed in FIG. 4(A), namely, corresponds to the longitudinal direction of the region 404 to be illuminated) when these polarized lights are transmitted by the prisms made of glass materials, respectively.

Further, when exiting from the deviation prism 424, the outgoing angles of the two kinds of the polarized lights, whose traveling directions are made to be slightly different from each other, are set in such a way that these polarized lights have the angles of incidence which are nearly symmetrical with respect to the system optical axis L in the transverse direction. These polarized lights are caused to be incident on the system of the optical integrator 403 while being in such states.

In the system of the optical integrator 403, the two kinds of the polarized lights are incident on the first lens plate 441 and then forms secondary light source images in the second lens plate 442, respectively. At the position where the secondary light source images are formed, the half-wave plate 446 is placed.

Here, in the polarized light splitting portion 402, the traveling directions of the two kinds of polarized lights are made to be slightly different from each other in the transverse direction. Thus, the angles of incidence of the two kinds of polarized lights entering the first lens plate 441 are slightly different from each other. Therefore, as illustrating the secondary light source images formed from the two kinds of polarized lights in FIG. 4(C) in the case that the second lens plate 442 is viewed from the region 404 to be illuminated, two kinds of secondary light source images, that is, one kind of secondary light source images C1 (namely, circular regions hatched with parallel slanting lines drawn from upper-left to lower-right, among circular images) which is formed from a p-polarized light, and the other kind of secondary light source images C2 (namely, circular regions hatched with parallel slanting lines drawn from lower-left to upper-right, among the circular images) which is formed from an s-polarized light, are formed side by side. Further, each of the microlenses 443 composing the first lens plate 441 forms one secondary light source image C1 resulted from a p-polarized light and the other secondary light source images C2 resulted from an s-polarized light. In contrast with this, in the half-wave plate 446, the retardation layer 447 is selectively formed correspondingly to a position where the secondary light source image C1 resulted from the p-polarized light. Thus, when passing through the retardation layer 447, the p-polarized light undergoes a rotatory polarization to be converted into the s-polarized light. On the other hand, the s-polarized light does not pass through the retardation layer 447 and thus passes through the half-wave plate 446 without undergoing the rotatory polarization. Consequently, most of luminous fluxes radiated from the system of the optical integrator 403 are made to be s-polarized lights.

The luminous fluxes, which have been made to be s-polarized light, are applied to the region 404 to be illuminated. Namely, images of image planes extracted by the microlenses 443 of the first lens plate 441 are formed at a single place by the second lens plate 442 in such a manner as to be superposed thereon. Further, when passing through the half-wave plate 446, the lights are converted into polarized lights of a single kind. Thus most of the lights reach the region 404 to be illuminated. Consequently, the region 404 to be illuminated is uniformly illuminated with the polarized lights, most of which are of the single kind.

As above described, in the case of the polarization luminaire 400 of this embodiment, a randomly-polarized light radiated from the light source portion 401 is split by the polarized light splitting portion 402 into two kinds of polarized lights which travel in different directions. Thereafter, each of the two kinds of polarized lights is led to a predetermined region of the half-wave plate 446, whereupon a p-polarized light is converted into an s-polarized light. Thus, the randomly-polarized lights radiated from the light source portion 401 can be applied to the region to be illuminated, while most of the polarized lights are in a state in which these beams are made to be s-polarized lights.

Moreover, high ability of the polarized light splitting portion 402 -to split polarized light is necessary for leading each of the two kinds of polarized lights to the predetermined region of the half-wave plate 446. In the case of this embodiment, the polarized light splitting portion 402 is constituted by utilizing the prisms made of glass and the dielectric multi-layer film made of an inorganic material. Thus, the polarized light splitting ability of the polarized light splitting portion 402 is thermally stable. The polarized light splitting portion 402, therefore, exerts the stable polarized light splitting ability at all times even in the case that the luminaire is required to output a large quantity of light. Consequently, the polarization luminaire having satisfactory ability can be realized.

Furthermore, the deviation prism 424 is bonded to the exit surface 423 of the polarized light splitting portion 402 between this portion 402 and the system of the optical integrator 403 and is thus formed in such a manner as to be integral with the polarized light splitting portion 402. Consequently, the loss of the light due to the optical reflection caused on the interface between the rectangular prism 421 and the deviation prism 424 can be reduced.

Further, in the case of this embodiment, the two kinds of polarized lights radiated from the polarized light splitting portion 402 are separated in the transverse direction, so that the shapes of the microlenses 444 of the second lens plate 442 are laterally elongated rectangles. Thus, even in the case that the region 404 to be illuminated, whose shape is a laterally elongated rectangle, is formed, no quantity of light is wasted. Here, note that the use of the region 404 to be illuminated, whose shape is a laterally elongated rectangle, has advantages in that, for example, when such a region is used for displaying various kinds of images, the displayed images can be seen more easily and appeal more strongly than those whose shapes are longitudinally elongated rectangle.

Incidentally, the plano-convex lens 44S is disposed on the exit side of the second lens plate 442 in order to lead luminous fluxes, which go out from the second lens plate 442, to the region 404 to be illuminated. Consequently, the plano-convex lens 445 can be omitted by using a decentered lens as the second lens plate 442.

Additionally, in the case of this embodiment, the retardation layer 447 of the half-wave plate 446 is formed at a position where the p-polarized light is condensed. Conversely, the retardation layer 446 can be formed at a position where the s-polarized light is condensed. In this case, s-polarized light is converted into p-polarized light, so that the polarized lights having been put into a state, in which the polarized lights are made to be p-polarized lights, can be applied to the region 404 to be illuminated. Further, the position, at which the half-wave plate 446 is placed, is not limited to those between the microlens 449 and the plano-convex lens 445. The half-wave plate 446 may be placed at another position as long as this position is in the vicinity of a position where a secondary light source image is formed.

Moreover, the two retardation layers, which have different characteristics, may be placed at a position at which p-polarized light is condensed and at a position at which s-polarized light is condensed, respectively, to be made the lights that have a single specific polarization direction.

Figure 4C:
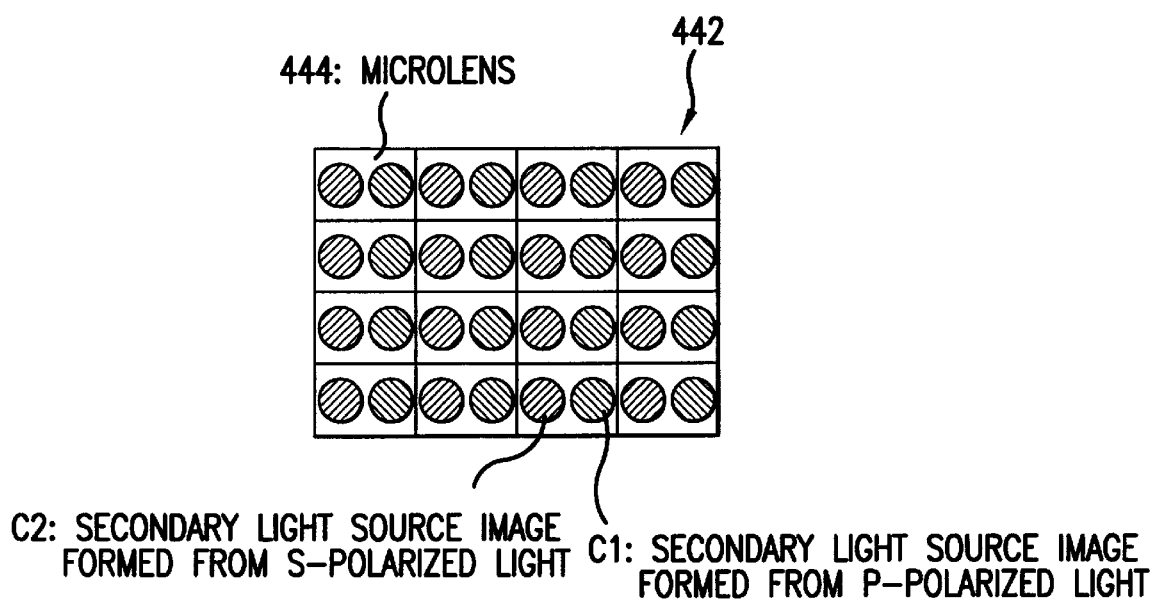
FIG. 4(C) is a diagram for illustrating a secondary light source image formed on a second lens plate thereof.

Incidentally, in the case of this embodiment, each of the microlenses 443 of the first lens plate 441 is a laterally-elongated rectangular lens. In contrast, there is no limitation to the shape of each of the microlenses 444 of the second lens plate 442. Incidentally, because the secondary light source image C1, which is formed from the p-polarized light, and the secondary light source image C2, which is formed from the s-polarized light, are formed side by side in the transverse direction as illustrated in FIG. 4(C), the shape of each of the microlenses 444 of the second lens plate 442 may be a laterally-elongated rectangle similar to that of each of the microlenses 443 of the first lens plate 441, correspondingly to the positions where such images are formed.

Embodiment 3

In Embodiment 2, the deviation prism 424 is disposed in order to set the outgoing direction of each of the two kinds of polarized lights to be a predetermined direction. Thus, the position, at which the deviation prism 424 is placed, is not limited to a position on the exit side of the polarized light splitting portion but may be a position on the entrance side thereof, namely, may be a position on the side of the light source portion, or a position adjacent to the first lens plate of the system of the optical integrator.

Figure 5:
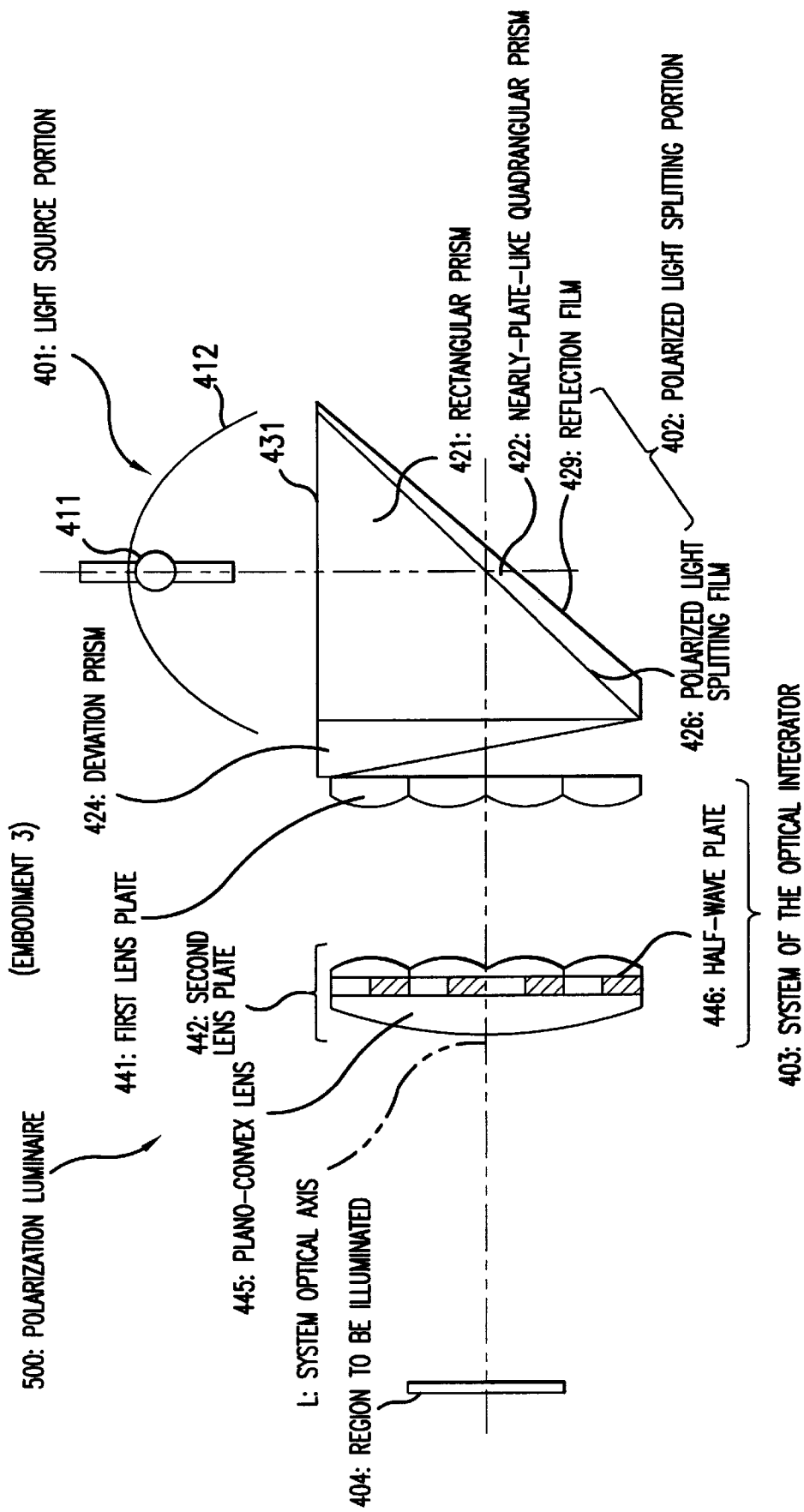
FIG. 5 is a schematic diagram for schematically illustrating an optical system of a polarization luminaire embodying the present invention, namely, Embodiment 3 of the present invention.

Namely, the polarization luminaire may be configured as that of Embodiment 3 illustrated in FIG. 5. The basic configuration of each of this polarization luminaire and embodiments, which will be described hereinbelow, is similar to that of the polarization luminaire of Embodiment 2. Therefore, same reference characters designate parts having same functions. Further, the descriptions of such parts will be omitted.

In the case of a polarization luminaire 500 illustrated in FIG. 5, the deviation prism 424 is similarly placed between the polarized light splitting portion 402 and the system of the optical integrator 403. The deviation prism 424, however, is bonded to the first lens plate 441 of the system of the optical integrator 403 and is formed in such a manner as to be integral with the system of the optical integrator 403. Consequently, the loss of the light due to the optical reflection caused on the interface between the deviation prism 424 and the first lens plate 441 can be reduced.

Embodiment 4

Figure 6:
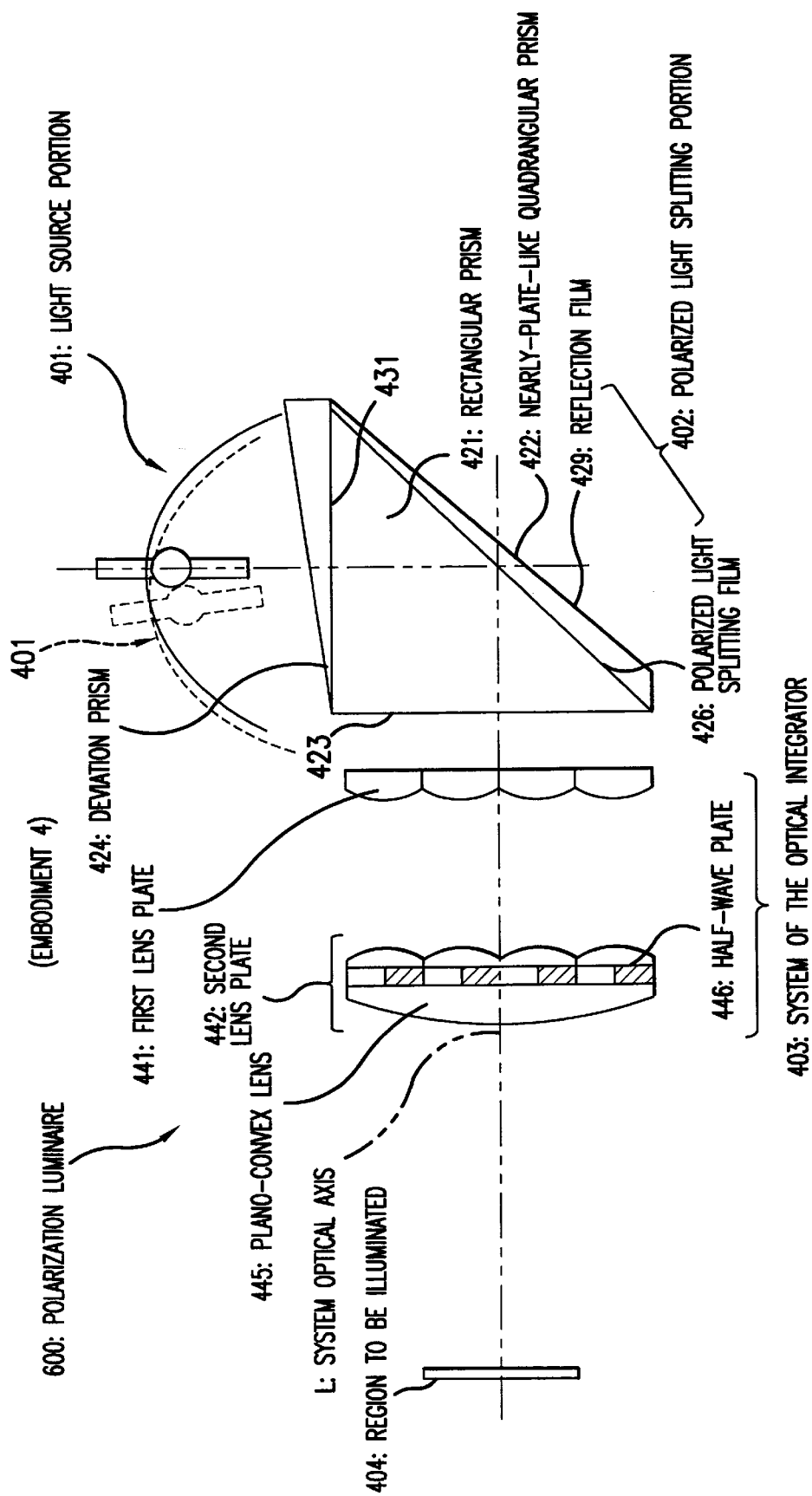
FIG. 6 is a schematic diagram for schematically illustrating an optical system of a polarization luminaire embodying the present invention, namely, Embodiment 4 of the present invention.

Further, similarly as in the case of a polarization luminaire 600 illustrated in FIG. 6, the deviation prism 424 is placed between -the polarized light splitting portion 402 and the light source portion 401. Moreover, the deviation prism 424 is bonded to the entrance surface 431 of the polarized light splitting portion 402 and may be integral with the polarized light splitting portion 402. In this case, the loss of the light due to the optical reflection caused on the interface between the deviation prism 424 and the rectangular prism 421 can be reduced. Furthermore, in the case of such a configuration, the first lens plate 441 of the system of the optical integrator 403 is connected to the exit surface 423 of the polarized light splitting portion 402. Thus, the deviation prism 424, the polarized light splitting portion 402 and the system of the optical integrator 403 may be formed in such a manner as to be integral with one another. In this case, the loss of the light due to the optical reflection caused on the interface therebetween can be further reduced.

Incidentally, the deviation prism 424 can be omitted if the direction, along which the light source portion 401 extends, is slightly inclined to the system optical axis L, as indicated by dashed lines.

Embodiment 5

Figure 7:
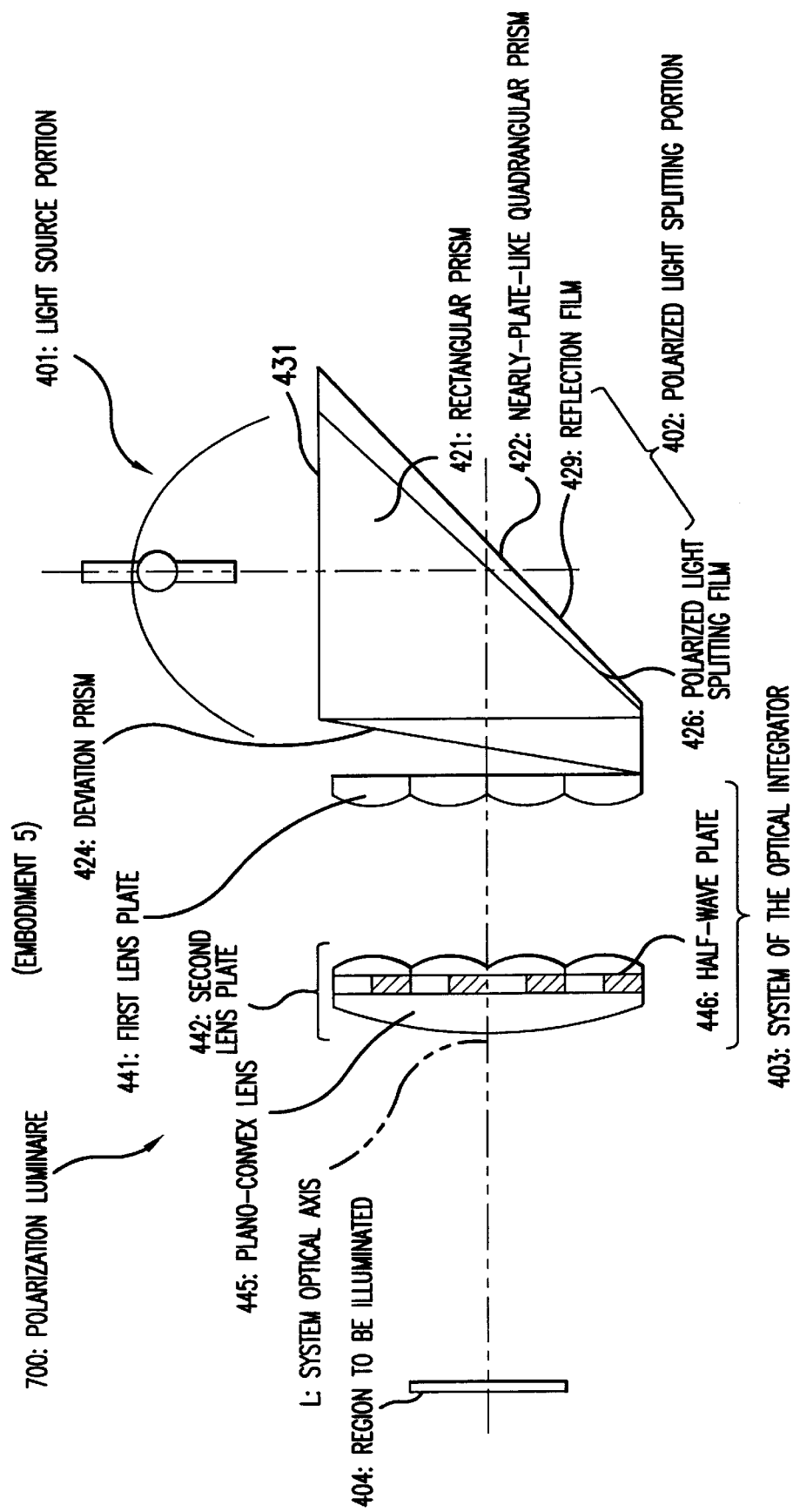
FIG. 7 is a schematic diagram for schematically illustrating an optical system of a polarization luminaire embodying the present invention, namely, Embodiment 5 of the present invention.

Incidentally, in the case of a polarization luminaire 700 illustrated in FIG. 7, in the polarized light splitting portion 402, the angle formed between the entrance surface 431 and the polarized light splitting film 426 is 45 degrees. In the case that the angle formed between the entrance surface 431 and the polarized light splitting film 426 is not more than 45 degrees, the deviation prism 424 has only to be turned to a direction that is opposite to that illustrated in FIG. 4(A). Therefore, even if the configuration of the polarized light splitting portion 402 changes, it is unnecessary to change the configuration of the system of the optical integrator 403 which may be maintained.

Embodiment 6

Figure 8:
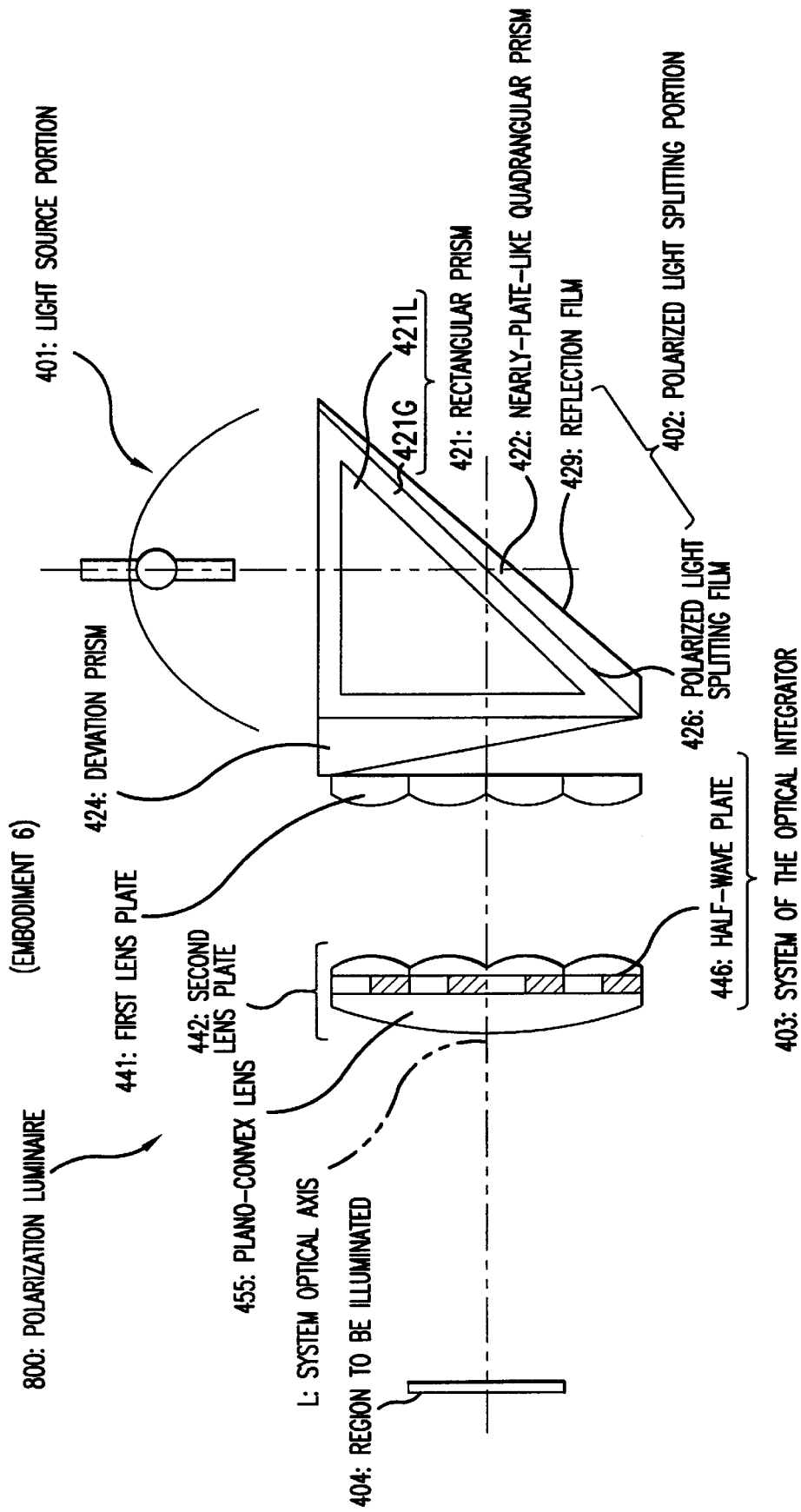
FIG. 8 is a schematic diagram for schematically illustrating an optical system of a polarization luminaire embodying the present invention, namely, Embodiment 6 of the present invention.

In the case of a polarization luminaire 800 illustrated in FIG. 8, the disposition of optical systems is similar to that in the case of Embodiment 2. The rectangular prism 421 (namely, the triangular prism), which compose the polarized light splitting portion 402 with the quadrangular prism 422, consists of a prism structure element 421G, which has six transparent plates composing the walls of this prism, and liquid 421L with which the inside of the prism structure element 421G is filled. Thus, the cost of the rectangular prism 421 can be lowered. Further, the weight of the rectangular prism 421 can be reduced by filling the inside of the prism structure element 421F with liquid having a small specific gravity as the liquid 421L.

Similarly, in the case that a portion sandwiched between the polarized light splitting film 426 and the reflection film 429, namely, the inside of the quadrangular prism 422 is filled with transparent liquid, the cost and weight of the quadrangular prism can be reduced.

Embodiment 7

Figure 9:
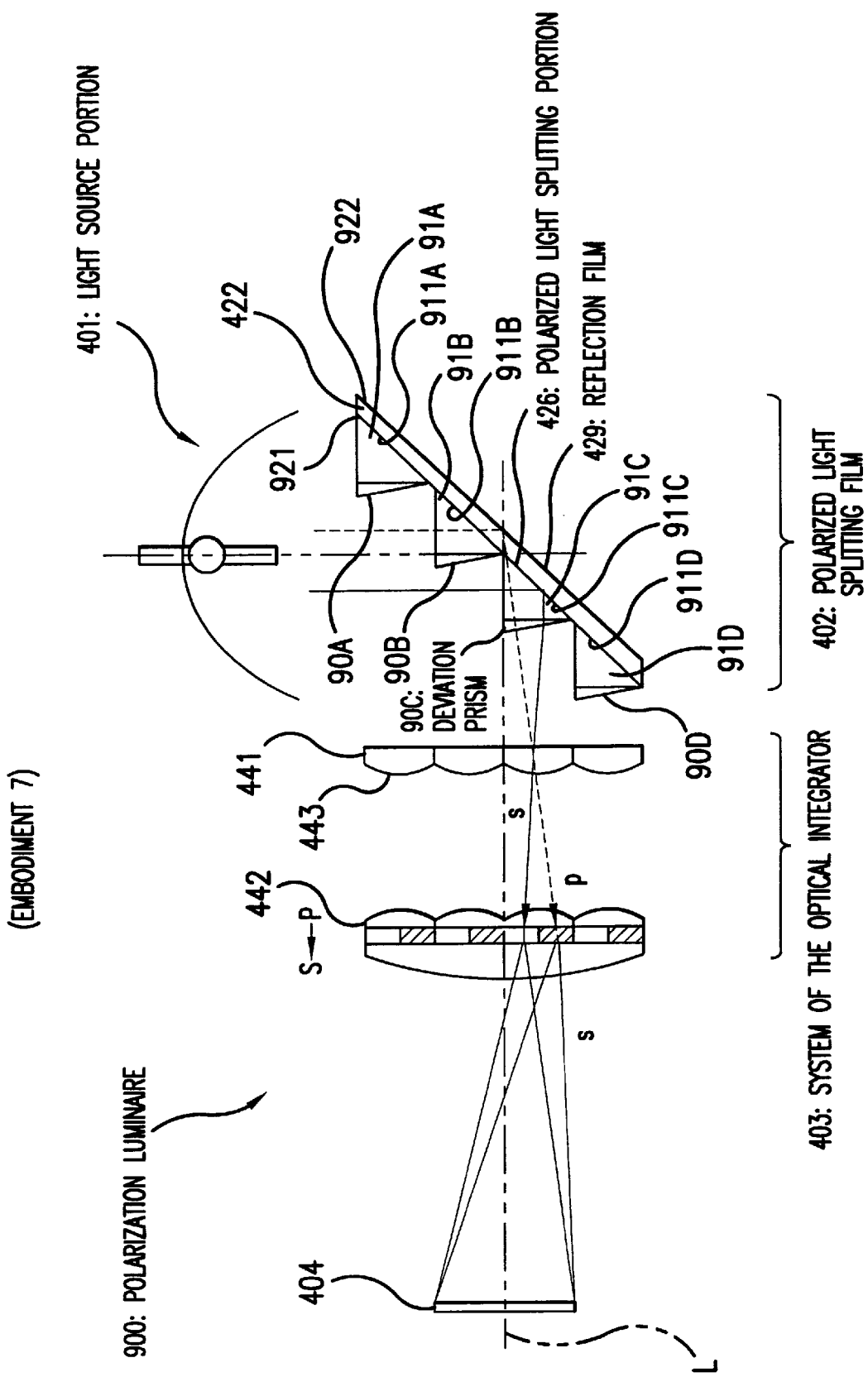
FIG. 9 is a schematic diagram for schematically illustrating an optical system of a polarization luminaire embodying the present invention, namely, Embodiment 7 of the present invention.

The polarized light splitting portion 402 of a polarized light splitting device 900 illustrated in FIG. 9 uses a plate-like quadrangular prism 422 that has two opposite side-surface portions, namely, a first side-surface portion 921, on which the polarized light splitting film 426 is formed, and a second side-surface portion 922 on which a reflection film 429 is formed. Inclined surface portions 911A, 911B, 911C and 911D of small rectangular prisms (namely, triangular prisms) 91A, 91B, 91C and 91D are bonded to the first side-surface portion 921 of the quadrangular prism 422 in such a manner that the polarized light splitting film 426 is sandwiched between the first side-surface portion 921 and each of the inclined surface portions 911A, 911B, 911C and 911D. Small deviation prisms 90A, 90B, 90C and 90D are bonded to the exit surface of the polarized light splitting portion 402, namely, to the exit surface of each of the rectangular prisms 91A, 91B, 91C and 91D. Here, note that the number of the rectangular prisms 91A, 91B, 91C and 91D is not necessarily equal to that of the microlenses 443 aligned in the direction of width of the first lens plate 411.

With such a configuration in which the rectangular prisms 91A to 91D and the deviation prisms 90A to 90D can be small in size in spite of a large number of these prisms, the weight and cost of the entire device can be reduced.

Embodiment 8

Figure 10:
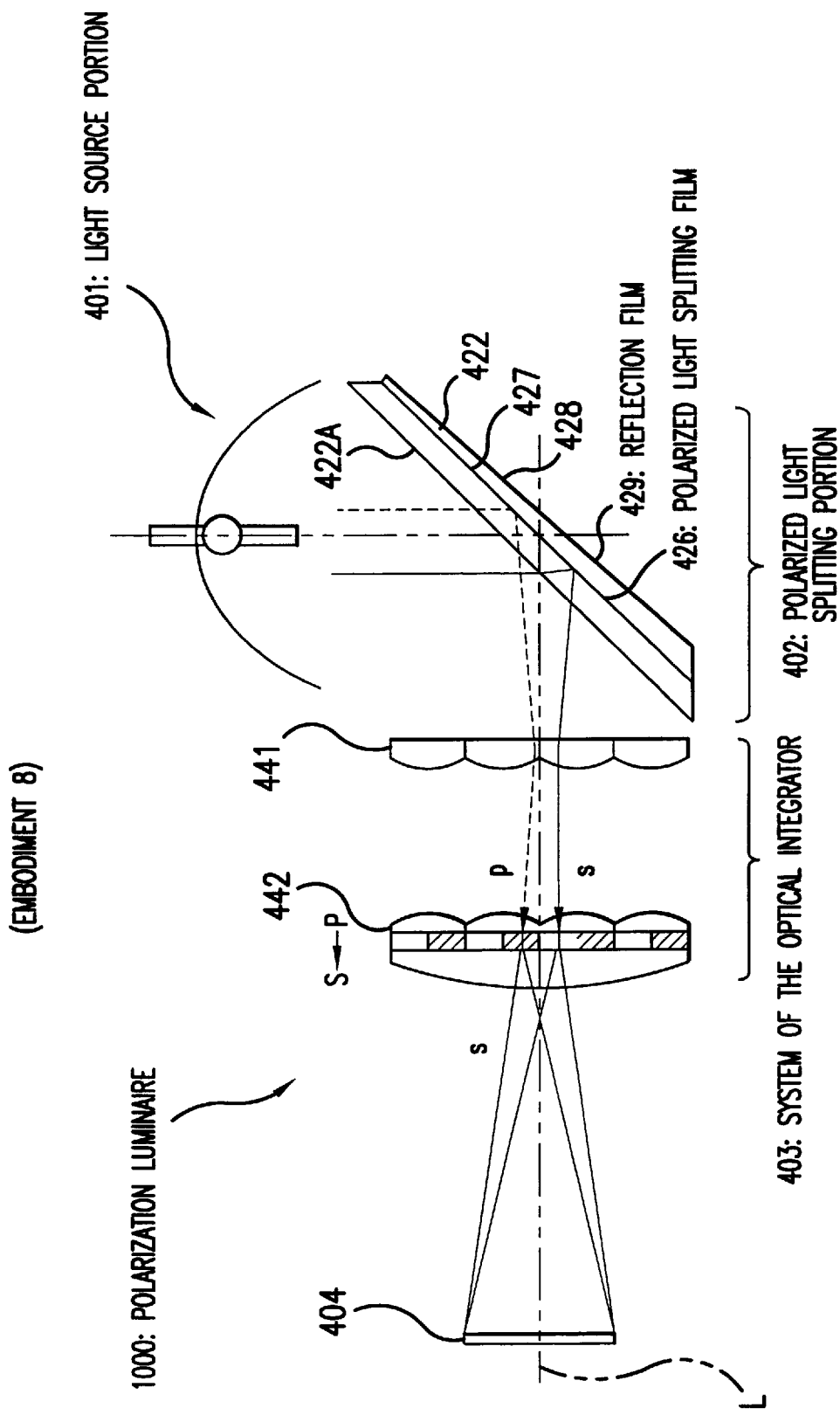
FIG. 10 is a schematic diagram for schematically illustrating an optical system of a polarization luminaire embodying the present invention, namely, Embodiment 8 of the present invention.

The polarized light splitting portion 402 of a polarization luminaire 1000 illustrated in FIG. 10 has: a first plate-like quadrangular prism 422 that has two opposite side-surface portions, namely, a first side-surface portion 427, on which the polarized light splitting film 426 is formed, and a second side-surface portion 428 on which a reflection film 429 is formed; and a second quadrangular prism 422A which is integral with the first quadrangular prism 422 in such a way that the polarized light splitting film 426 is sandwiched between the first quadrangular prism 422 and the second quadrangular prism 422A. In the case of the polarization luminaire 1000 constructed in this way, the polarized light splitting portion 402 can be composed of first and second thin quadrangular prisms 422 and 422A. Consequently, the weight of this portion can be reduced.

Embodiment 9

Figure 11:
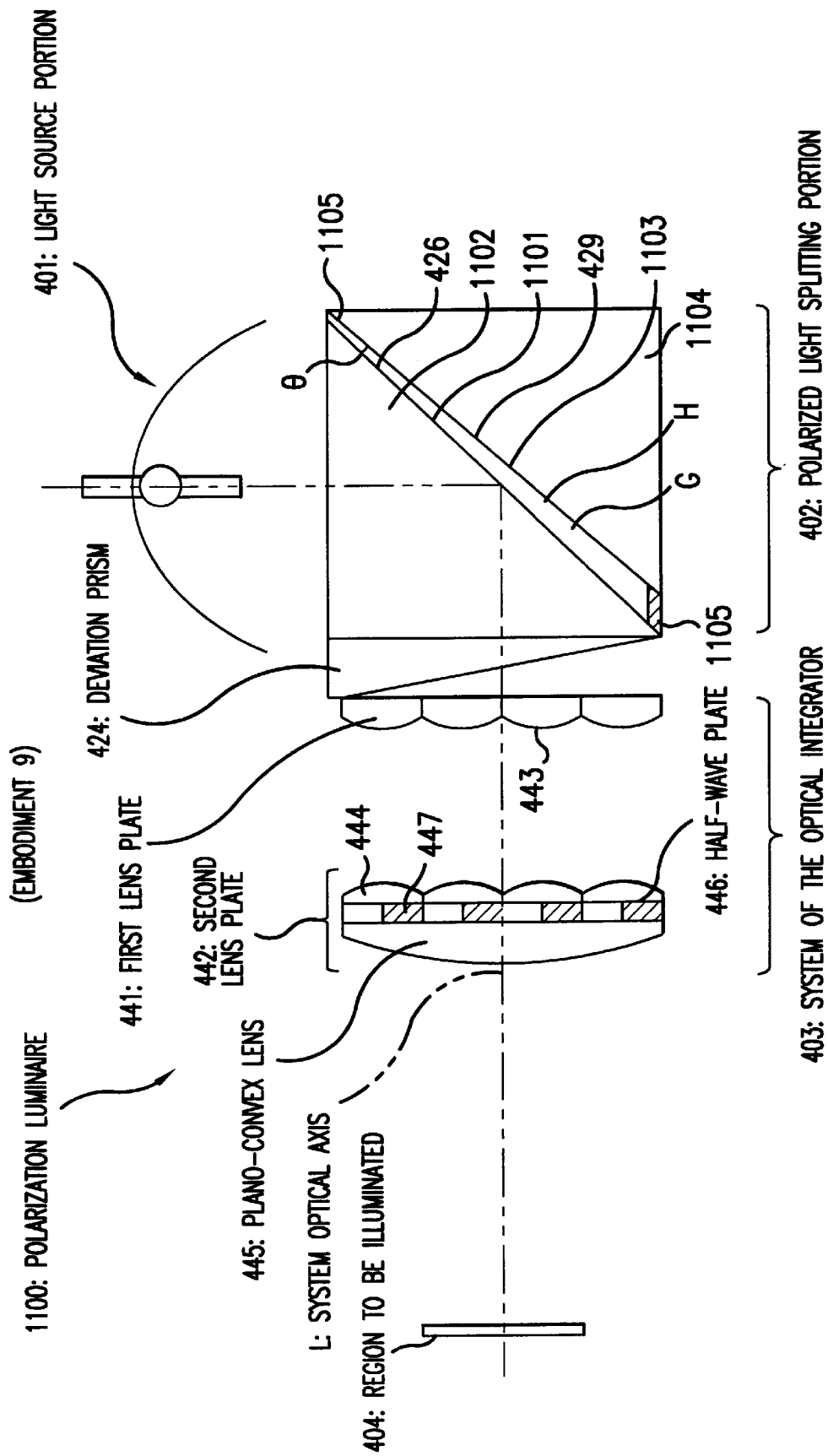
FIG. 11 is a schematic diagram for schematically illustrating an optical system of a polarization luminaire embodying the present invention, namely, Embodiment 9 of the present invention.

The polarized light splitting portion 402 of a polarization luminaire 1100 illustrated in FIG. 11 uses a first triangular prism 1102, on the inclined surface of which the polarized light splitting film 426 is formed, and a second triangular prism 1104, on the inclined surface of which the reflection film 429 is formed. The first triangular prism 1102 and the second triangular prism 1104 are fixed by using frames (not shown) or the like in such a way that there is formed a predetermined gap G between the inclined surface portion 1101 (on which the polarized light splitting film 426 is formed) and the inclined surface portion 1103 (on which the reflection film 429 is formed), and are integral with each other. Hereat, the inside of the gap G is filled with liquid H. Moreover, the liquid H is held in the gap G by a sealing compound 1105.

In the case of the polarization luminaire 1100 constructed in this manner, the gap G can be arbitrarily narrowed, differently from the case that a gap between the polarized light splitting film 426 and the reflection film 429 is secured and a predetermined angle θ is formed by utilizing the thickness of the prism as in Embodiment 2 or 8. Thus this embodiment has an advantage in that the loss of light can be decreased.

Embodiment 10

FIG. 12 is a diagram for schematically illustrating a plan view of the configuration of a primary part of a polarization luminaire of Embodiment 10 and for illustrating an external view of the configuration of prisms used in the polarized light splitting portion of this polarization luminaire.

Figure 12A:
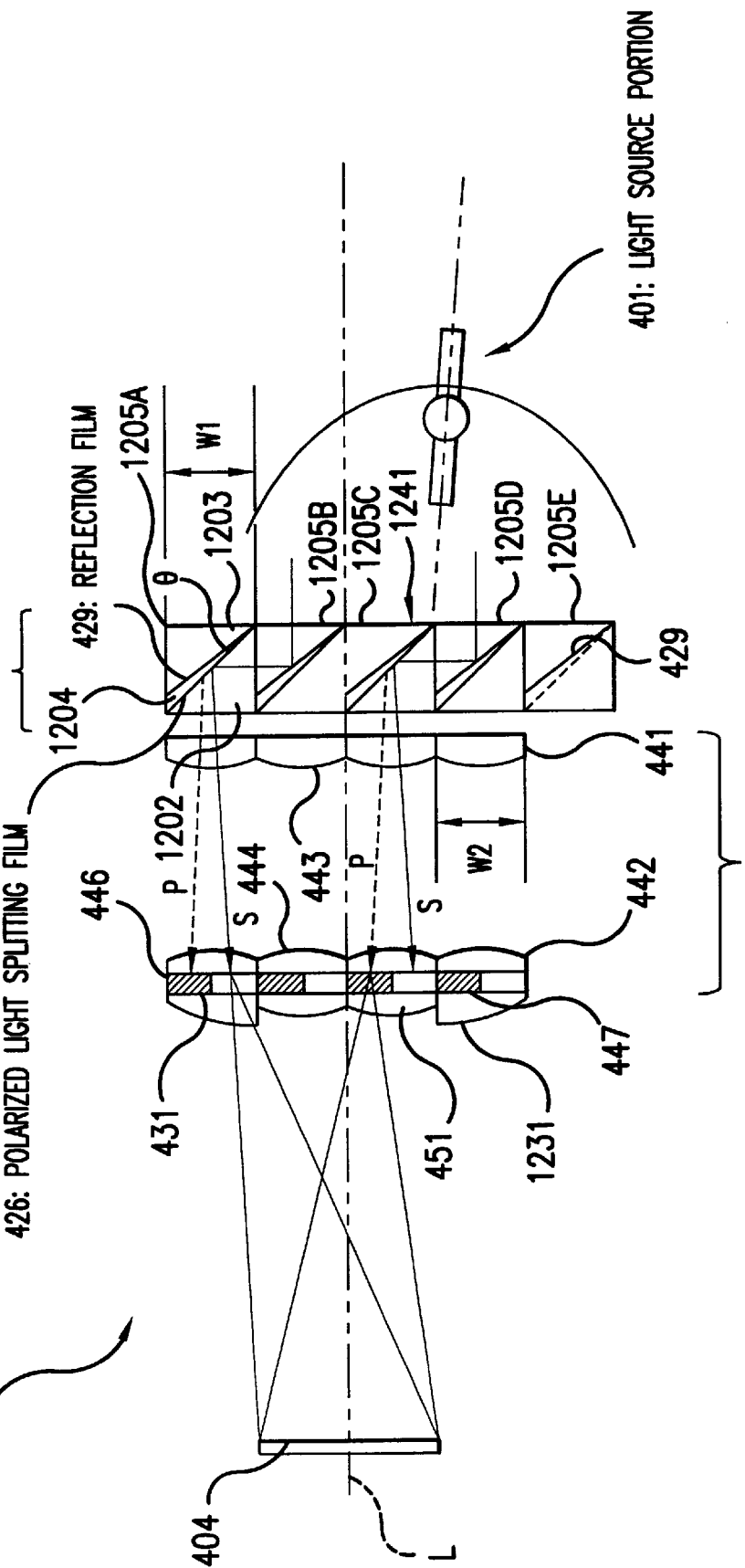
FIG. 12(A) is a schematic diagram for schematically illustrating the configuration of an optical system thereof.

As shown in FIG. 12(A), similarly as in the case of the polarization luminaire of Embodiment 2, the polarization luminaire 1200 of this embodiment has a light source portion 401, a polarized light splitting portion 1201 and a system of the optical integrator 403, which are placed along a system optical axis L. This luminaire is established in such a manner that light radiated from the light source portion 401 reaches a rectangular region 404 to be illuminated, through the polarized light splitting portion 1201 and the system of the optical integrator 403. Incidentally, the light source portion 401 faces the rectangular region 404 to be illuminated, and the entire system optical axis L is -shaped like a straight line.

Similarly as in the case of Embodiment 2, the light source portion 401 is established in such a manner that randomly-polarized lights radiated from the light source lamp 411 are reflected by a paraboloidal reflector 412 in a single direction and thus become a nearly parallel luminous flux that is then incident on the polarized light splitting portion 1201. Here, note that the light source portion 401 faces in a direction that is tilted at a predetermined angle to the system optical axis L.

The polarized light splitting portion 1201 is composed of square-pole-like prism composite elements 1205A, 1205B, 1205C and 1205D, each of which consists of first and second rectangular prisms 1202 and 1203 (namely, triangular prisms) and a flat quadrangular prism 1204.

Figure 12B:
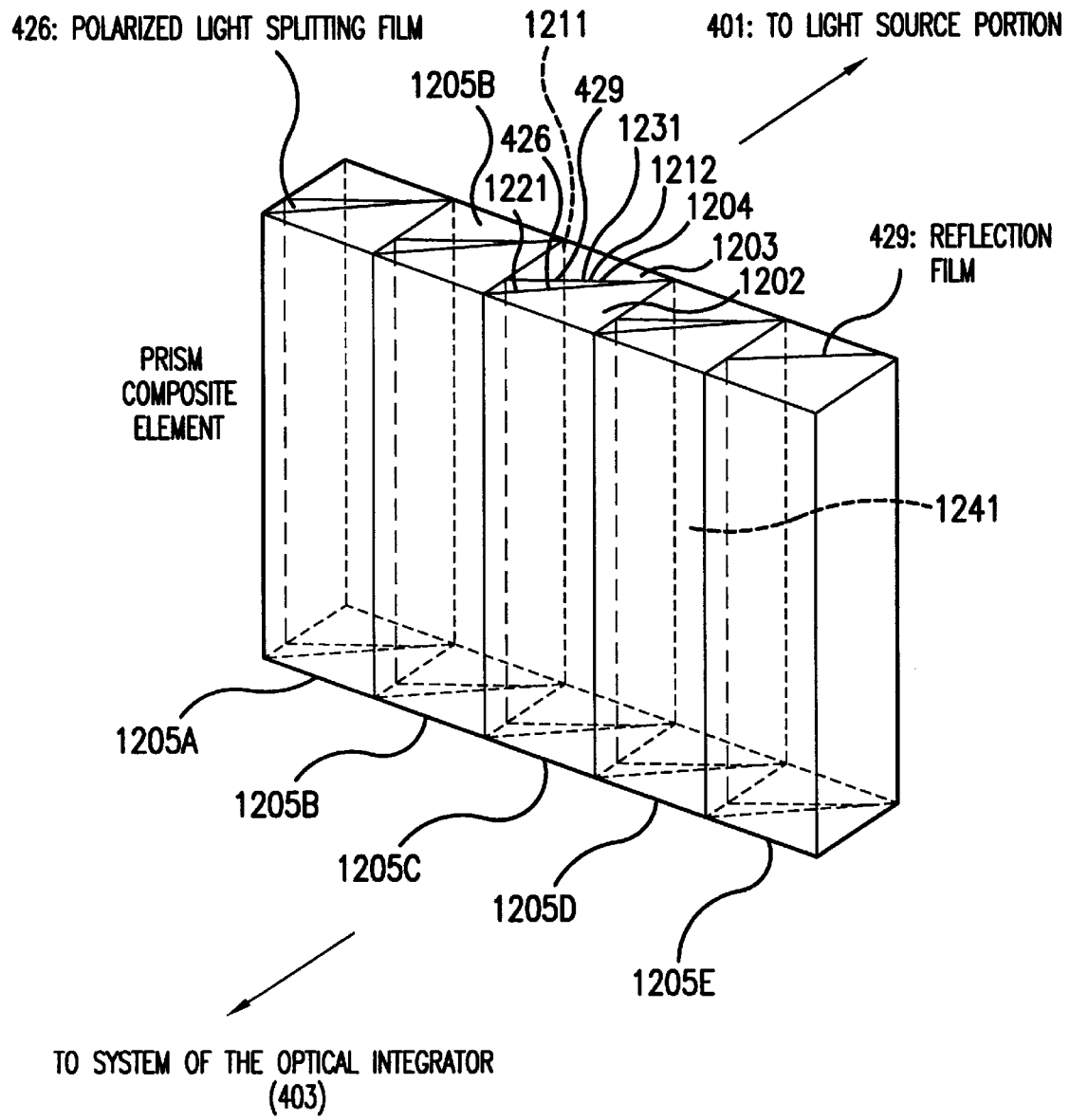
FIG. 12(B) is a diagram for illustrating the configuration of a polarized light splitting portion thereof.

As shown in FIG. 12(B), in the case of each of the prism composite elements 1205A to 1205D, the polarized light splitting film 426 is formed on one of the two opposed side-surface portions 1211 and 1212 of the quadrangular prism 1204, namely, on the first side-surface portion 1211. Further, the reflection film 429 is formed on the second side-surface portion 1212. The inclined surface portion 1221 of the first rectangular prism 1202 is bonded to the first side-surface portion 1211 of the quadrangular prism 1204 in such a way that the polarized light splitting film 426 is sandwiched between the portions 1211 and 1221. Furthermore, the inclined surface portion 1231 of the second rectangular prism 1203 is bonded to the second side-surface portion 1212 of the quadrangular prism 1204 in such a way that the reflection film 429 is sandwiched between the portions 1212 and 1231. Incidentally, the prism composite element 1205E has only the function of reflection the randomly-polarized light radiated from the light source portion 401. Thus, the polarized light splitting film 426 is not formed therein. Therefore, an optical component having another reflection function may be used instead of the prism composite element 1205E.

The square-pole-like prism composite elements 1205A to 1205E, which are configured in this manner, face in the same direction and are aligned in a line in the transverse direction that is perpendicular to the system optical axis L. Therefore, among the prism composite elements 1205A to 1205D, the polarized light splitting films 426 are parallel to one another and similarly, the reflection films 429 are parallel to one another.

Hereat, each of the polarized light splitting films 426 is formed in such a manner as to be inclined at an angle α to the entrance surface of the polarized light splitting portion 1201. In the case of this embodiment, the angle α is 45 degrees. Each of the reflection films 429 is formed in such a way as to be tilted at the angle θ to a corresponding one of the polarized light splitting films 426.

In the case of this embodiment, the first and second rectangular prisms 1202 and 1203 and the quadrangular prism 1204 are made of thermally stable glass materials. The polarized light splitting film 426 is made of a dielectric multi-layer film. The reflection film 429 is made of an ordinary aluminum evaporation film.

Referring again to FIG. 12(A), in the case of this embodiment, a direction in which a polarized light emitted from the polarized light splitting portion 1201 is regulated by directing the light source portion 401 in a direction which is tilted at a predetermined angle to the system optical axis L. Thus, a deviation prism is omitted.

In the case of this embodiment, as will be described later, a light radiated from the light source portion 401 passes through the polarized light splitting portion 1201 by being shifted in the transverse direction (namely, in the upward direction as viewed in FIG. 12(B)) by a distance which correspond to the width of each of the prism composite elements 1205A to 1205E. Therefore, the light source portion 401 is placed by being shifted in a direction (namely, in the downward direction as viewed in FIG. 12(B)), which is opposite to the direction in which the light is shifted, from the system optical axis L by a distance which correspond to the width of each of the prism composite elements 1205A to 1205E.

The system of the optical integrator comprising two lens plates, namely, the first lens plate 441 and the second lens plate 442 is disposed in a stage subsequent to the polarized light splitting portion 1201. Each of the first lens plate 441 and the second lens plate 442 is a composite lens element provided with microlenses 443 and microlenses 444 whose numbers are equal to each other. Each of the microlenses 443 is a rectangle correspondingly to the region 404 to be illuminated and has a shape similar to that of the region 404. Moreover, in the second lens plate 442, the half-wave plate 446 is formed between the microlenses 444 and the plano-convex lens 451 which is placed on the exit side. In the half-wave plate 446, the retardation layers 447 are formed at positions where secondary light source images are formed by the first lens plate 441. Further, the retardation layers 447 are regularly formed at positions, at each of which a secondary light source image is formed from one of an s-polarized light and a p-polarized light, namely, formed from the p-polarized light.

In the polarization luminaire 1200 having such a configuration, randomly-polarized lights are radiated from the light source portion 401 and are then incident on the polarized light splitting portion 402. The randomly-polarized lights having been incident on the polarized light splitting portion 402 are first reflected in the transverse direction by the reflection film 429. Then, the reflected lights are incident on the adjoining prism composite elements 1205A to 1205D. Here, the randomly-polarized lights can be considered as mixed-lights of p-polarized lights and s-polarized lights. Thus, the mixed-lights are separated laterally by the polarized light splitting film 426 into two kinds of polarized lights, namely, the p-polarized lights and the s-polarized lights. Namely, an s-polarized light component, which is included in the randomly-polarized light shifted to the prism composite elements 1205A to 1205D, is reflected by the polarized light splitting film 426, so that a traveling direction, in which the s-polarized light component travels, is changed. In contrast, a p-polarized light component included therein is transmitted by the polarized light splitting film 426 without any change and is first reflected by the reflection film 429. Here, the reflection film 429 is formed in such a way as to be inclined at an angle θ to the polarized light splitting film 426. The traveling directions of the two kinds of the polarized lights are made to be slightly different from each other by an angular difference 2θ in the transverse direction when these polarized lights are transmitted by the prisms made of glass materials, respectively.

Further, the two kinds of the polarized lights, whose traveling directions are made to be different from each other, are caused to be incident on the system of the optical integrator 403.

In the system of the optical integrator 403, the two kinds of the polarized lights, whose traveling directions are made to be slightly different from each other, are incident on the first lens plate 441 and then forms secondary light source images in the second lens plate 442, respectively. At the position where the secondary light source images are formed, the half-wave plate 446 is placed. Moreover, in the half-wave plate 446, the retardation layers 447 are selectively formed correspondingly to the positions where the secondary light source images are formed from the p-polarized lights. Thus, when passing through the retardation layers 447, the p-polarized lights undergo the rotatory polarization, so that the p-polarized light is converted into s-polarized light. On the other hand, the s-polarized light does not pass through the retardation layer 447 and thus passes through the half-wave plate 446 without undergoing the rotatory polarization. Consequently, most of light fluxes radiated from the system of the optical integrator 403 are made to be s-polarized lights. The fluxes of s-polarized lights obtained in this way are applied to the region 404 to be illuminated, by means of the decentered lens 1231.

As above described, in the case of the polarization luminaire 1200 of this embodiment, after a randomly-polarized light radiated from the light source portion 401 is split by the polarized light splitting portion 1201 into two kinds of polarized lights which travel in different directions, each of the two kinds of polarized lights is led to a predetermined region of the half-wave plate 446, whereupon a p-polarized light is converted into an s-polarized light. Thus, the polarization luminaire 1200 of this embodiment exerts the effects in that the randomly-polarized lights radiated from the light source portion 401 can be applied to the region 404 to be illuminated, while most of the polarized lights are in a state in which they are made to be s-polarized lights. Here, note that high ability of the polarized light splitting portion 1201 to split polarized light is necessary for leading each of the two kinds of polarized lights to the predetermined region of the half-wave plate 446. However, in the case of this embodiment, the polarized light splitting portion 1201 is constituted by utilizing the prisms made of glass and the dielectric multi-layer film. Thus, the polarized light splitting ability of the polarized light splitting portion 1201 is thermally stable. The polarized light splitting portion 1201, therefore, exerts the stable polarized light splitting ability at all times even in the case that the luminaire is required to output a large quantity of light. Consequently, the polarization luminaire having satisfactory ability can be realized.

Furthermore, in the case of this embodiment, the two kinds of polarized lights radiated from the polarized light splitting portion 1201 are separated in the transverse direction. Thus, the microlenses 444 of the second lens plate 442 are formed in such a manner that the shapes thereof are laterally elongated rectangles. Consequently, the region 404 to be illuminated, whose shape is a laterally elongated rectangle, can be formed without wasting any quantity of light. Here, note that the use of the region 404 to be illuminated, whose shape is a laterally elongated rectangle, has advantages in that, for example, when such a region is used for displaying various kinds of images, the displayed images are seen easily and appeal strongly in comparison with the case of using a projection pattern whose shape is a laterally elongated rectangle.

Example of Modification of Embodiment 10

Incidentally, Embodiment 10 is in a condition in which the width of each of the microlenses 44 of the first lens plate 441 is equal to that of each of the quadrangular prisms composite elements 1205A to 1205E. Namely, assuming that the width W1 of each of the prism composite elements 1205A to 1205E is expressed as (1/n) times the width W2 of each of the rectangular lenses 443 of the first lens plate 441 where n is an integer equal to or more than 1, such a condition is equivalent to the condition that n is equal to 1. As n is gradually increased to 2, 3, ..., the width of each of the prism composite elements 1205A to 1205E is decreased. Thus, the thickness of each of the prism composite elements 1205A to 1205E can be reduced.

Figure 13:
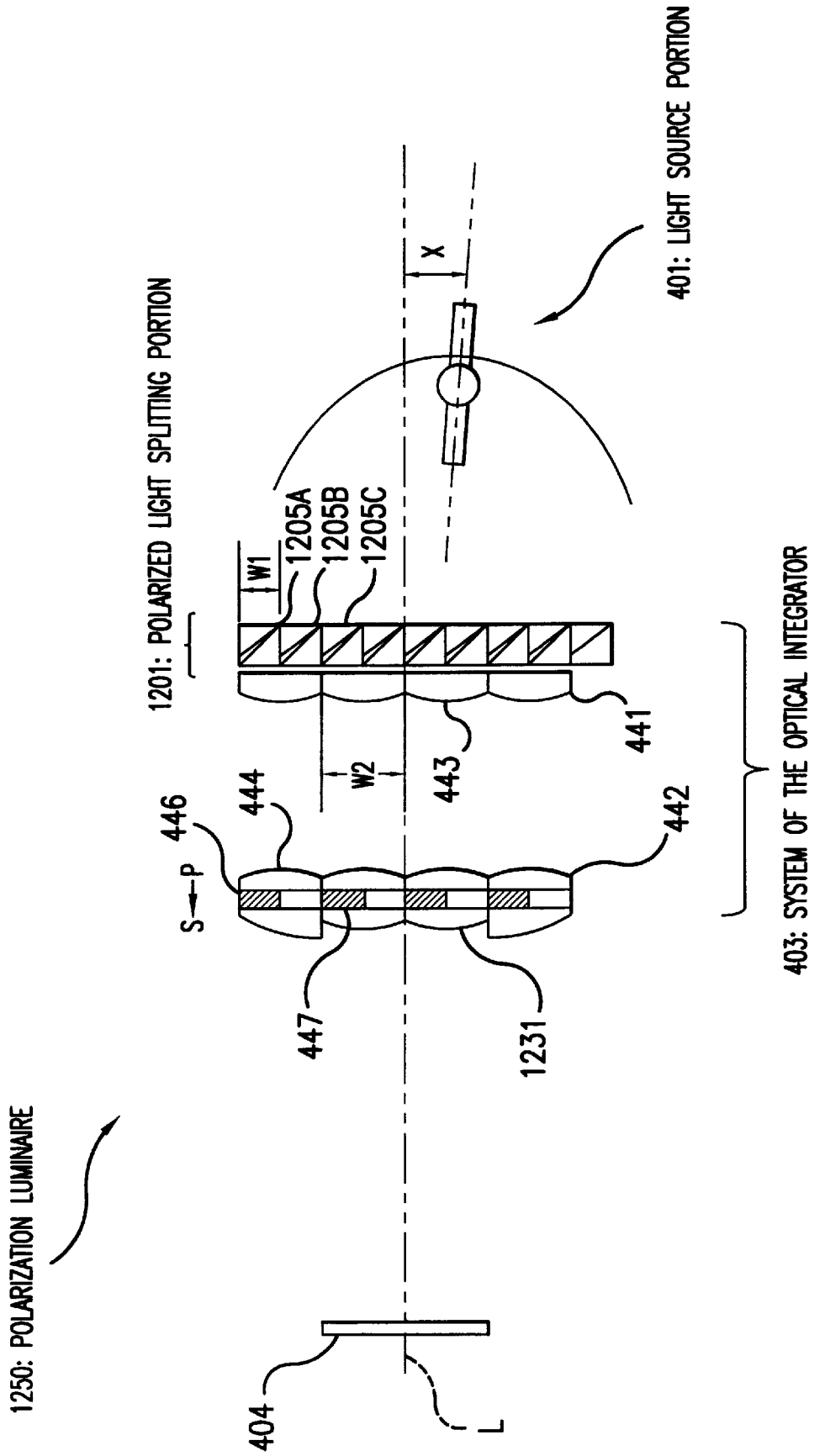
FIG. 13 is a schematic diagram for schematically illustrating an optical system of an example of the modification of a polarization luminaire embodying the present invention, namely, the modification of Embodiment 10 of the present invention.

For example, when n is set at 2, the polarized light splitting portion 1201 of the polarization luminaire 1250 becomes configured as illustrated in FIG. 13. Namely, the width W1 of each of the square-pole-like prism composite elements 1205A, 1205B, 1205C, . . . is as ½ times as the width W2 of each of the rectangular lenses 443 of the first lens plate 441. In this case, the thickness of the polarized light splitting portion 1201 can be reduced. Moreover, the distance X, by which the light source portion 401 is shifted from the system optical axis L, can be decreased.

In contrast, in the case of the embodiment illustrated in FIG. 12, the polarized light slitting portion 1201 is placed in the light source portion of the first lens plate 441. Instead of this, the polarized light slitting portion 1201 may be disposed between the first lens plate 441 and the second lens plate 442.

Embodiment 11

Figure 14:
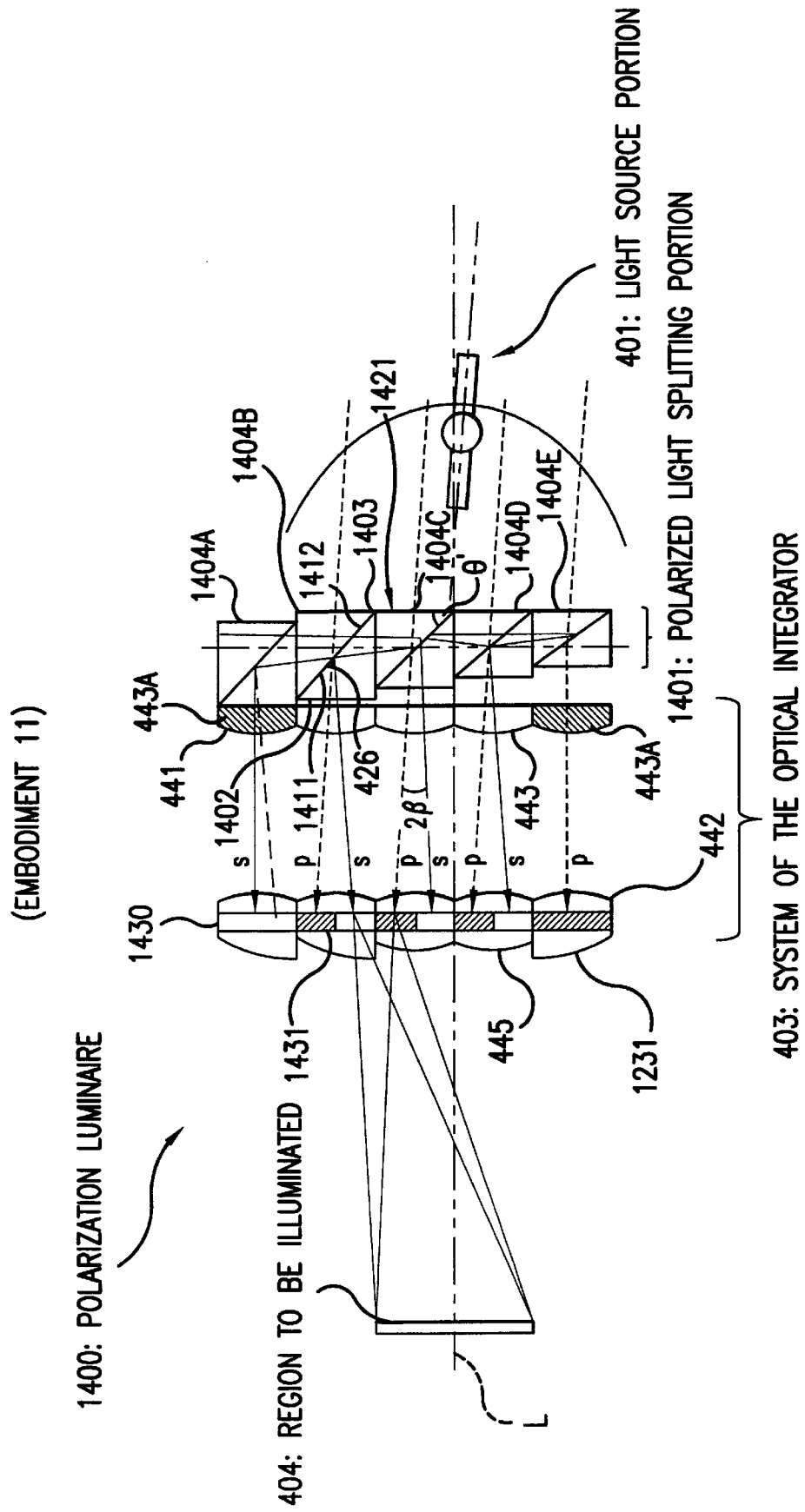
FIG. 14 is a schematic diagram for schematically illustrating an optical system of a polarization luminaire embodying the present invention, namely, Embodiment 11 of the present invention.

FIG. 14 is a schematic diagram for schematically illustrating a plan view of a primary part of a polarization luminaire of Embodiment 11. Similarly as in the case of the polarization luminaire of Embodiment 2, the polarization luminaire 1400 of this embodiment has a light source portion 401, a polarized light splitting portion 1401 and a system of the optical integrator 403, which are placed along a system optical axis L. This luminaire is established in such a manner that light radiated from the light source portion 401 reaches a rectangular region 404 to be illuminated, through the polarized light splitting portion 1401 and the system of the optical integrator 403. Incidentally, the light source portion 401 faces the rectangular region 404 to be illuminated, and the entire system optical axis L is shaped like a straight line.

Similarly as in the case of Embodiment 2, the light source portion 401 is established in such a manner that randomly-polarized lights radiated from the light source lamp 411 are reflected by a paraboloidal reflector 412 in a single direction and thus become a nearly parallel luminous flux that are then incident on the polarized light splitting portion 1401.

The polarized light splitting portion 1401 is composed of square-pole-like prism composite elements 1404A, 1404B, 1404C and 1404D, each of which comprises first and second rectangular prisms 1402 and 1403 (namely, triangular prisms).

In the case of each of the prism composite elements 1404A to 1404E, the polarized light splitting film 426 is formed on an inclined surface portion 1411 of the first rectangular prism 1402. The inclined surface portion 1412 of the second rectangular prism 1403 is bonded to the inclined surface portion 1411 of the first rectangular prism 1402 in such a way that the polarized light splitting film 426 is sandwiched between the portions 1411 and 1412. Incidentally, the prism composite element 1404A has only the function of reflecting s-polarized light separated by the prism composite element 1404B.

The square-pole-like prism composite elements 1404A to 1404E, which are configured in this manner, face in the same direction and are aligned in a line in the transverse direction that is perpendicular to the system optical axis L. Incidentally, in the case of this embodiment, the prism composite elements 1404A to 1404E have the same width but are different in thickness from one another. Therefore, the angles, which the prism composite elements 1404B to 1404E respectively make with the entrance surface 1421 of the polarized light splitting portion 1401, are slightly different from one another.

In the case of this embodiment, the first and second rectangular prisms 1402 and 1403 are made of thermally stable glass materials. The polarized light splitting film 426 is made of a dielectric multi-layer film.

Although a direction, in which the polarized light radiated from the polarized light splitting portion 1401 travels, may be regulated by using a deviation prism, such a direction, in which the polarized light radiated from the polarized light splitting portion 1401, is regulated in this embodiment by directing the light source portion 401 in a direction which is tilted at a predetermined angle to the system optical axis L. Thus, the deviation prism is omitted from this embodiment.

Further, similarly as in the case of Embodiment 10, a light radiated from the light source portion 401 passes through the polarized light splitting portion 1401 by being shifted in the transverse direction (namely, in the upward direction as viewed in FIG. 14) by a distance, which correspond to the width of each of the prism composite elements 1404A to 1404E, in the polarized light splitting portion 1401. Therefore, in the case of this embodiment, the light source portion 401 is placed by being shifted in a direction (namely, in the downward direction as viewed in FIG. 14), which is opposite to the direction in which the light is shifted, from the system optical axis L by a distance which correspond to the width of each of the prism composite elements 1404A to 1404E.

The system of the optical integrator comprising two lens plates, namely, the first lens plate 441 and the second lens plate 442 is disposed in a stage subsequent to the polarized light splitting portion 1404. Each of the lens plate 441 and the second lens plate 442 is a composite lens element provided with microlenses 443 and microlenses 444 whose numbers are equal to each other. Each of the microlenses 443 of the first lens plate 441 is rectangular correspondingly to the region 404 to be illuminated and has a shape similar to that of the region 404 to be illuminated. Incidentally, among the microlenses 443 of the first lens plate 441, only p-polarized or s-polarized light is incident on the microlenses 443A placed both ends thereof (namely, hatched microlenses). Thus, directions, in which the p-polarized or s-polarized lights are radiated from the microlenses 443A thereof, are made to be different from the directions in which the p-polarized or s-polarized lights are radiated from other parts thereof.

In the case of this embodiment, in the second lens plate 442, the half-wave plate 1430 is formed between the microlenses 444 and the plano-convex lens 445 which placed on the exit side. In the half-wave plate 1430, the retardation layers 1431 are regularly formed at positions, at each of which a secondary light source image is formed from one of an s-polarized light and a p-polarized light, namely, formed from the p-polarized light.

In the polarization luminaire 1400 having such a configuration, randomly-polarized lights are radiated from the light source portion 401 and are then incident on the polarized light splitting portion 1401. The randomly-polarized lights having been incident on the polarized light splitting portion 1401 are separated in the transverse direction by the polarized light splitting film 426 into two kinds of polarized lights, namely, p-polarized and s-polarized lights.

This principle will be explained hereunder by describing the case of applying the principle to randomly-polarized lights, which have been incident on a prism composite element 1404C, by way of example. First, an s-polarized light component included in the randomly-polarized lights, which have been incident on a prism composite element 1404C, is reflected by the polarized light splitting film 426 and thus the direction, in which the s-polarized light component travels, is changed. Then, the s-polarized light component is incident on the adjacent prism composite element 1404B. Next, the s-polarized light component is reflected by the polarized light splitting film 426 in the prism composite element 1404B. Subsequently, the s-polarized light component is radiated from the polarized light splitting portion 1401. On the other hand, a p-polarized light component included in the randomly-polarized lights is transmitted by the polarized light splitting film 426 in the prism composite element 1404C without being changed. Here, in the prism composite elements 1404B to 1404E, the angles that the polarized light splitting films 426 make with the entrance surface 1421 of the polarized light splitting portion 1401 are slightly different from one another by an angle θ'. Thus, in the prisms made of glass materials, the lateral difference between the traveling directions of the polarized lights of the two kinds becomes larger by a slight angle.

The two kinds of the polarized lights, whose traveling directions are made to be different from each other, are caused to be- incident on the system of the optical integrator 403.

In the system of the optical integrator 403, the two kinds of the polarized lights, whose traveling directions are made to be slightly different from each other, are incident on the first lens plate 441 and then forms secondary light source images in the second lens plate 442, respectively. At the position where the secondary light source images are formed, the half-wave plate 1430 is formed. Moreover, in the half-wave plate 1430, the retardation layers 1431 are selectively formed correspondingly to the positions where the secondary light source images are formed from the p-polarized lights. Thus, when passing through the retardation layers 1431, the p-polarized lights undergo the rotatory polarization, so that the p-polarized light is converted into s-polarized light. On the other hand, the s-polarized light does not pass through the retardation layer 1431 and thus passes through the half-wave plate 1430 without undergoing the rotatory polarization. Consequently, most of luminous fluxes radiated from the system of the optical integrator 403 are made to be s-polarized lights. The fluxes of the s-polarized lights obtained in this way are applied to the region 404 to be illuminated, by means of the decentered lens 1231.

As above described, in the case of the polarization luminaire 1400 of this embodiment, after a randomly-polarized light radiated from the light source portion 401 is split by the polarized light splitting portion 1401 into two kinds of polarized lights which travel in different directions, each of the two kinds of polarized lights is led to a predetermined region of the half-wave plate 1430, whereupon a p-polarized light is converted into an s-polarized light. Thus, the polarization luminaire 1400 of this embodiment exerts the effects in that the randomly-polarized lights radiated from the light source portion 401 can be applied to the region 404 to be illuminated, while most of the polarized lights are in a state in which these beams are made to be s-polarized lights. However, in the case of this embodiment, the polarized light splitting portion 1401 is constituted by utilizing the prisms made of glass and the dielectric multi-layer film. Thus, the polarized light splitting ability of the polarized light splitting portion 1401 is thermally stable. The polarized light splitting portion 1401, therefore, exerts the stable polarized light splitting ability at all times even in the case that the luminaire is required to output a large quantity of light. Consequently, the polarization luminaire having satisfactory ability can be realized.

Furthermore, in the case of this embodiment, the two kinds of polarized lights radiated from the polarized light splitting portion 1401 are separated in the transverse direction. Thus, this embodiment is suitable for forming the region 404 to be illuminated, whose shape is a laterally elongated rectangle.

Incidentally, in the case of this embodiment, the polarized light splitting portion 1401 is placed between the first lens plate 441 and the light source portion. Instead of this, the polarized light splitting portion 1401 may be placed between the first lens plate 441 and the second lens plate 442.

Embodiment 12

Figure 15:
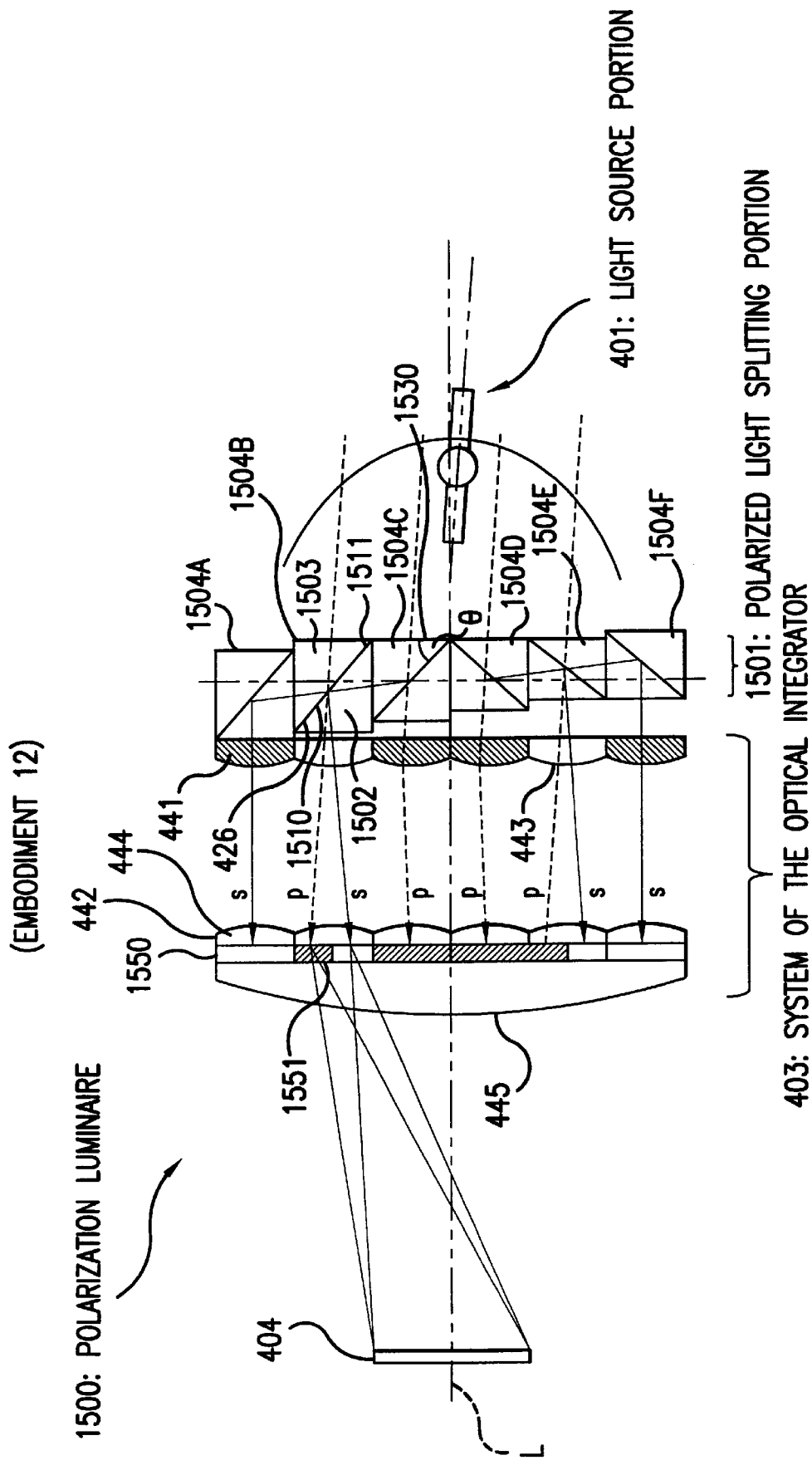
FIG. 15 is a schematic diagram for schematically illustrating an optical system of a polarization luminaire embodying the present invention, namely, Embodiment 12 of the present invention.

FIG. 15 is a schematic diagram for schematically illustrating a plan view of a primary part of the polarization luminaire of Embodiment 12. As shown in this figure, similarly as in the case of the polarization luminaire of Embodiment 10, the polarization luminaire 1500 of this embodiment has a light source portion 401, a polarized light splitting portion 1501 and a system of the optical integrator 403, which are placed along a system optical axis L. This luminaire is established in such a manner that light radiated from the light source portion 401 reaches a rectangular region 404 to be illuminated, through the polarized light splitting portion 1501 and the system of the optical integrator 403. The light source portion 401 faces the rectangular region 404 to be illuminated, and the entire system optical axis L is shaped like a straight line. In this embodiment, a direction, in which the polarized light emitted from the polarized light splitting portion 1501 travels, is similarly regulated by directing the light source portion 401 in a direction which is tilted at a predetermined angle to the system optical axis L. Thus, the deviation prism is omitted from this embodiment.

The polarized light splitting portion 1501 is composed of square-pole-like prism composite elements 1504A, 1504B, 1504C, 1504D, 1504E and 1504F, each of which comprises first and second triangle-pole-like rectangular prisms 1502 and 1503 (namely, triangular prisms).

In the case of each of the prism composite elements 1404A to 1404E, the polarized light splitting film 426 is formed on an inclined surface portion 1510 of the first rectangular prism 1502. The inclined surface portion 1511 of the second rectangular prism 1503 is bonded to the inclined surface portion 1510 of the first rectangular prism 1502 in such a way that the polarized light splitting film 426 is sandwiched between the portions 1510 and 1511.

In the case of the prism composite elements 1504A to 1504E, which are configured in this manner, the polarized light splitting films 426 disposed on a side of the system optical axis L are opposite to those disposed on the other side of the axis L. Namely, when viewed from the light source portion 401, the splitting films 426 disposed on the right side of the system optical axis L face outwardly. Similarly, the splitting films 426 disposed on the left side of the system optical axis L face outwardly. Further, the prism composite elements 1504A to 1504F have the same width but are different in thickness from one another. Therefore, the angles, which of the polarized light splitting films of the prism composite elements 1504B to 1504E respectively make with the entrance surface 1530 of the polarized light splitting portion 1501, are different from one another. Incidentally, the prism composite elements 1504A and 1504F have only the function of reflecting s-polarized lights separated by the prism composite elements 1504B and 1504E, respectively.

In the case of this embodiment, the first and second rectangular prisms 1502 and 1503 are made of thermally stable glass materials. The polarized light splitting films 426 are made of a dielectric multi-layer film.

The system of the optical integrator 403 comprising two lens plates, namely, the first lens plate 441 and the second lens plate 442 is disposed in a stage subsequent to the polarized light splitting portion 1501. Each of the lens plate 441 and the second lens plate 442 is a composite lens element provided with microlenses 443 and microlenses 444 whose numbers are equal to each other. Each of the microlenses 443 of the first lens plate 441 is rectangular correspondingly to the region 404 to be illuminated and has a shape similar to that of the region 404 to be illuminated. Incidentally, among the microlenses 443 of the first lens plate 441, only s-polarized light is incident on the microlenses 443A placed both ends thereof (namely, hatched microlenses). Thus, directions, in which the s-polarized lights are emitted from the microlenses 443A thereof, are made to be different from the directions in which the s-polarized lights are emitted from other parts thereof.

In the case of this embodiment, in the second lens plate 442, the half-wave plate 1550 is formed between the microlenses 444 and the plano-convex lens 445 which is placed on the exit side. In the half-wave plate 1550, the retardation layers 1551 are formed at positions, at each of which a secondary light source image is formed from one of an s-polarized light and a p-polarized light, namely, formed from the p-polarized light.

In the polarization luminaire 1500 having such a configuration, randomly-polarized lights are radiated from the light source portion A401 and are then incident on the polarized light splitting portion 1501. The randomly-polarized lights having been incident on the polarized light splitting portion 1501 are separated in the transverse direction into two kinds of polarized lights, namely, p-polarized and s-polarized lights. Here, in the prism composite elements 1504B to 1504E, the angles that the polarized light splitting films 426 make with the surface 1530 of incidence of the polarized light splitting portion 1501 are slightly different from one another by an angle θ'. Thus, in the prisms made of glass materials, the lateral difference between the traveling directions of the polarized lights of the two kinds becomes larger by a slight angle. Further, the two kinds of the polarized lights, whose traveling directions are made to be different from each other, are caused to be incident on the system of the optical integrator 403. In the system of the optical integrator 403, the two kinds of the polarized lights, whose traveling directions are made by the polarized light splitting portion 1501 to be slightly different from each other, are incident on the first lens plate 441 and then forms secondary light source images in the second lens plate 442, respectively. The retardation layers 1551 are selectively formed correspondingly to the positions where the secondary light source images are formed from the p-polarized lights, among the positions where the secondary images are formed. Thus, when passing through the retardation layers 1551, the p-polarized lights undergo the rotatory polarization, so that the p-polarized light is converted into s-polarized light. On the other hand, the s-polarized light does not pass through the retardation layer 1551 and thus passes through the half-wave plate 1550 without undergoing the rotatory polarization. Consequently, most of luminous fluxes radiated from the system of the optical integrator 403 are made to be s-polarized lights. The fluxes of the s-polarized lights obtained in this way are applied to the region 404 to be illuminated, by means of the plano-convex lens 445.

As above described, in the case of the polarization luminaire 1500 of this embodiment, after a randomly-polarized light radiated from the light source portion 401 is split by the polarized light splitting portion 1501 into two kinds of polarized lights which travel in different directions, each of the two kinds of polarized lights is led to a predetermined region of the half-wave plate 1550, whereupon a p-polarized light is converted into an s-polarized light. Thus, the polarization luminaire 1500 of this embodiment exerts the effects in that the randomly-polarized lights radiated from the light source portion 401 can be applied to the region 404 to be illuminated, while most of the polarized lights are in a state in which these beams are made to be s-polarized lights. Further, in the case of this embodiment, the polarized light splitting portion 1501 is constituted by utilizing the prisms made of glass and the dielectric multi-layer film. Thus, the polarized light splitting ability of the polarized light splitting portion 1501 is thermally stable. The polarized light splitting portion 1501, therefore, exerts the stable polarized light splitting ability at all times even in the case that the luminaire is required to output a large quantity of light. Consequently, the polarization luminaire having satisfactory ability can be realized.

Furthermore, in the case of this embodiment, the two kinds of polarized lights radiated from the polarized light splitting portion 1501 are separated in the transverse direction. Thus, this embodiment is suitable for forming the region 404 to be illuminated, whose shape is a laterally elongated rectangle.

Incidentally, in the case of this embodiment, the polarized light splitting portion 1501 is placed between the first lens plate 441 and the light source portion. Instead of this, the polarized light splitting portion 1501 may be placed between the first lens plate 441 and the second lens plate 442.

Example of Projection display Using Polarization Luminaire of Embodiment 10

The aforementioned polarization luminaires of Embodiments 2 to 12 can be used in projection displays provided with liquid crystal light valves.

Figure 16:
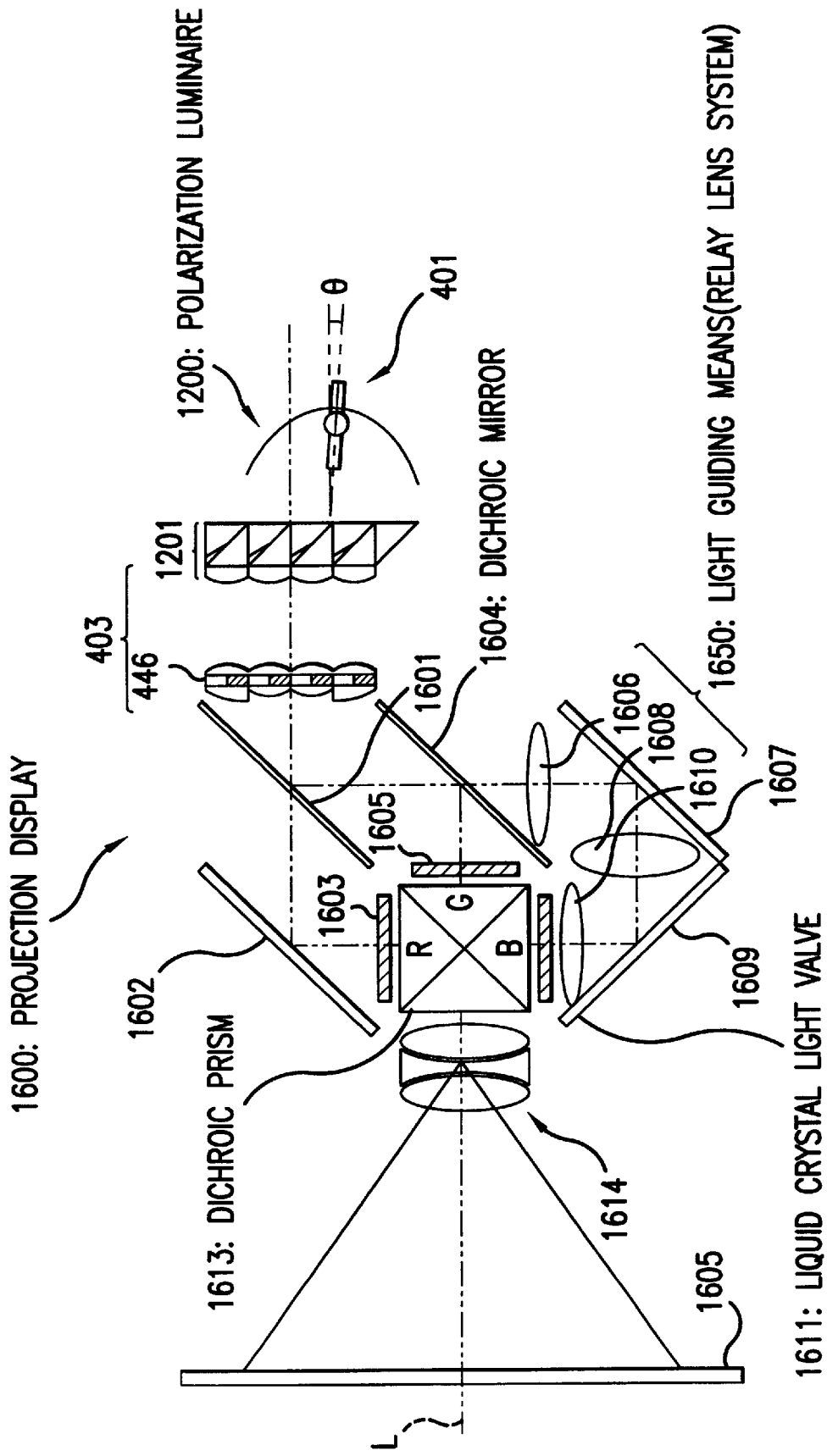
FIG. 16 is a schematic diagram for schematically illustrating an optical system of an example of a projection display provided with the polarization luminaire illustrated in FIG. 12.

FIG. 16 illustrates an example of application of the luminaire of Embodiment 10 to a projection display (namely, a liquid crystal projector).

As shown in this figure, a projection display 1600 is provided with the light source portion 401. In the polarized light splitting portion 1201, a randomly-polarized light radiated from this light source portion 401 is separated into two kinds of polarized lights. Between the two kinds of polarized lights, a p-polarized light is converted by the half-wave plate 446 of the system of the optical integrator 403 into an s-polarized light.

Among a flux of lights radiated from such a polarization luminaire 1600, red rays are transmitted by and blue and green rays are reflected by the blue-and-green reflection dichroic mirror 1601. Then, the red rays are reflected by a reflection mirror 1602 and thus reaches a first liquid crystal light valve 1603. On the other hand, between the blue and green rays, the green rays are reflected by a green reflection dichroic mirror 1604 and thus reaches a second liquid crystal light valve 1605.

Here, note that blue light has optical path length longer than that of the other two colors (incidentally, the optical path length of red light is equal to that of green light). Thus, a light guiding means 1650 constituted by a relay lens system comprising an entrance side lens 1606, a relay lens 1608 and an exit side lens 1610 is provided for blue rays. Namely, after transmitted by a green reflection dichroic mirror 1604, the blue light is first led to the relay lens 1608 through the lens 1606 and by way of a reflection mirror 1607. Then, after converged into this relay-lens 1608, the blue light is led to the exit side lens 1610 by way of a reflection mirror 1609. Thereafter, the blue light reaches a third liquid crystal light valve 1611. Hereat, the first to third liquid crystal light valves 1603, 1605 and 1611 modulate corresponding color rays. Subsequently, the modulated color rays are made to be incident on a dichroic prism (namely, a color synthesis means) 1613. The dichroic prism 1613 has a red reflection dielectric multi-layer film and a blue reflection dielectric multi-layer film that are arranged crosswise therein and synthesize bundles of modulated rays of such colors, respectively. The bundles of rays synthesized therein pass through a projection lens 1614 (namely, a projection means) and come to form images on a screen 1615.

The projection display configured in this way uses liquid crystal light valves, each of which is a light valve of the type that modulates polarized light of a single kind. Thus, the projection display 1600 of this embodiment resolves substantial part of the problems of a conventional luminaire in that if randomly-polarized light is led to a liquid crystal light valve by using the conventional luminaire, half of the randomly-polarized light is absorbed by a polarizing plate and is converted into heat and thus the efficiency in utilizing the light is low and in that a large cooling device which makes a great deal of noise for controlling heat emitted from the polarizing plate is needed.

Namely, in the case of the projection display 1600 of this embodiment, the rotatory polarization is exerted only on one of the two kinds of polarized light (for instance, p-polarized light) by the half-wave plate 446 in the polarization luminaire 1200 so that the plane of polarization thereof is made to extend in the same direction as in which the other kind of polarized light. Thus, the polarized lights, whose polarization directions are uniform, are led to the first to third liquid crystal light valves 1603, 1605 and 1611. Consequently, the efficiency in utilizing the light can be enhanced. Moreover, a bright projected image can be obtained. Further, the quantity of light absorbed by the polarizing plate (not shown) can be reduced. Thereby, a rise in temperature of the polarizing plate can be suppressed. Consequently, it is can be realized that a cooling device is made small and its noise can be reduced. Furthermore, in the polarization luminaire 1200, a thermally stable dielectric multi-layer is used as the polarized light splitting film. The ability of the polarized light splitting portion 1201 to split polarized light is thermally stable. The polarized light splitting portion, therefore, exerts the stable polarized light splitting ability at all times even in the case of the projection display 1600 required to output a large quantity of light.

Besides, in the polarization luminaire 1200, the two kinds of polarized lights radiated from the polarized light splitting portion 1201 are separated in the transverse direction. Thus, the region to be illuminated, whose shape is a laterally elongated rectangle, can be formed without wasting any quantity of light. Consequently, the polarization luminaire 1200 is suitable for a laterally elongated liquid crystal light valve which can project an image which is easy to see and appeals strongly.

In addition, this embodiment uses a dichroic prism 1613 as the color synthesis means. Thus, the size of the device can be reduced. Moreover, the length of the optical path between the projection lens 1614 and each of the liquid crystal light valves 1603, 1605 and 1611 is short. Thus, in the case of the device of this embodiment, a bright projected image can be realized even if a projection lens having a relatively small diameter is used. Further, in the case of this embodiment, the light guiding means 1650 constituted by the relay lens system comprising the entrance side lens 1606, the relay lens 1608 and the exit side lens 1610 is provided for blue rays. Consequently, irregularities in colors or the like do not occur in projected- images.

Example of Projection display Using Polarization Luminaire of Embodiment 2

Figure 17:
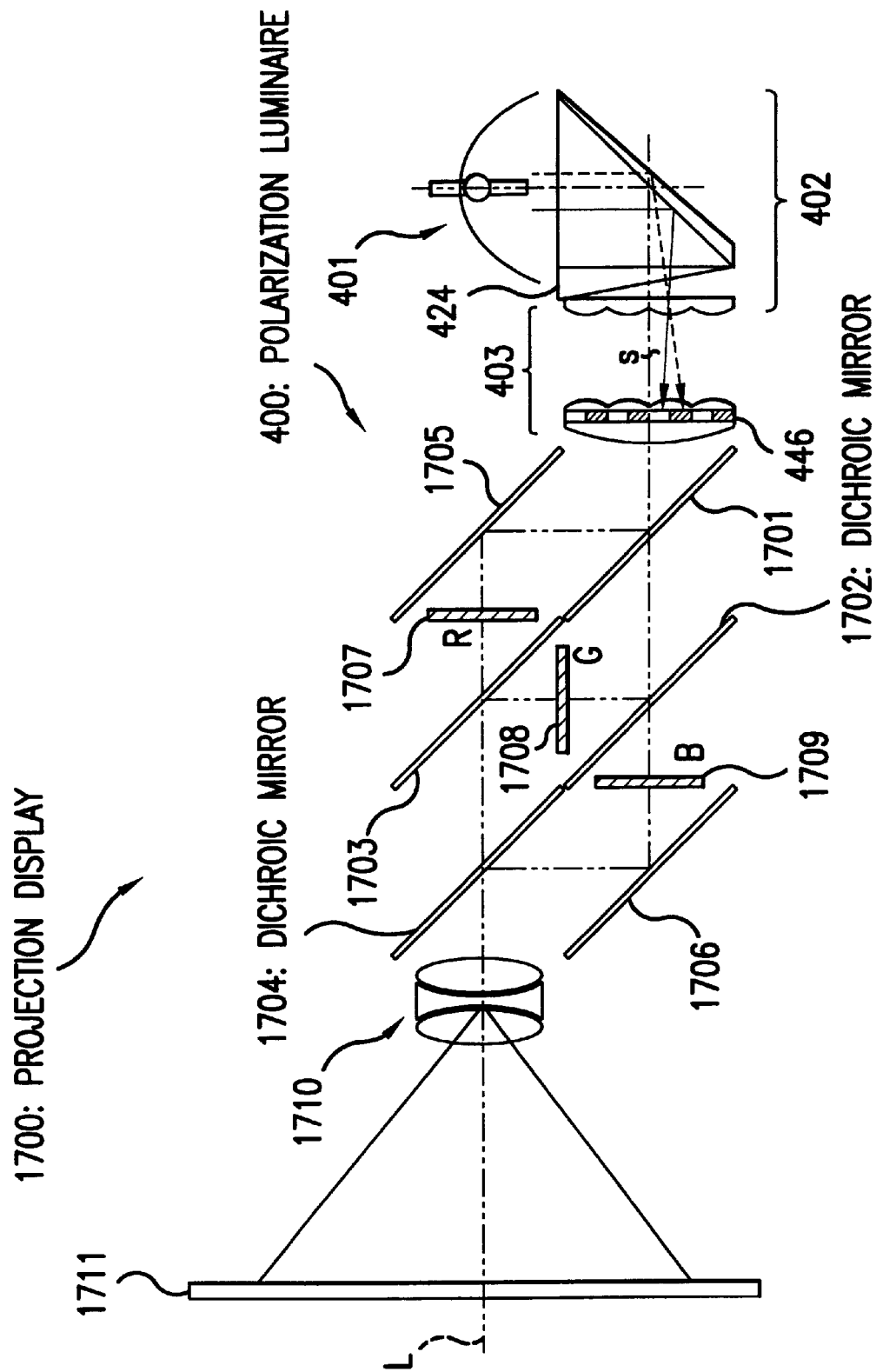
FIG. 17 is a schematic diagram for schematically illustrating an optical system of an example of a projection display of the polarization luminaire illustrated in FIG. 4.

In the projection display, the color synthesis means may be constituted by an optical system using mirrors, as illustrated in FIG. 17. The polarization luminaire 400 illustrated in FIG. 4 is used in the projection display 1700 illustrated in FIG. 17. In the case of this polarization luminaire 400, in the polarized light splitting portion 402, a randomly-polarized light radiated from this light source portion 401 is separated into two kinds of polarized lights. Between the two kinds of polarized lights, a p-polarized light is converted by the half-wave plate 446 of the system of the optical integrator 403 into an s-polarized light.

Among a flux of lights radiated from such a polarization luminaire 400, first, red rays are reflected by a red reflection dichroic mirror 1701 and blue and green rays are transmitted. Then, the red rays are reflected by a reflection mirror 1705 and thus reaches a first liquid crystal light valve 1707. On the other hand, between the blue and green rays, the green ray is reflected by a green reflection dichroic mirror 1702 and thus reaches a second liquid crystal light valve 1708. After transmitted by the green reflection dichroic mirror 1702, the blue ray reaches a third liquid crystal light valve 1709. Thereafter, the first to third liquid crystal light valves 1707, 1708 and 1709 modulate corresponding color rays and causes the color rays to contain corresponding image information. Subsequently, the first to third liquid crystal light valves 1707, 1708 and 1709 output the modulated color light. Hereat, the red light undergoing the color modulation is transmitted by the green reflection dichroic mirror 1703 and by the blue reflection dichroic mirror 1704 and then reaches a projection lens 1710 (namely, the projection means). After reflected by the green reflection dichroic mirror 1703, the green light undergoing the color modulation is transmitted by the blue reflection dichroic mirror 1704 and then reaches the projection lens 1710. After reflected by the blue reflection dichroic mirror 1704, the blue light undergoing the color modulation reaches the projection lens 1710.

The projection display 1700 configured in this way uses liquid crystal light valves, each of which is a light valve of the type that modulates polarized light of a single kind. Thus, the projection display 1700 of this embodiment resolves substantial part of the problems of the conventional luminaire in that if randomly-polarized light is led to a liquid crystal light valve by using the conventional luminaire, half of the randomly-polarized light is absorbed by a polarizing plate and is converted into heat and thus the efficiency in utilizing the light is low and in that a large cooling device which makes a great deal of noise for controlling heat emitted from the polarizing plate is needed.

Namely, in the case of the projection display 1700 of this embodiment, the rotatory polarization is exerted only on one of the two kinds of polarized light (for instance, p-polarized light) by the half-wave plate 446 in the polarization luminaire 400 so that the plane of polarization thereof is made to extend in the same direction as in which the other kind of polarized light (for example, s-polarized light). Thus, the polarized lights, whose polarization directions are uniform, are led to the first to third liquid crystal light valves 1707, 1708 and 1709. Consequently, the efficiency in utilizing the light can be enhanced. Moreover, a bright projected image can be obtained. Further, the quantity of light absorbed by the polarizing plate (not shown) can be reduced. Thereby, a rise in temperature of the polarizing plate can be suppressed. Consequently, it is realized that a cooling device can be made small and its noise can be reduced. Furthermore, in the polarization luminaire 400, a thermally stable dielectric multi-layer is used as the polarized light splitting film. The ability of the polarized light splitting portion 402 to split polarized light is thermally stable. The polarized light splitting portion, therefore, exerts the stable polarized light splitting ability at all times even in the case of the projection display 1700 required to output a large quantity of light.

Embodiment 13

FIG. 18 illustrates another polarization luminaire of this embodiment. The polarization luminaire 1800 of this embodiment is basically provided with a light source 401, a polarized light splitting portion 402 and a system of the optical integrator 403. However, each of the embodiments described hereinabove employs a configuration in which a prism beam splitter composing the polarized light splitting portion is placed at a position which is nearer to the light source than the first lens plate of the system of the optical integrator. The luminaire of this embodiment, however, employs a configuration in which the prism beam splitter composing the polarized light splitting portion is placed between the first lens plate and the second lens plate. Thereby, the optical system is made to be more compact.

As shown in FIG. 18, randomly-polarized lights are radiated from the light source 401 along the system optical axis L and is then incident on a deviation prism 1801 placed on the entrance side of the polarized light splitting portion 402. The traveling direction, in which the polarized lights travel, is slightly inclined to the system optical axis by this deviation prism. The polarized light, therefore, is incident on the first lens plate 441, which composes the system of the optical integrator 403 placed on the exit side of the deviation prism 1801, at an angle θ to the vertical incident direction. As viewed in this figure, the ray is incident thereon along a direction which is rightwardly inclined at an angle θ to the system optical axis L.

The first lens plate 441 is optically bonded to the entrance surface 1812 of a rectangular prism 1811 which is a composing element of a prism beam splitter 1810. The half-wave plate 446 serving as the polarization conversion element is bonded to the exit surface 1813 of the rectangular prism 1811, which is orthogonal to the entrance surface 1812 thereof. Further, the second lens plate 442 of the system of the optical integrator is bonded to the exit surface of this half-wave plate 446.

The prism beam splitter 1810 is provided with the rectangular prism 1811 and a nearly-plate-like quadrangular prism 1820 which is bonded to the inclined surface 1813 of the prism 1811. Moreover, similarly as in the case of the aforementioned embodiment, the polarized light splitting film 426 is formed on the inclined surface 1814 of the rectangular prism 1811. Between the polarized lights entering, for example, only an s-polarized light is totally reflected, whereas a p-polarized light is transmitted without being changed. Furthermore, the reflection film 429 is formed on the outer inclined surface 1821 of the quadrangular prism 1820, so that a p-polarized light entering is totally reflected.

In the case of this embodiment, randomly-polarized lights, which has been incident thereon through the deviation prism 1801 when slightly refracted, are reflected by the polarized light splitting film 426 and the reflection film 429 by appropriately setting the angle formed between these films 426 and 429. Then, the reflected polarized lights are further divided into polarized lights that travel on the opposite sides of the system optical axis L and are further outputted at angles, which are nearly symmetrical with respect to the system optical axis L, respectively, to the half-wave plate 446. As viewed in this figure, the reflected polarized lights are divided into polarized lights that are turned upwardly and downwardly at positive and negative angles, which have a same magnitude, with respect to the system optical axis L, respectively.

The half-wave plate 446 is provided with the retardation layers 447 (namely, hatched portion in this figure) for turning the polarization direction of each of polarized lights, which pass therethrough, 90 degrees, and with the layers 448 in which polarized lights pass therethrough without being changed. This configuration of the half-wave plate 446 is similar to that employed in each of the above embodiments. Between the p-polarized light and the s-polarized light that are split in the polarized light splitting portion 402 and are turned in upward and downward directions, which are nearly symmetrical with respect to the system optical axis L, respectively, the s-polarized light is incident on the retardation layers 447. In contrast, the p-polarized light is incident on the layers 448. Thence, the polarization direction of the s-polarized light is turned 90 degrees and is thus changed into a p-polarized light which is subsequently outputted therefrom. As a result, lights, whose polarization directions are that of the p-polarized light, are incident on the second lens plate 442. Thereafter, the lights further travel therethrough toward the region 404 to be illuminated.

Figure 18A:
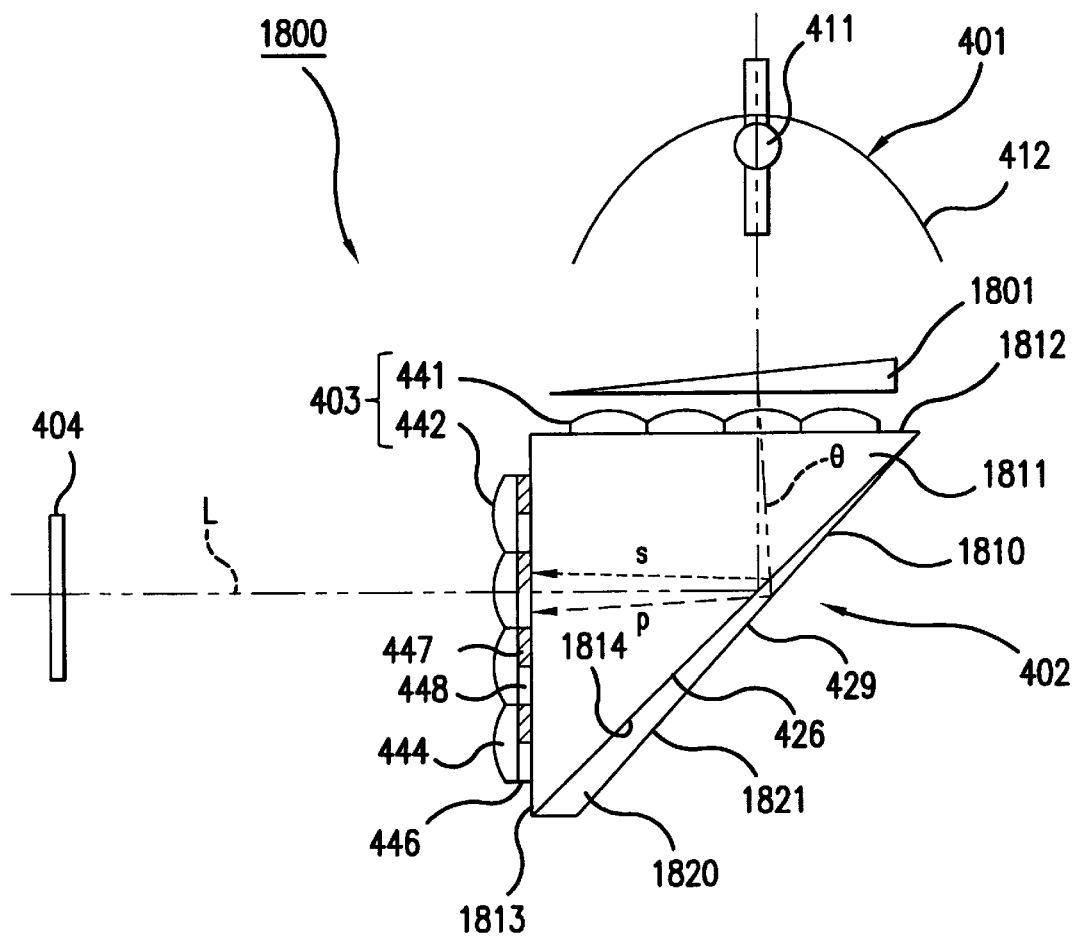
FIG. 18(A) to FIG. 18(D) is a schematic diagram for schematically illustrating an optical system of a polarization luminaire embodying the present invention, namely, Embodiment 13 of the present invention.
Figure 18B:
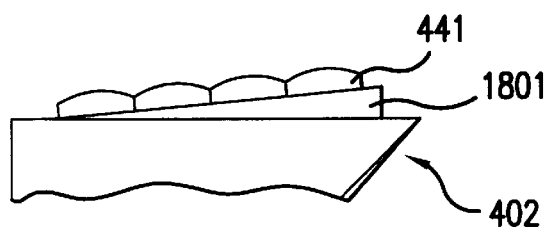

This embodiment using the polarization luminaire 1800 configured in this manner can obtain effects similar to those obtained by each of the aforesaid embodiments. Further, in the configuration of this embodiment, the first and second lens plates composing the system of the optical integrator are formed in such a way as to be integral with each other by being bonded to the entrance surface and the exit surface of the prism beam splitter, respectively. Thus, the configuration of this embodiment can be made to be compact. Moreover, the area of the interface between the optical element and the air can be reduced. Consequently, the efficiency in utilizing the light can be enhanced. Here, note that the reason for disposing the deviation prism 1801 on the optical path is that the p-polarized light and the s-polarized light, which are obtained by splitting a light in the aforementioned manner, are turned in directions which are symmetrical with respect to the system optical axis, respectively. Accordingly, the deviation prism 1801 may be placed on the exit side of the first lens plate, instead of the entrance side thereof. For example, as illustrated in FIG. 18(B), the deviation prism 1801 may be bonded to the incidence entrance surface of the prism beam splitter and moreover, the first lens plate may be bonded to the entrance surface of this deviation prism 1801. Thereby, the interface between the deviation prism and the air, which is present between the first lens plate and the deviation prism, can be eliminated, therefore, the efficiency in utilizing the light can be more enhanced.

Figure 18C:
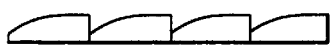

Furthermore, the deviation prism can be omitted by using an optical element composed of decentered lenses illustrated in FIG. 18(C) as the first lens plate.

Figure 18D:
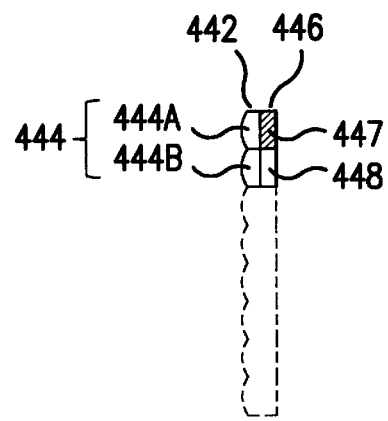

Next, in the case of this embodiment, the number of the microlenses 444 composing the second lens plate 442 may be equal to that of the microlenses 443 composing the first lens plate 441. It is, however, preferable that the number of the microlenses 444 composing the second lens plate 442 is twice the number of the microlenses 443 composing the first lens plate 441. For instance, as illustrated in FIG. 18(D), each of the microlenses 444 of the second lens plate comprises a pair of lenses 444A and 444B respectively corresponding to the retardation layer 447 and the other layer 448 of the half-wave plate 446. The reason is that the slight difference in the optical path length between the p-polarized light and the s-polarized light, which is caused between the first lens plate and the second lens plate, is absorbed and the sizes of images of the first lens plate, which is formed by the second lens plate in the region to be illuminated, is made to be uniform by changing the characteristics of the lenses respectively corresponding to the polarized lights.

Embodiment 14

FIG. 19 is a schematic diagram for schematically illustrating still another polarization luminaire embodying the present invention. This embodiment uses a first condensing mirror plate and a second condensing mirror plate as the system of the optical integrator. As shown in this figure, the polarization luminaire 1900 of this embodiment has: a light source portion 401; a polarized light splitting portion 402; a system of the optical integrator 403 provided with a first condensing mirror plate 1901 and a second condensing mirror plate 1902; and a condenser lens portion 1940, which are placed along the system optical axis L (L') that makes a right-angled turn. A flux of lights radiated from the light source portion 401 is split into fluxes of two kinds of polarized lights in the polarized light splitting portion 402. Thereafter, a flux of one kind of polarized light is synthesized again from the two kinds of polarized lights by the first condensing mirror plate 1901, the second condensing mirror plate 1902 and the condenser lens portion 1940. Then, the synthesized flux of one kind of polarized light reaches the rectangular region 404 to be illuminated.

The light source portion 401 is mostly composed of a light source lamp 411 and a paraboloidal reflector 412. Randomly-polarized lights, which are radiated from the light source lamp 411, are reflected by the paraboloidal reflector 412 in a single direction and thus become a nearly parallel luminous flux that are then incident on the polarized light splitting portion 402. Here, note that an ellipsoidal reflector or a spherical reflector may be used in place of the paraboloidal reflector 412.

The polarized light splitting portion 402 is an ordinary square-pole-like beam splitters and has a configuration in which a polarized light splitting film 426 constituted by a dielectric multi-layer film is sandwiched between the inclined surfaces of two rectangular prisms (namely, triangular prisms) made of glass. At that time, the polarized light splitting film 426 is formed in such a way as to extend in a direction which is inclined at an angle α (=45 degrees) to the entrance surface 1911 of the polarized light splitting portion 402. Incidentally, the angle α formed between the polarized light splitting film 426 and the entrance surface 1911 is not limited to 45 degrees and may be set according to the angle of incidence of the incident fluxes of lights radiated from the light source portion 401.

A first quarter-wave plate 1921 and a second quarter-wave plate 1922 are formed on the first exit surface 1912 and the second exit surface 1923 of the polarized light splitting portion 402, respectively. The first condensing mirror plate 1901 and the second condensing mirror plate 1902 are mounted on the outer surfaces of these quarter-wave plates in such way as to face nearly the center of the polarized light splitting portion 402. As illustrated in FIG. 19(B), these condensing mirror plates are produced by disposing a plurality of same micro-condensing-mirrors 1903, each of which has a rectangular outer shape, in a matrix-like arrangement and forming a reflection surface 1904, which is made of an ordinary aluminum evaporation film, on the surface of each of the micro-condensing-mirrors 1903. In the case of this embodiment, the reflection surface 1904 of each of the micro-condensing-mirrors 1903 is shaped like a paraboloid. Incidentally, this curved reflection surface 1904 may be shaped like a spherical, elliptical or toric surface. The shape of the curved reflection surface 1904 can be set according to the characteristics of the incident lights radiated from the light source portion 401.

The condenser lens portion 1940 comprising the condenser lens plates 1941 and the half-wave plate 446 is placed on the side of the region 404, namely, on the third exit surface 1914 of the polarized light splitting portion 402 at a place, at which secondary light source images are formed by the first condensing mirror plate 1901 and the second condensing mirror plate 1902, in such a manner as to extend in a direction perpendicular to the system optical axis L, after undergoing a process which will be described later. The condenser lens plate 1941 is a composite lens element comprising the rectangular microlenses 1942 as previously described by referring to FIG. 1(B). The number of the microlenses composing the condenser lens plate 1941 is equal to that of the micro-condensing-mirrors 1903 composing the first and second condensing mirror plates (1901 and 1902). Incidentally, in the case of this embodiment, decentered lenses are used as a part of a plurality of the microlenses 1942. Further, retardation layers 447 formed in the half-wave plate 426 are formed in such a manner as to correspond to positions, at which secondary light source images are formed from the p-polarized light among the secondary images formed from the s-polarized light and the p-polarized light, with regularity.

Figure 19A:
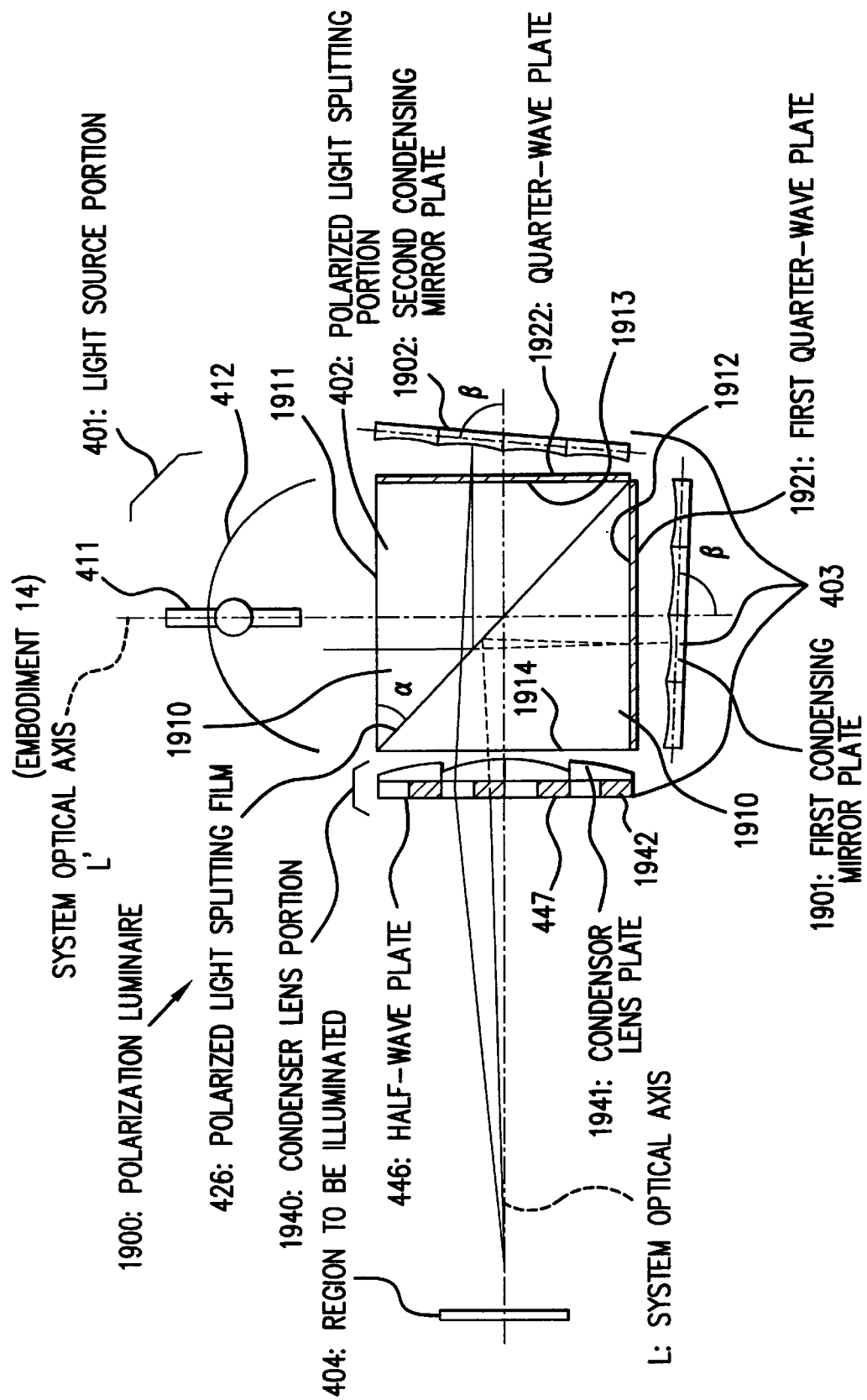
FIG. 19(A) is a schematic diagram for schematically illustrating the configuration of an optical system thereof.
Figure 19B:
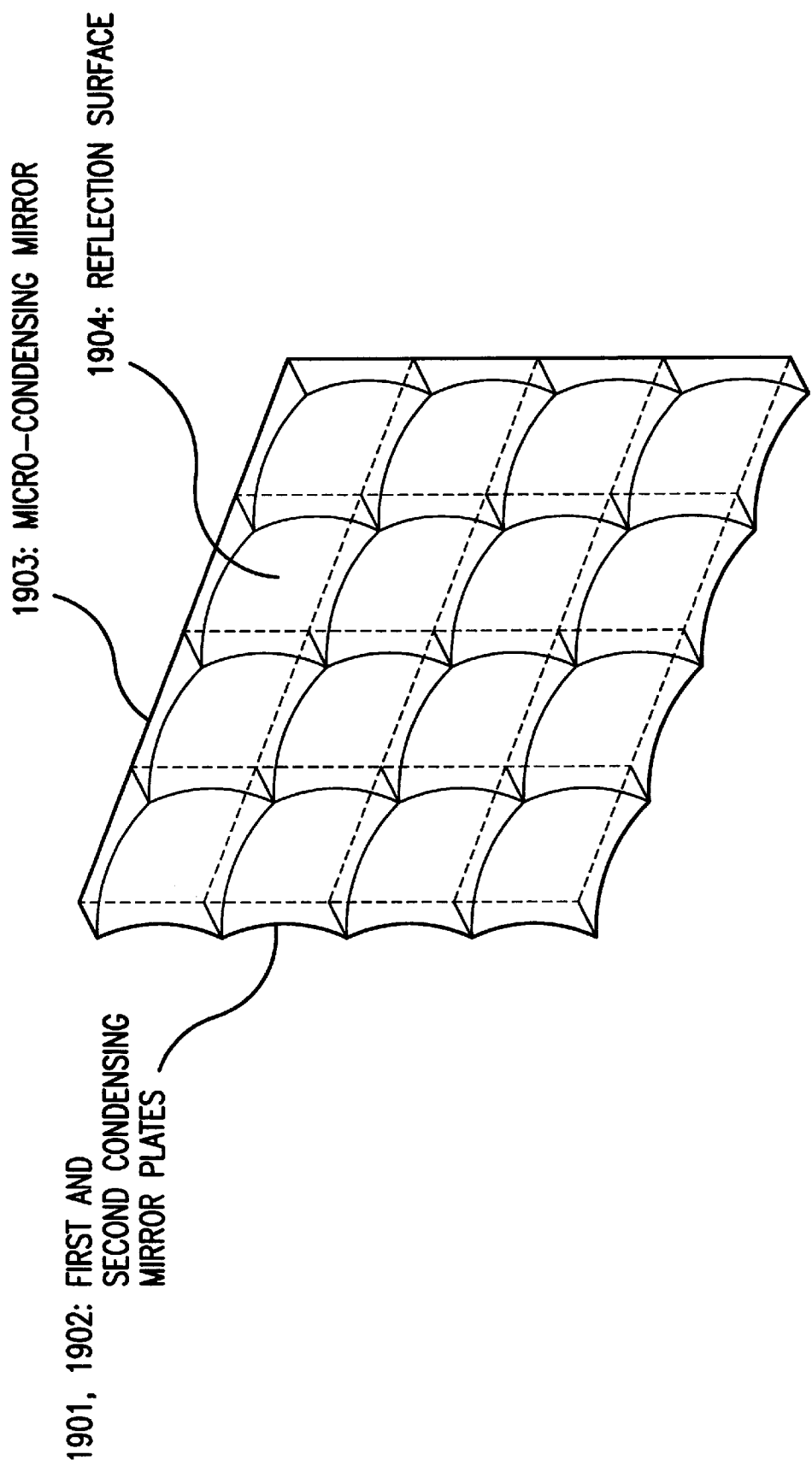
FIG. 19(B) is a perspective view of a condensing mirror plate thereof.
Figure 19C:
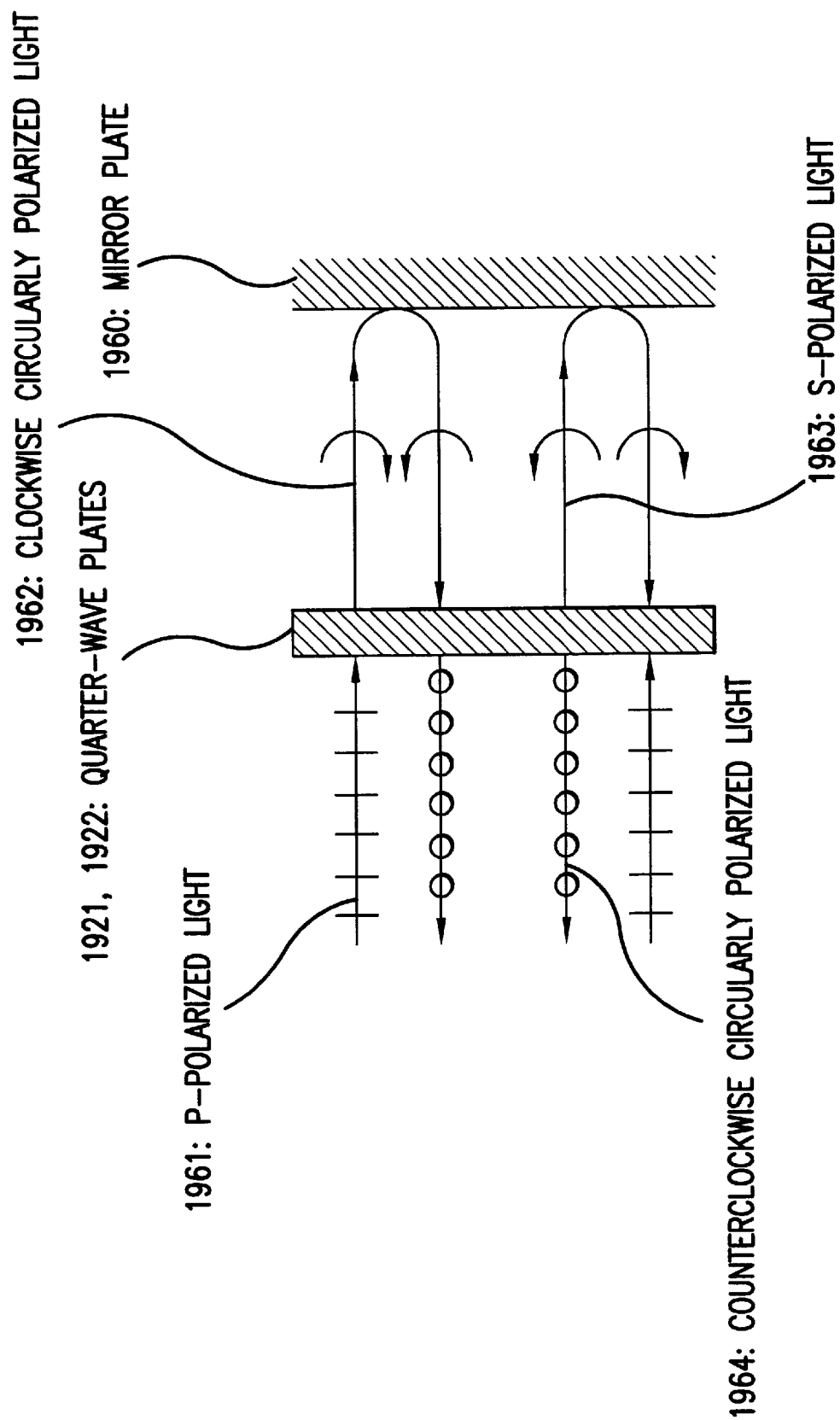
FIG. 19(C) is a diagram for illustrating a polarization operation thereof.

In the polarization luminaire 1900 having such a configuration, randomly-polarized lights are radiated from the light source portion 401 and are then incident on the polarized light splitting portion 402, as illustrated in FIG. 19(A). The randomly-polarized lights having been incident on the polarized light splitting portion 402 can be considered as mixed-lights of p-polarized lights and s-polarized lights. In the polarized light splitting portion 402, the mixed-lights are separated laterally by the polarized light splitting film 426 into two kinds of polarized lights, namely, the p-polarized lights and the s-polarized lights. Namely, the p-polarized light included in the randomly-polarized lights is transmitted by the polarized light splitting film 426 without being changed, and subsequently go to the first exit surface 1912. In contrast, the s-polarized light included in the randomly-polarized lights is reflected by the polarized light splitting film 426, so that a traveling direction, in which the s-polarized light travels, is changed and the s-polarized light goes to the second exit surface 1913 of the polarized light splitting portion 402.

The two kinds of polarized lights, which are obtained as a result of splitting-by the polarized light splitting portion 402, pass through the quarter-wave plate and are then reflected by the condensing mirror plate. During passing through the quarter-wave plate again, the direction, in which the polarized light travels, is turned nearly 180 degrees. Simultaneously with this, the plane of polarization is turned 90 degrees. It will be described with reference to FIG. 19(C) how this polarized light changes. Incidentally, for the simplicity of drawing, in this figure, the first or second condensing mirror plate 1901 or 1902 is drawn as a planer mirror plate 1960. The p-polarized light 1961 having been incident on the quarter-wave plates 1921 and 1922 is converted by the quarter-wave plate into a clockwise circularly polarized light (incidentally, the p-polarized light may be converted into a counterclockwise circularly polarized light, depending on the manner in which the quarter-wave plate is disposed). Subsequently, the circularly polarized light reaches the mirror plate 1960. The light is then reflected by the mirror plate 1960. Simultaneously, the direction, in which the plane of polarization is rotated, is also changed. Namely, a clockwise circularly polarized light is converted into a counterclockwise circularly polarized light (conversely, a counterclockwise circularly polarized light is converted into a clockwise circularly polarized light). The direction, in which the light travels, is turned 180 degrees by the mirror plate 1960. Simultaneously, the obtained counterclockwise circularly polarized light 1963 is converted into the s-polarized light 1964 when passing through the quarter-wave plates 1921 and 192 again (incidentally, the obtained clockwise circularly polarized light is converted into the p-polarized light). Moreover, after undergoing a similar process, the s-polarized light is converted into the p-polarized light.

Therefore, the p-polarized light having reached the first exit surface 1912 is converted into the s-polarized light simultaneously with turning the direction, in which the polarized light travels, nearly 180 degrees by means of the first quarter-wave plate 1921 and the first condensing mirror plate 1901. Then, the s-polarized light is reflected by the polarized light splitting film 426 to thereby change the direction in which the s-polarized light travels. Thus, the s-polarized light goes to the third exit surface 1914. On the other hand, the s-polarized light having reached the second exit surface 1913 is converted into the p-polarized light simultaneously with turning the direction, in which the polarized light travels, nearly 180 degrees by means of the second quarter-wave plate 1922 and the second condensing mirror plate 1902. Then, the p-polarized light is transmitted by the polarized light splitting film 426 without being changed. Thus, the p-polarized light goes to the third exit surface 1914. Namely, at that time, the polarized light splitting film 426 also acts as a polarized light synthesis film.

The first condensing mirror plate 1901 and the second condensing mirror plate 1902 are composed of the micro-condensing mirrors 1903 which have light condensing effects. Thus, simultaneously with nearly reversing the direction in which the polarized light travels, the first condensing mirror plate 1901 and the second condensing mirror plate 1902 form a plurality of condensed images, the number of which is equal to that of the micro-condensing mirrors composing each of the condensing mirror plates.

Figure 19D:
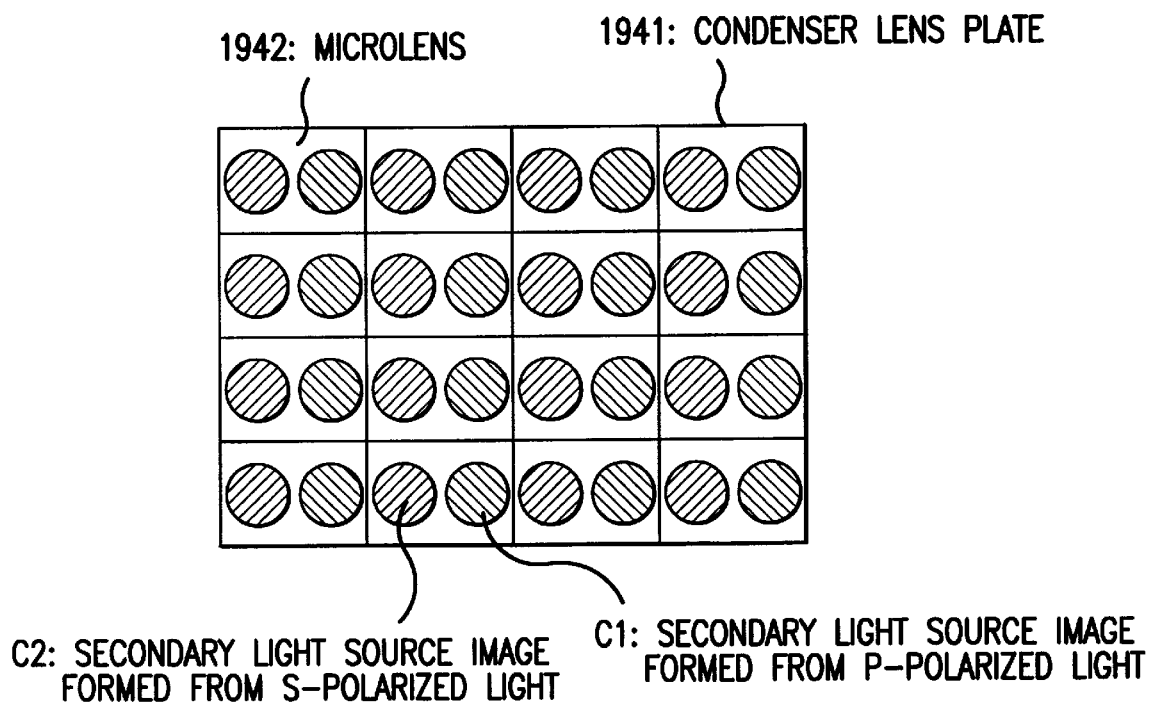
FIG. 19(D) is a diagram for illustrating a secondary light source image formed on the condensing mirror plate thereof.

At that time, the first condensing mirror plate 1901 and the second condensing mirror plate 1902 are disposed in a such a manner that each of these mirror plates is slightly tilted (namely, the first condensing mirror plate 1901 is slightly inclined at an angle β to the system optical axis L', and the second condensing mirror plate 1902 is slightly inclined at the same angle β to the system optical axis L). Thus, a secondary light source image formed from the p-polarized light and another secondary light source image formed from the s-polarized light are formed at positions, at which are slightly different from each other, respectively. Namely, as illustrated in FIG. 19(D) which shows secondary light source images formed from the two kinds of polarized light in the case that the lens portion 1940 is viewed from the side of the polarized light splitting portion 402, one kind of secondary light source images C1 (namely, circular regions hatched with parallel slanting lines drawn from upper-left to lower-right, among circular images) which is formed from a p-polarized light, and the other kind of secondary light source images C2 (namely, circular regions hatched with parallel slanting lines drawn from lower-left to upper-right, among the circular images), which is formed from an s-polarized light, are formed side by side. In contrast with this, in the half-wave plate 446, the retardation layer 447 is selectively formed correspondingly to a position where the secondary light source image C1 is formed from the s-polarized light (incidentally, the p-polarized light radiated from the light source portion is converted into the s-polarized light by performing the process illustrated in FIG. 19(C) and this s-polarized light is incident on the half-wave plate 446). Thus, when passing through the retardation layer 447, the p-polarized light undergoes a rotatory polarization, so that the p-polarized light is converted into s-polarized light. On the other hand, the s-polarized light does not pass through the retardation layer 447 and thus passes through the half-wave plate 446 without undergoing the rotatory polarization. Consequently, most of the luminous fluxes radiated from the condenser lens portion 1940 are made to be p-polarized lights.

The fluxes of lights, which have been made to be p-polarized light, are applied to the region 404 to be illuminated. Namely, images of image planes extracted by the first condensing mirror plate 1901 and the micro-condensing-mirrors 1903 of the second condensing mirror plate 1902 are formed at a single place by the condenser lens plate 1941 in such a manner as to be superposed thereon. Further, when passing through the half-wave plate 446, the lights are converted into polarized lights of a single kind. Thus most of the lights reach the region 404 to be illuminated. Consequently, the region 404 to be illuminated is uniformly illuminated with the polarized lights, most of which are of the single kind.

As above described, in the case of the polarization luminaire 1900 of this embodiment, a randomly-polarized light radiated from the light source portion 401 is split by the polarized light splitting portion 402 into two kinds of polarized lights which travel in different directions. Thereafter, each of the two kinds of polarized lights is led to a predetermined region of the half-wave plate 446, whereupon an s-polarized light is converted into a p-polarized light. Thus, the randomly-polarized lights radiated from the light source portion 401 can be applied to the region to be illuminated, while most of the polarized lights are in a state in which they are made to be p-polarized lights.

Moreover, high ability of the polarized light splitting portion 402 to split polarized light is necessary for leading each of the two kinds of polarized lights to the predetermined region of the half-wave plate 446. In the case of this embodiment, the polarized light splitting portion 402 is constituted by utilizing the prisms made of glass and the dielectric multi-layer film made of an inorganic material. Thus, the polarized light splitting ability of the polarized light splitting portion 402 is thermally stable. The polarized light splitting portion 402, therefore, exerts the stable polarized light splitting ability at all times even in the case that the luminaire is required to output a large quantity of light. Consequently, the polarization luminaire having satisfactory ability can be realized.

Further, in the case of this embodiment, in accordance with the shape of the region 404 to be illuminated, which is a laterally elongated rectangle, the micro-condensing-mirrors 1903 of the first condensing mirror 1901 and the second condensing mirror 1902 are in the shape of a laterally elongated rectangle. The two kinds of polarized lights simultaneously radiated from the polarized light splitting portion 402 are separated in the transverse direction. Thus, even in the case that the illumination region 404 to be illuminated, whose shape is a laterally elongated rectangle, is formed, the illumination efficiency can be increased without wasting a quantity of light.

In the case of Embodiment 14, the half-wave plate 446 is placed to the illumination region side of the condenser lens plate 1941. However, the position, at which the half-wave plate 446 is placed, is not limited thereto. The half-wave plate 446 may be placed at another position as long as this position is in the vicinity of a position where a secondary light source image is formed. For example, the half-wave plate 446 is placed to the light source side of the condenser lens plate 1941.

Further, each of the microlenses 1942 composing the condenser lens plate 1941 is a laterally-elongated rectangular lens. In contrast, there is no limitation to the shape of each of the microlenses 1942 of the condenser lens plate 1941. Incidentally, because the secondary light source image C1, which is formed from the p-polarized light, and the secondary light source image C2, which is formed from the s-polarized light, are formed side by side in the transverse direction as illustrated in FIG. 19(D), it is preferable that the shape of each of the microlenses 1942 of the condenser lens plate 1941 is determined, correspondingly to the positions where such images are formed.

Moreover, the two retardation layers, which have different characteristics, may be placed at a position, at which p-polarized light is condensed, and at another position, at which s-polarized light is condensed, respectively. Furthermore, the lights may be made to be polarized lights of a single kind that have a specific polarization direction.

Embodiment 15

In the case of Embodiment 14, it is necessary for spatially separating a position, at which a secondary light source image is formed from the p-polarized light, from a position, at which a secondary light source image is formed from the s-polarized light, to dispose the first condensing mirror plate 1901 and the condensing mirror plate 1902 in a state in which each of these plates is slightly tilted (namely, the first condensing mirror plate 1901 is slightly inclined at an angle β to the system optical axis L', and the second condensing mirror plate 1902 is slightly inclined at the same angle β to the system optical axis L). However, one or both of the condensing mirror plates can be disposed in a direction perpendicular to the system optical axis L (or L') by using a deviation prism. As will be described later, if such a perpendicular placement thereof is realized, the condensing mirror plates can be formed in such a way as to be integral with the polarized light splitting portion 402 or the quarter-wave plate 1921 (or the quarter-wave plate 1922).

Figure 20:
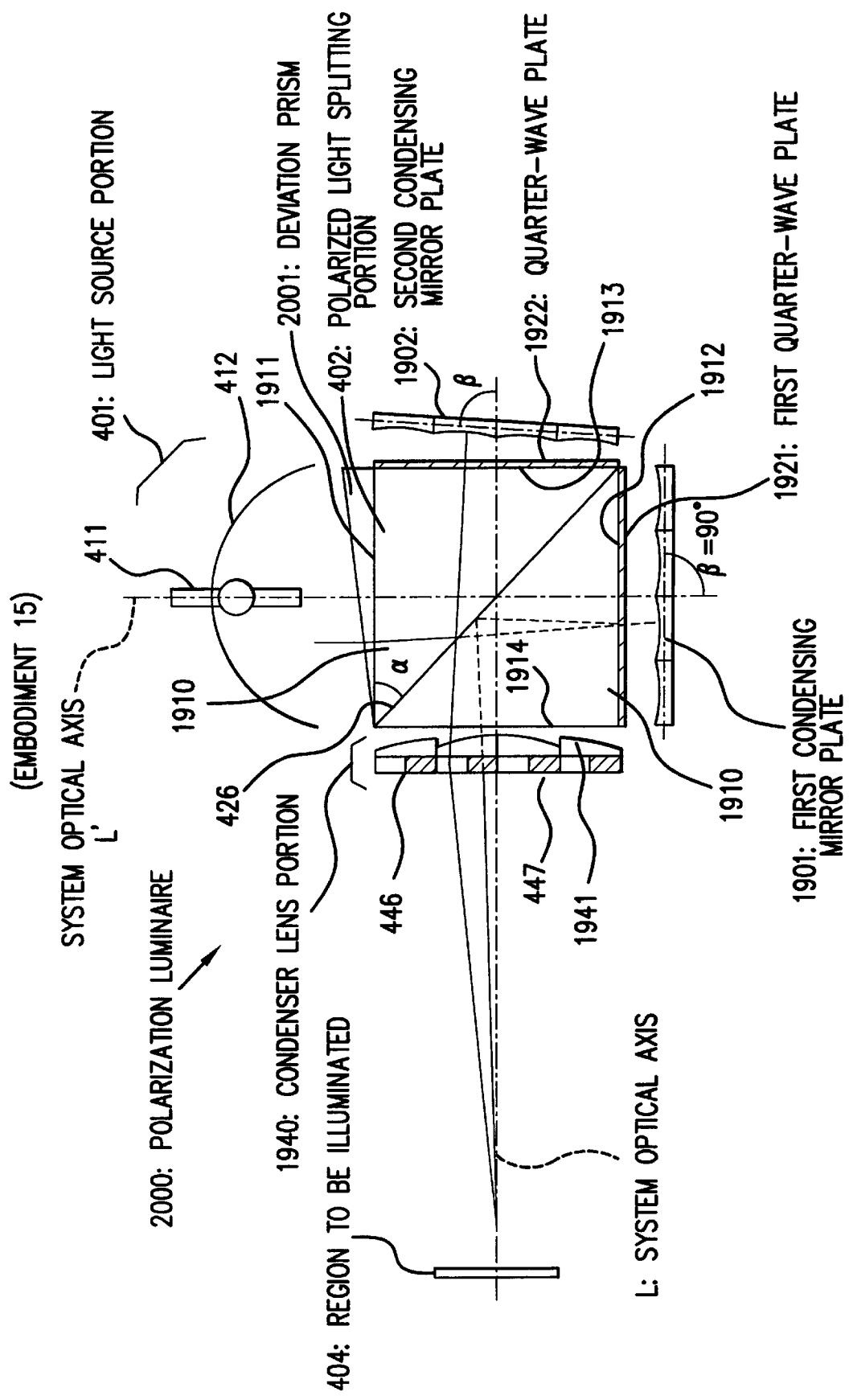
FIG. 20 is a schematic diagram for schematically illustrating an optical system of a polarization luminaire embodying the present invention, namely, Embodiment 15 of the present invention.

A polarization luminaire 2000 of Embodiment 15 illustrated in FIG. 20 is realized by taking this respect into consideration. The basis configuration of this polarization luminaire 2000 is similar to that of the polarization luminaire 1900 of Embodiment 14. Same reference characters designate same parts having the same functions. Further, the descriptions of such parts are omitted herein.

In the polarization luminaire 2000, a deviation prism 2001 is placed between the light source portion 401 and the polarized light splitting portion 402. The first condensing mirror plate 1901 can be placed in a position perpendicular to the system optical axis L' by disposing the deviation prism 2001 at this place. Thereby, the production of the optical system can be facilitated. Needless to say, if the deviation prism 2001 is reversed (namely, the deviation prism illustrated in FIG. 20 is disposed in such a manner that the acute-angled portion thereof faces the second condensing mirror plate 1902), the second condensing mirror plate 1902 can be placed in a position perpendicular to the system optical axis L, instead of the first condensing mirror plate 1901.

Moreover, the deviation prism 2001 can be formed in such a way as to be integral with the polarized light splitting portion 402. In such a case, this embodiment have an advantage in that the loss of the light due to the reflection caused on the interface between the deviation prism 2001 and the entrance surface 1911 of the polarized light splitting portion 402 can be further reduced.

Embodiment 16

It has been described that in the case of Embodiment 15, the first condensing mirror plate 1901 can be placed in a position perpendicular to the system optical axis L' (alternatively, the second condensing mirror plate 1902 can be placed in a position perpendicular to the system optical axis L) by disposing the deviation prism 2001 between the light source portion 401 and the polarized light splitting portion 402 and that thereby, the integration of the first condensing mirror plate 1901, the polarized light splitting portion 402 and the quarter-wave plate into a single piece become easy. A practical example is illustrated in FIG. 21 as a polarization luminaire 2100, namely, as Embodiment 16.

Figure 21A:
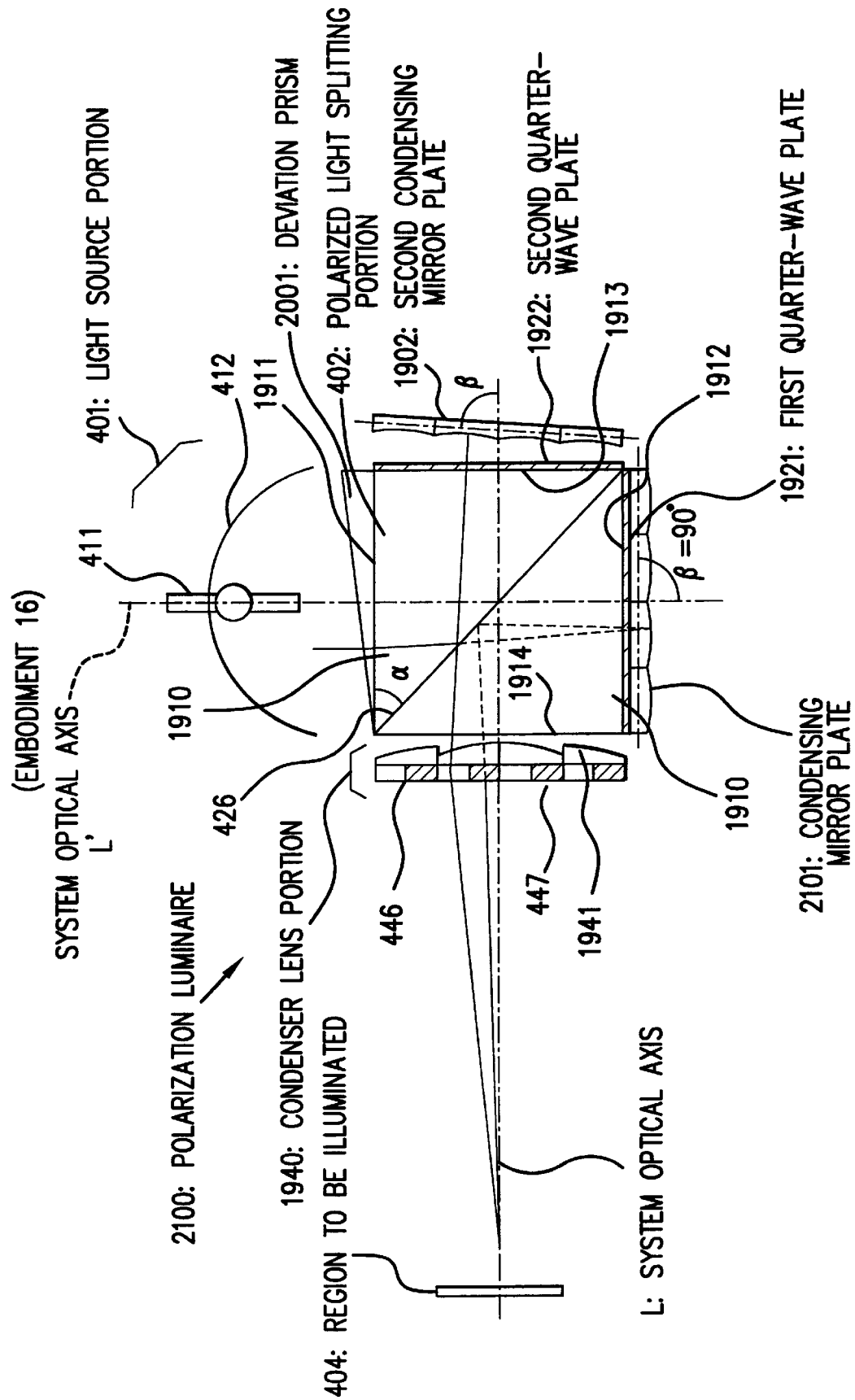
FIG. 21(A) is a schematic diagram for schematically illustrating the configuration of an optical system thereof.
Figure 21B:
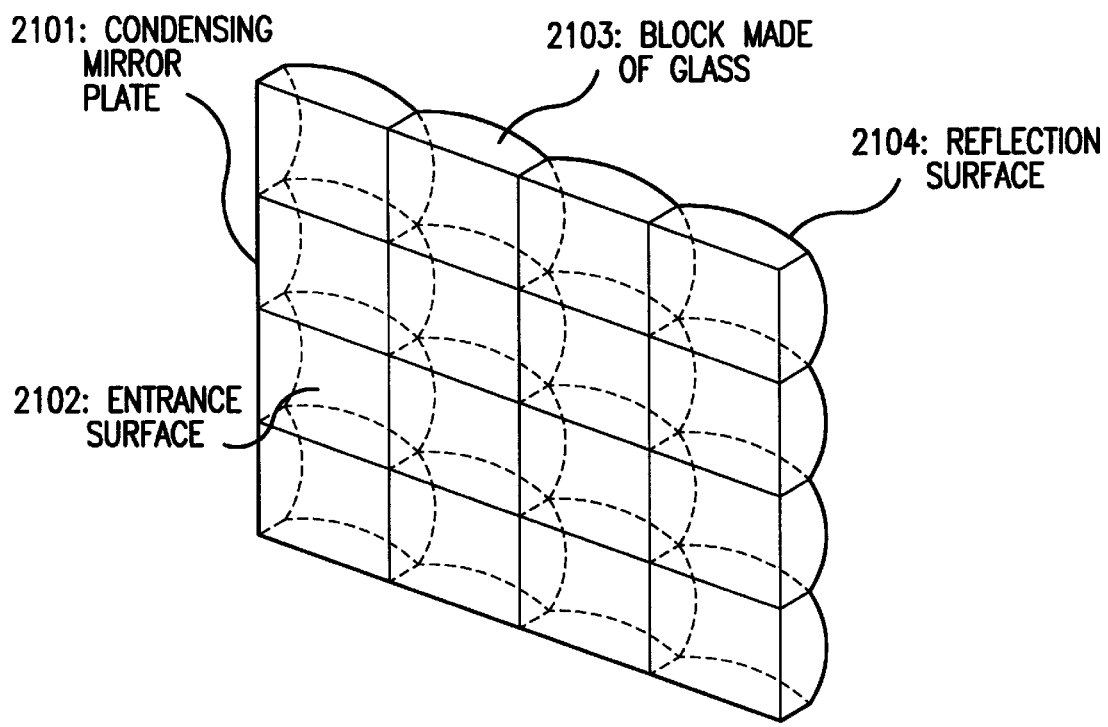
FIG. 21(B) is a perspective view of a condensing mirror plate thereof.

In the case of this embodiment, a condensing mirror plate 2101, whose external view is illustrated in FIG. 21(B), is used. Namely, the entrance surface 2102 thereof is planar and a curved-surface-like reflection surface 2104 thereof is formed on the rear surface of a block 2103 made of glass. As illustrated in FIG. 21(A), the exit surface of the polarized light splitting portion 402 (in this case, the first exit surface 1912), the quarter-wave plate (in this case, the first quarter-wave plate 1921) and the condensing mirror plate 2101 (corresponding to the first condensing mirror plate in this case) can be formed by employing such a shape of the condensing mirror plate 2101 in such a manner as to be integral with one another. Thus, this embodiments has advantages in that the optical system can be made to be more compact and that furthermore, the loss due to the optical reflection on the interface can be reduced.

Embodiment 17

Figure 22:
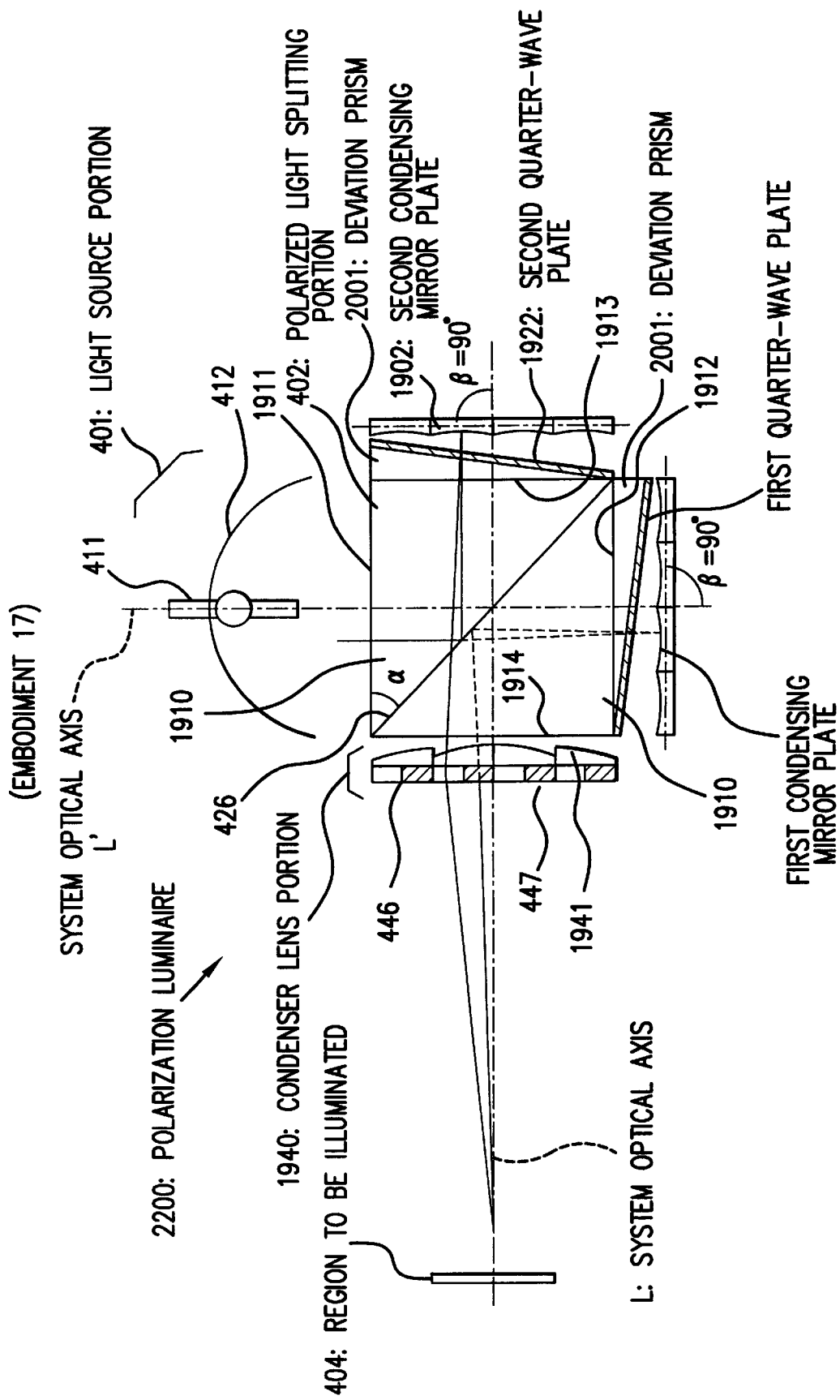
FIG. 22 is a schematic diagram for schematically illustrating an optical system of a polarization luminaire embodying the present invention, namely, Embodiment 17 of the present invention.

Further, as illustrated in FIG. 22, in a polarization luminaire 2200, deviation prisms 2001 are placed at two places, namely, placed in the first condensing mirror plate 1901 and the second condensing mirror 1902. In this case, both of the first condensing mirror plate 1901 and the second condensing mirror 1902 can be disposed in positions perpendicular to the system optical axis L' (or the system optical axis L). Thereby, the placement of the condensing mirror plates can be facilitated.

Incidentally, in the case of this embodiment, the deviation prism 2001 is optically bonded to the first exit surface 1912 and the second exit surface 1913 of the polarized light splitting portion 402 and is thus formed in such a manner as to be integral therewith. Consequently, this embodiment has an advantage in that the loss due to the optical reflection on the interface can be reduced.

Further, the first quarter-wave plate 1921 (or the second quarter-wave plate 1922) may be placed between the first exit surface 1912 (or the second exit surface 1913) of the polarized light splitting portion 402 and the deviation prism 2001.

Embodiment 18

Figure 23:
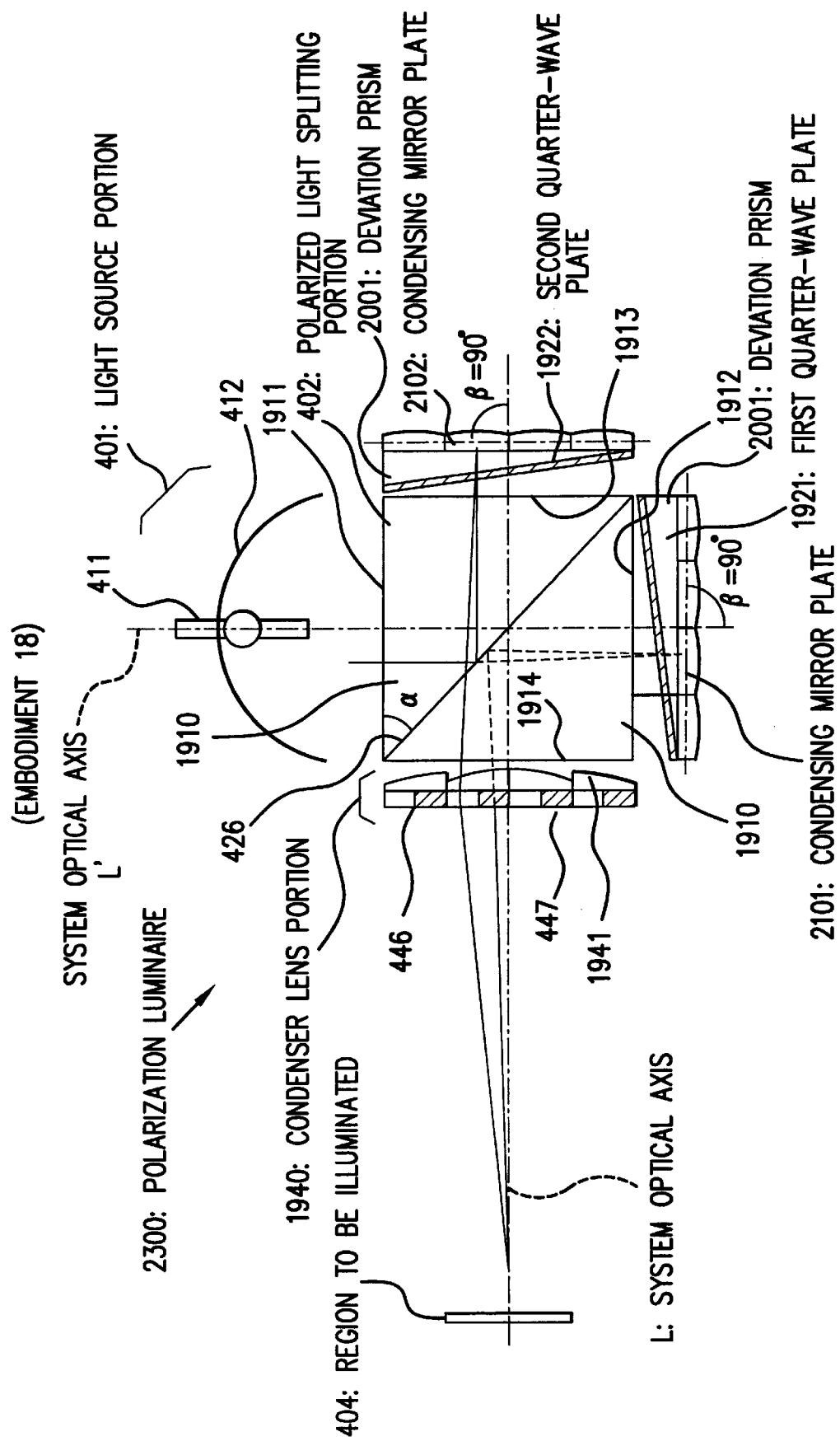
FIG. 23 is a schematic diagram for schematically illustrating an optical system of a polarization luminaire embodying the present invention, namely, Embodiment 18 of the present invention.

The deviation prisms 2001 disposed in two places in Embodiment 17 may be placed in such a manner as to be integral with the first condensing mirror plate 1901 and the second condensing mirror plate 1902, respectively. In such a case, this embodiment has an advantage in that the loss due to the optical reflection on the interface can be reduced. An example of the configuration in such a case is illustrated in FIG. 23 as a polarization luminaire 2300, namely, Embodiment 18. In the case of this embodiment, the condensing mirror plates 2101 similar to those employed in Embodiment 16 are used to form the deviation prism 2001 and the first condensing mirror plate 1901 in such a manner as to be integral with each other, and to form the deviation prism 2001 and the second condensing mirror plate 1902 in such a manner as to be integral with each other, respectively.

Furthermore, the first quarter-wave plate 1921 (or the second quarter-wave plate 1922) may be placed between the first condensing mirror plate 2101 (or the second condensing mirror plate 2102) and the deviation prism 2001.

Embodiment 19

Figure 24:
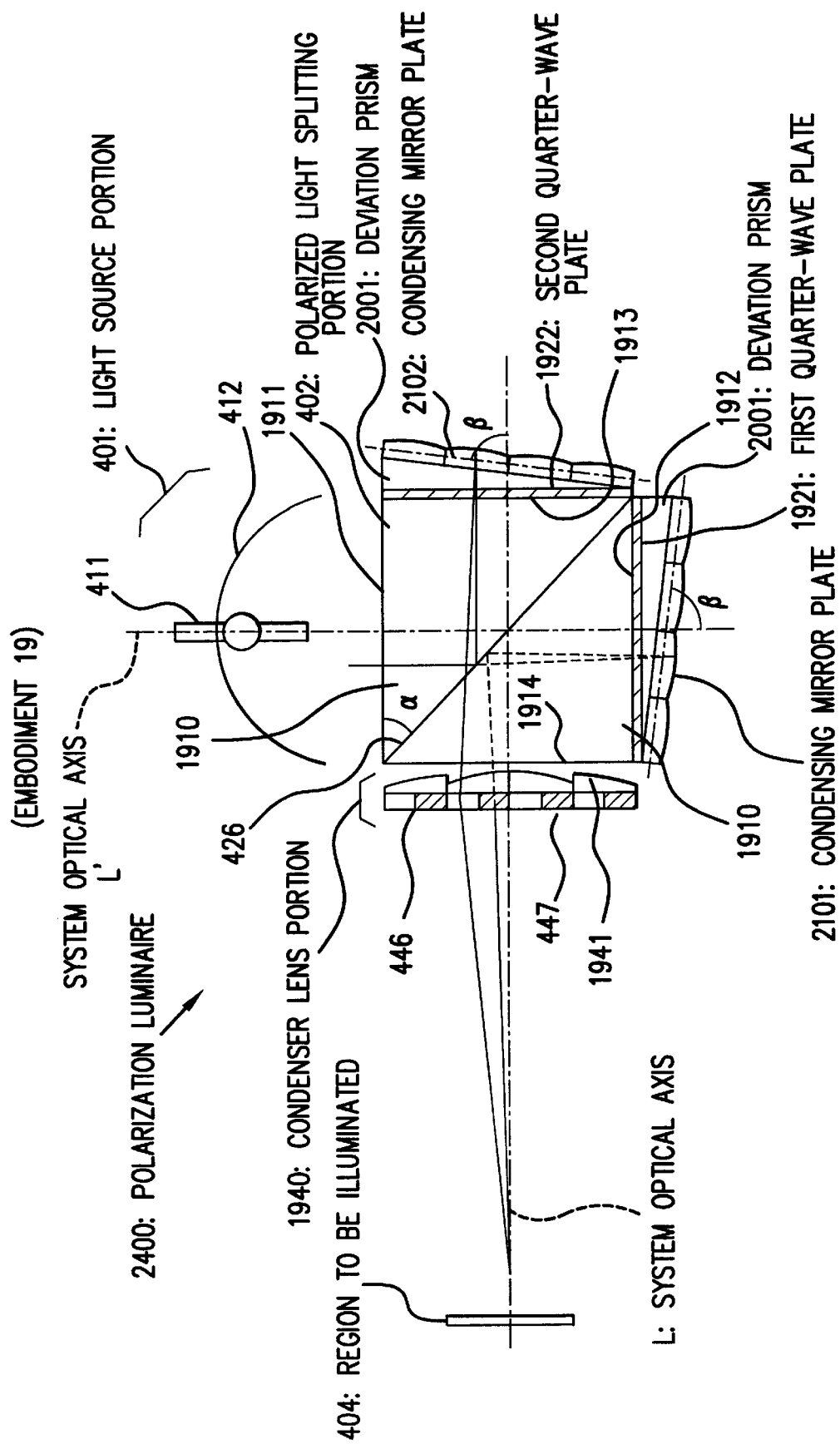
FIG. 24 is a schematic diagram for schematically illustrating an optical system of a polarization luminaire embodying the present invention, namely, Embodiment 19 of the present invention.

Moreover, as illustrated in FIG. 24, in a polarization luminaire 2400, the combination of the polarized light splitting portion 402, the first quarter-wave plate 1921, the deviation prism 2001 and the first condensing mirror plate 2101 and the combination of the polarized light splitting portion 402, the second quarter-wave plate 1922, the deviation prism 2001 and the second condensing mirror plate 2102 can be formed in such a way as to be integral with each other. In such a case, this embodiment has an advantage in that the loss due to the optical reflection on the interface can be reduced. Incidentally, in the case of this embodiment, the condensing mirror plates 2101 similar to those employed in Embodiment 16 previously described are used.

Furthermore, the first quarter-wave plate 1921 (or the second quarter-wave plate 1922) may be placed between the first condensing mirror plate 2101 (or the second condensing mirror plate 2102) and the deviation prism 2001.

Embodiment 20

Figure 25:
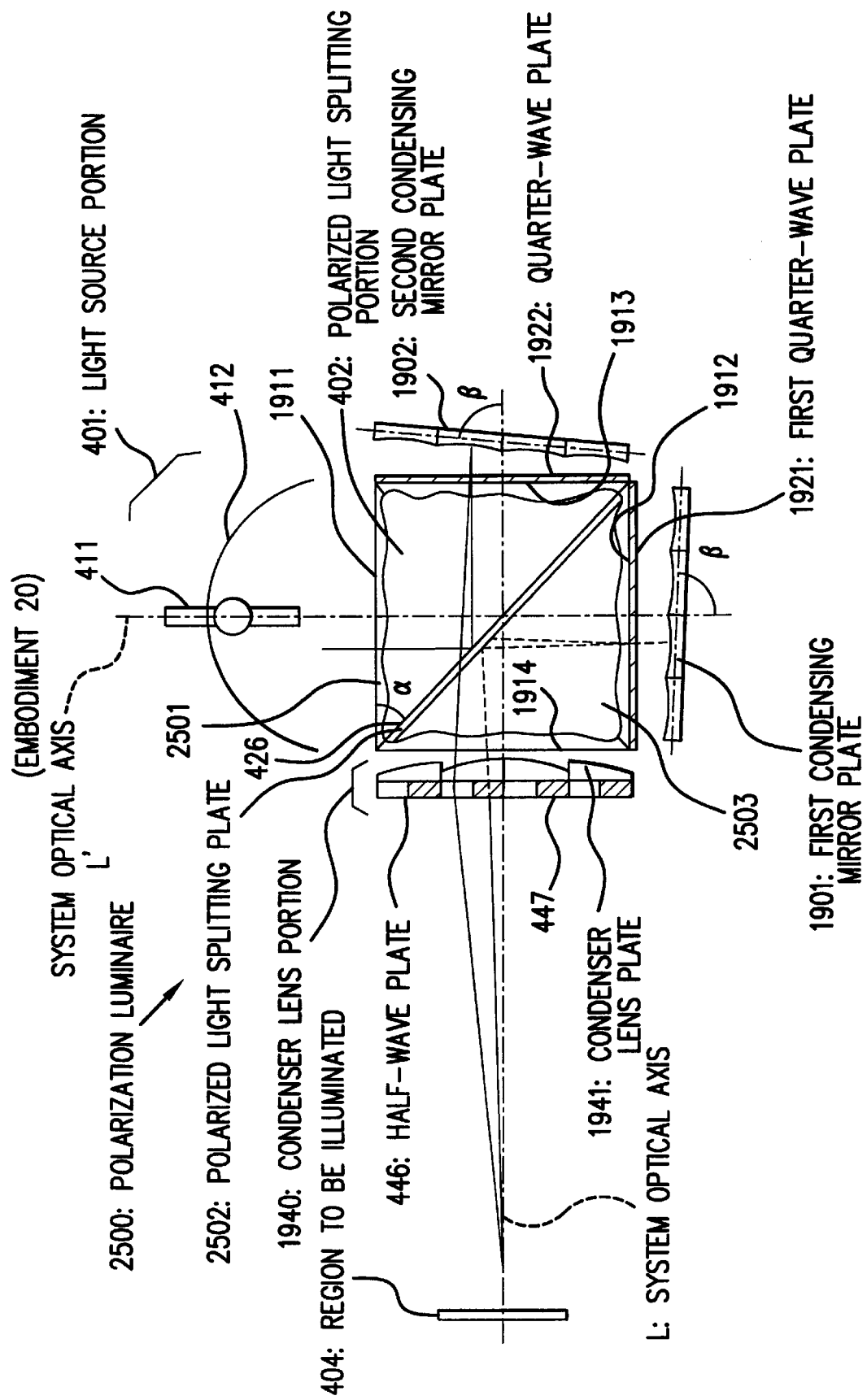
FIG. 25 is a schematic diagram for schematically illustrating an optical system of a polarization luminaire embodying the present invention, namely, Embodiment 20 of the present invention.

In the case of a polarization luminaire 2500 illustrated in FIG. 25, the placement of each optical system is similar to that of each of the optical systems of Embodiment 14. However, Embodiment 20 has the following characteristic features. Namely, the prism structure element 402 is constituted by six transparent plates 2501 composing wall surfaces. Further, in a planar polarized light splitting plate 2502, in which the polarized light splitting film 426 is formed, is disposed therein. Moreover, a structure element filled with liquid 2503 is used as the polarized light splitting portion 402. Thereby, the cost and weight of the polarized light splitting portion 402 can be reduced.

Embodiment 21

Figure 26:
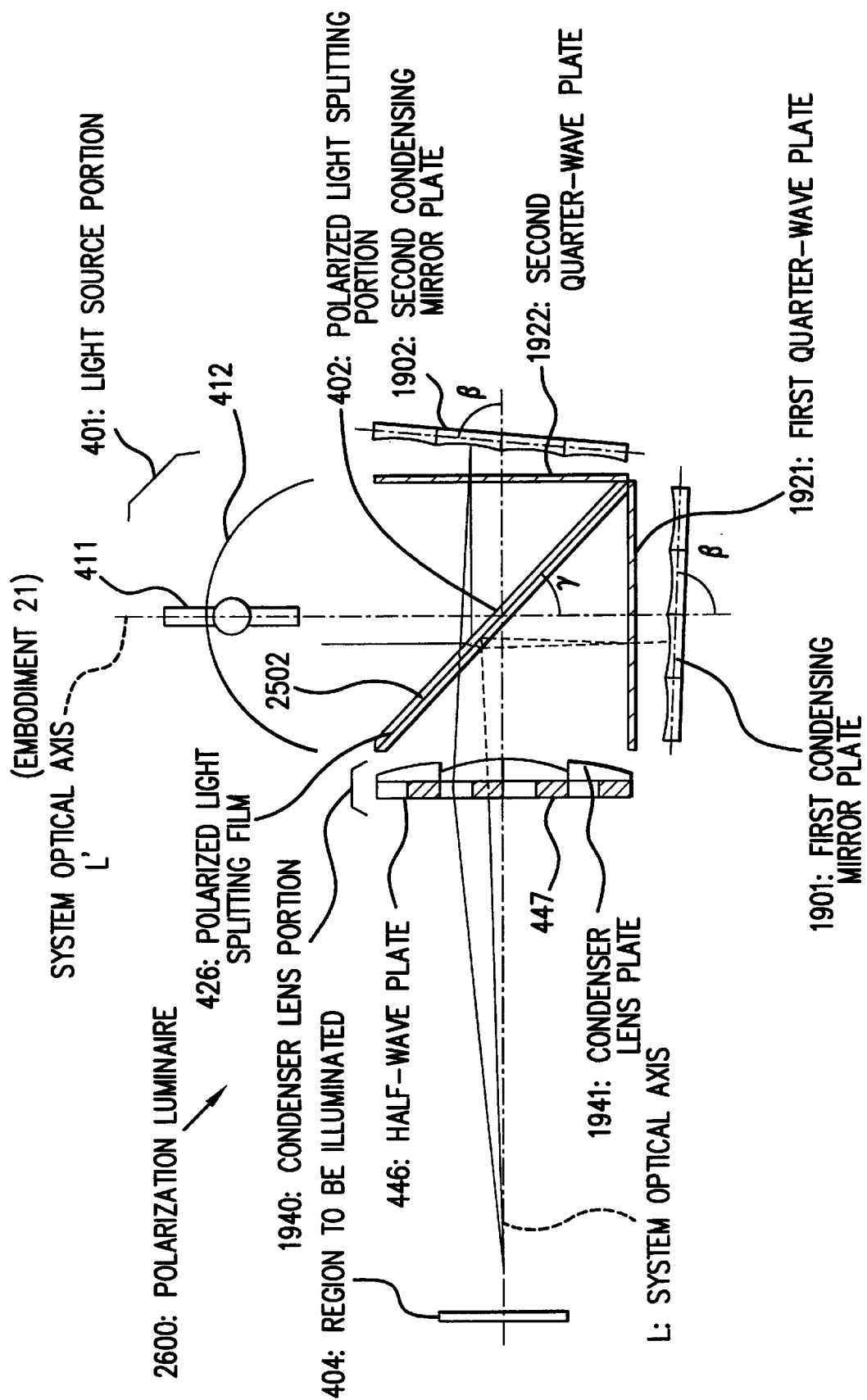
FIG. 26 is a schematic diagram for schematically illustrating an optical system of a polarization luminaire embodying the present invention, namely, Embodiment 21 of the present invention.

In the case of a polarization luminaire 2600 illustrated in FIG. 26, the placement of each optical system is similar to that of each of the optical systems of Embodiment 14. However, Embodiment 21 has a characteristic feature in that the polarized light splitting portion 402 is a planar structure element. Namely, the polarized light splitting plate 2502, in which the polarized light splitting film 426 is formed, is disposed in such a manner as to be inclined at an angle γ (−45 degrees) to the system optical axis L'. Thereby, the polarized light splitting portion 402 of this embodiment can exert the functions that are substantially the same as of the polarized light splitting portion 402 illustrated in FIG. 14 mainly comprising two rectangular prisms. Consequently, the cost and weight of the polarized light splitting portion 402 can be reduced.

Example of Projection display Using Polarization Luminaire of Embodiment 14

Figure 27:
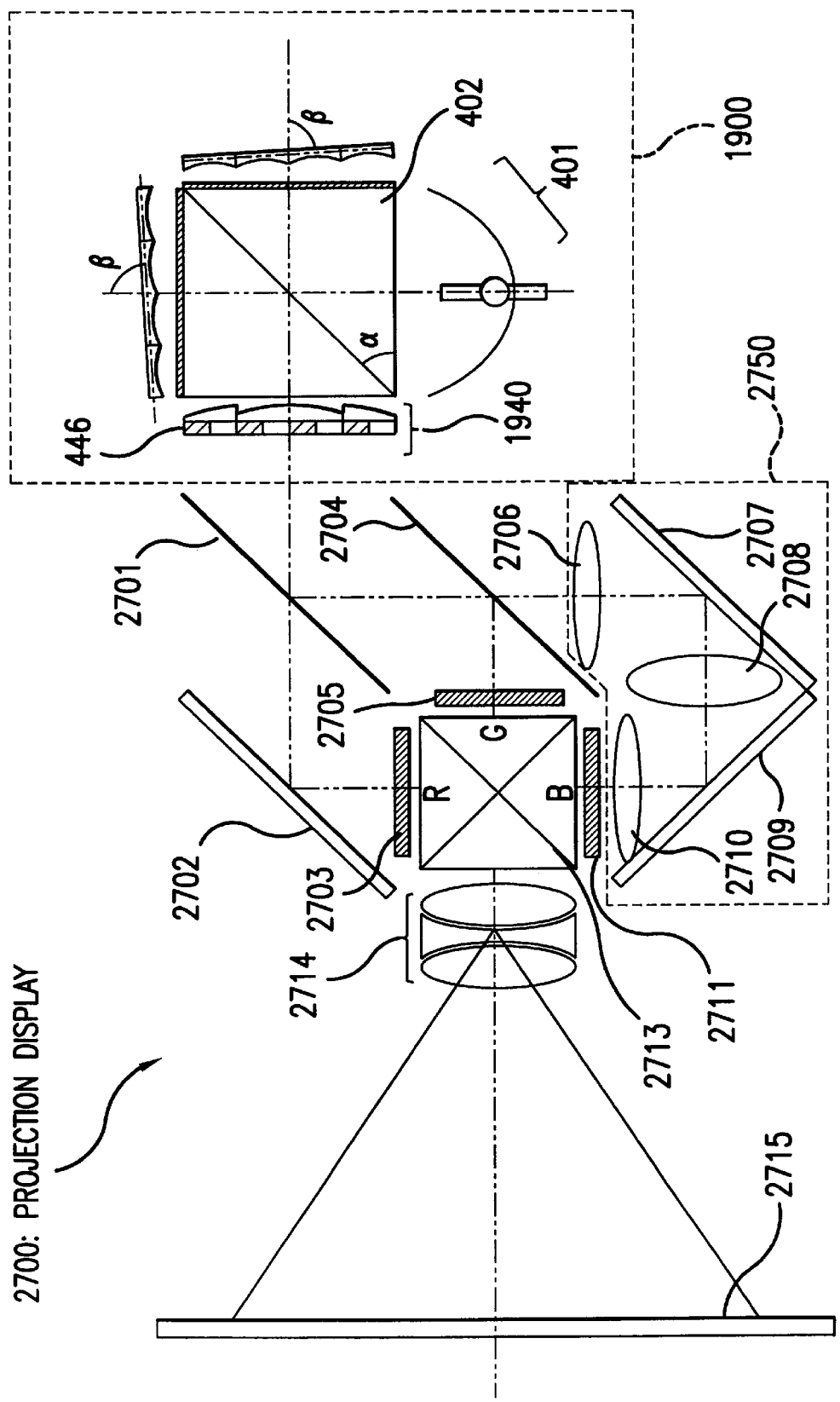
FIG. 27 is a schematic diagram for schematically illustrating an optical system of an example of a projection display provided with the polarization luminaire illustrated in FIG. 19.

FIG. 27 illustrates an example of the projection display which increases the brightness of an image by using the polarization luminaire of Embodiment 14, among those of Embodiment 14 to Embodiment 21.

As shown in FIG. 27, a projection display 2700 of this example is provided with the light source portion 401 for radiating randomly-polarized lights in a single direction. In the polarized light splitting portion 402, a randomly-polarized light radiated from this light source portion 401 is separated into two kinds of polarized lights. Between the two kinds of polarized lights, an s-polarized light is converted by the half-wave plate 446 of the condenser lens portion 1940 into a p-polarized light.

Among a flux of lights radiated from such a polarization luminaire 1900, red rays are transmitted by and blue and green rays are reflected by the blue-and-green reflection dichroic mirror 2701. Then, the red rays are reflected by a reflection mirror 2702 and thus reaches a first liquid crystal light valve 2703. On the other hand, between the blue and green rays, the green rays are reflected by a green reflection dichroic mirror 2704 and thus reaches a second liquid crystal light valve 2705.

Here, note that blue light has optical path length longer than that of the other two colors (incidentally, the optical path length of red light is equal to that of green light). Thus, a light guiding means 2750 constituted by a relay lens system comprising an entrance side lens 2706, a relay lens 2708 and an exit side lens 2710 is provided for blue rays. Namely, after transmitted by a green reflection dichroic mirror 2704, the blue light is first led to the relay lens 2708 through the lens 2706 and by way of a reflection mirror 2707. Then, after converged into this relay lens 2708, the blue light is led to the exit side lens 2710 by way of a reflection mirror 2709. Thereafter, the blue light reaches a third liquid crystal light valve 2711. Hereat, the first to third liquid crystal light valves 2703, 2705 and 2711 modulate corresponding color rays. Subsequently, the modulated color rays are made to be incident on a dichroic prism (namely, a color synthesis means) 2713. The dichroic prism 2713 has a red reflection dielectric multi-layer film and a blue reflection dielectric multi-layer film that are arranged crosswise therein and synthesize bundles of modulated rays of such colors, respectively. The bundles of rays synthesized therein pass through a projection lens 2714 (namely, a projection means) and come to form images on a screen 2715.

The projection display 2700 configured in this way uses liquid crystal light valves, each of which is a light valve of the type that modulates polarized light of a single kind. Thus, the projection display 2700 of this embodiment resolves substantial part of the problems of a conventional luminaire in that if randomly-polarized light is led to a liquid crystal light valve by using the conventional luminaire, half of the randomly-polarized light is absorbed by a polarizing plate and is converted into heat and thus the efficiency in utilizing the light is low and in that a large cooling device which makes a great deal of noise for controlling heat emitted from the polarizing plate is needed.

Namely, in the case of the projection display 2700 of this embodiment, the rotatory polarization is exerted only on one of the two kinds of polarized light (for instance, s-polarized light) by the half-wave plate 446 in the polarization luminaire 1900 so that the plane of polarization thereof is made to extend in the same direction as in which the other kind of polarized light. Thus, the polarized lights, whose polarization directions are uniform, are led to the first to third liquid crystal light valves 2703, 2705 and 2711. Consequently, the efficiency in utilizing the light can be enhanced. Moreover, a bright projected image can be obtained. Further, the quantity of light absorbed by the polarizing plate (not shown) can be reduced. Thereby, a rise in temperature of the polarizing plate can be suppressed. Consequently, it is realized that a cooling device can be made small and its noise-can be reduced. Furthermore, in the polarization luminaire 1900, a thermally stable dielectric multi-layer is used as the polarized light splitting film. The ability of the polarized light splitting portion 402 to split polarized light is thermally stable. The polarized light splitting portion, therefore, exerts the stable polarized light splitting ability at all times even in the case of the projection display 2700 required to output a large quantity of light.

Besides, in the polarization luminaire 1900, the two kinds of polarized lights radiated from the polarized light splitting portion 402 are separated in the transverse direction. Thus, the region to be illuminated, whose shape is a laterally elongated rectangle, can be formed without wasting any quantity of light. Consequently, the polarization luminaire 1900 is suitable for a laterally-elongated liquid crystal light valve which can project an image which is easy to see and appeals strongly.

In addition, this embodiment uses a dichroic prism 2713 as the color synthesis means. Thus, the size of the device can be reduced. Moreover, the length of the optical path between the projection lens 2714 and each of the liquid crystal light valves 2703, 2705 and 2711 is short. Thus, in the case of the device of this embodiment, a bright projected image can be realized even if a projection lens having a relatively small diameter is used. Further, in the case of this embodiment, the light guiding means 2750 constituted by the relay lens system consisting of the entrance side lens 2706, the relay lens 2708 and the exit side lens 2710 is provided for blue rays. Consequently, irregularities in colors or the like do not occur in projected images.

Incidentally, needless to say, the luminaire of another embodiment may be used instead of the luminaire 1900.

Figure 28:
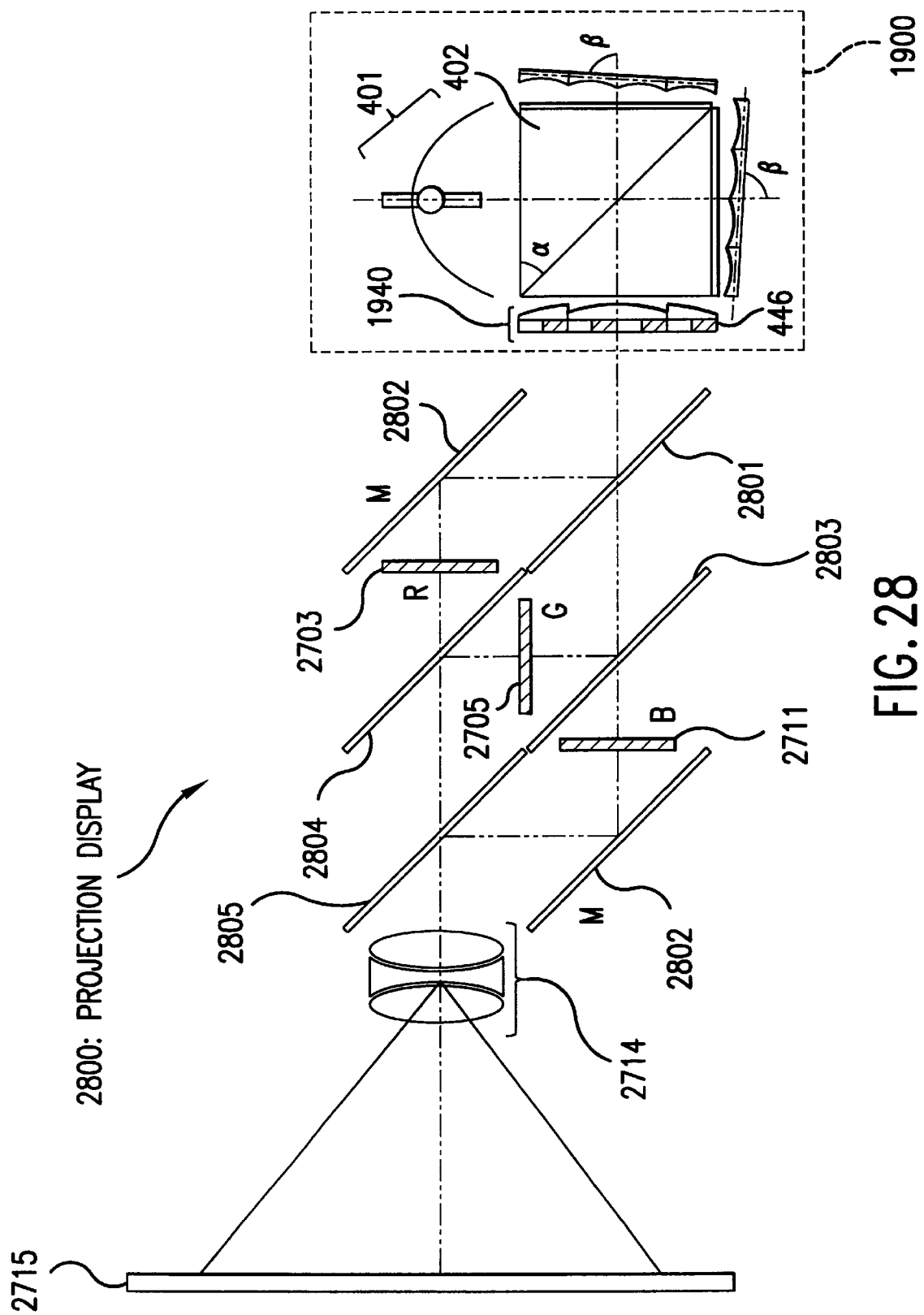
FIG. 28 is a schematic diagram for schematically illustrating an optical system of another example of a projection display of the polarization luminaire illustrated in FIG. 19.

In the projection display, the color synthesis means may be constituted by an optical system using mirrors as illustrated in FIG. 28. In the case that an optical system using mirrors is used in the color synthesis means, the three liquid crystal light valves 2703, 2705 and 2711 and the light source portion 401 have the same optical path length. Thus, the projection display is characterized in that even if no special light guiding means is used, this display device can achieve effective illumination, by which irregularities in brightness and color hardly occur in images.

Namely, a projection display 2800 illustrated in FIG. 28 employs the polarization luminaire 1900 illustrated in FIG. 19. In the polarized light splitting portion 402, a randomly-polarized light radiated from this light source portion 401 is separated into two kinds of polarized lights. Between the two kinds of polarized lights, an s-polarized light is converted by the half-wave plate 446 of the condenser lens portion 1940 into a p-polarized light.

Among a flux of lights radiated from such a polarization luminaire 1900, first, red rays are reflected by and blue and green rays are transmitted by a red reflection dichroic mirror 2801. Then, the red rays are reflected by a reflection mirror 2802 and thus reach a first liquid crystal light valve 2703. On the other hand, between the blue and green rays, the green rays are reflected by a green reflection dichroic mirror 2803 and thus reach a second liquid crystal light valve 2705. After transmitted by the green reflection dichroic mirror 2804, the blue rays reach a third liquid crystal light valve 2711. Thereafter, the first to third liquid crystal light valves 2703, 2705 and 2711 modulate corresponding color rays and causes the color rays to contain corresponding image information. Subsequently, the first to third liquid crystal light valves 1707, 1708 and 1709 output the modulated color rays. Hereat, the red rays undergoing the color modulation is transmitted by the green reflection dichroic mirror 2804 and by the blue reflection dichroic mirror 2805 and then reach a projection lens 2714 (namely, the projection means). After reflected by the green reflection dichroic mirror 2804, the green rays undergoing the intensity modulation is transmitted by the blue reflection dichroic mirror 2805 and then reach the projection lens 2714. After reflected by the blue reflection dichroic mirror 2805, the blue rays undergoing the intensity modulation reach the projection lens 2714.

The projection display 2800, in which the color synthesis means is constituted by the optical system using mirrors comprising the dichroic mirrors in this way, uses liquid crystal light valves, each of which is a light valve of the type that modulates polarized light of a single kind. Thus, the projection display 2800 of this embodiment resolves substantial part of the problems of the conventional luminaire in that if randomly-polarized light is led to a liquid crystal light valve by using the conventional luminaire, half of the randomly-polarized light is absorbed by a polarizing plate and is converted into heat and thus the efficiency in utilizing the light is low and in that a large cooling device which makes a great deal of noise for controlling heat emitted from the polarizing plate is needed.

Namely, in the case of the projection display 2800 of this embodiment, the rotatory polarization is exerted only on one of the two kinds of polarized light (for instance, s-polarized light) by the half-wave plate 44G in the polarization luminaire 1900 so that the plane of polarization thereof is made to extend in the same direction as in which the other kind of polarized light (for example, p-polarized light). Thus, the polarized lights, whose polarization directions are uniform, are led to the first to third liquid crystal light valves 2703, 2705 and 2711. Consequently, the efficiency in utilizing the light can be enhanced. Moreover, a bright projected image can be obtained. Further, the quantity of light absorbed by the polarizing plate (not shown) can be reduced. Thereby, a rise in temperature of the polarizing plate can be suppressed. Consequently, it is realized that a cooling device can- be made small and its noise can be reduced. Furthermore, in the polarization luminaire 1900, a thermally stable dielectric multi-layer film is used as the polarized light splitting film. The ability of the polarized light splitting portion 402 to split polarized light is thermally stable. The polarized light splitting portion, therefore, exerts the stable polarized light splitting ability at all times even in the case of the projection display 2800 required to output a large quantity of light.

Embodiment 22

Figure 29A:
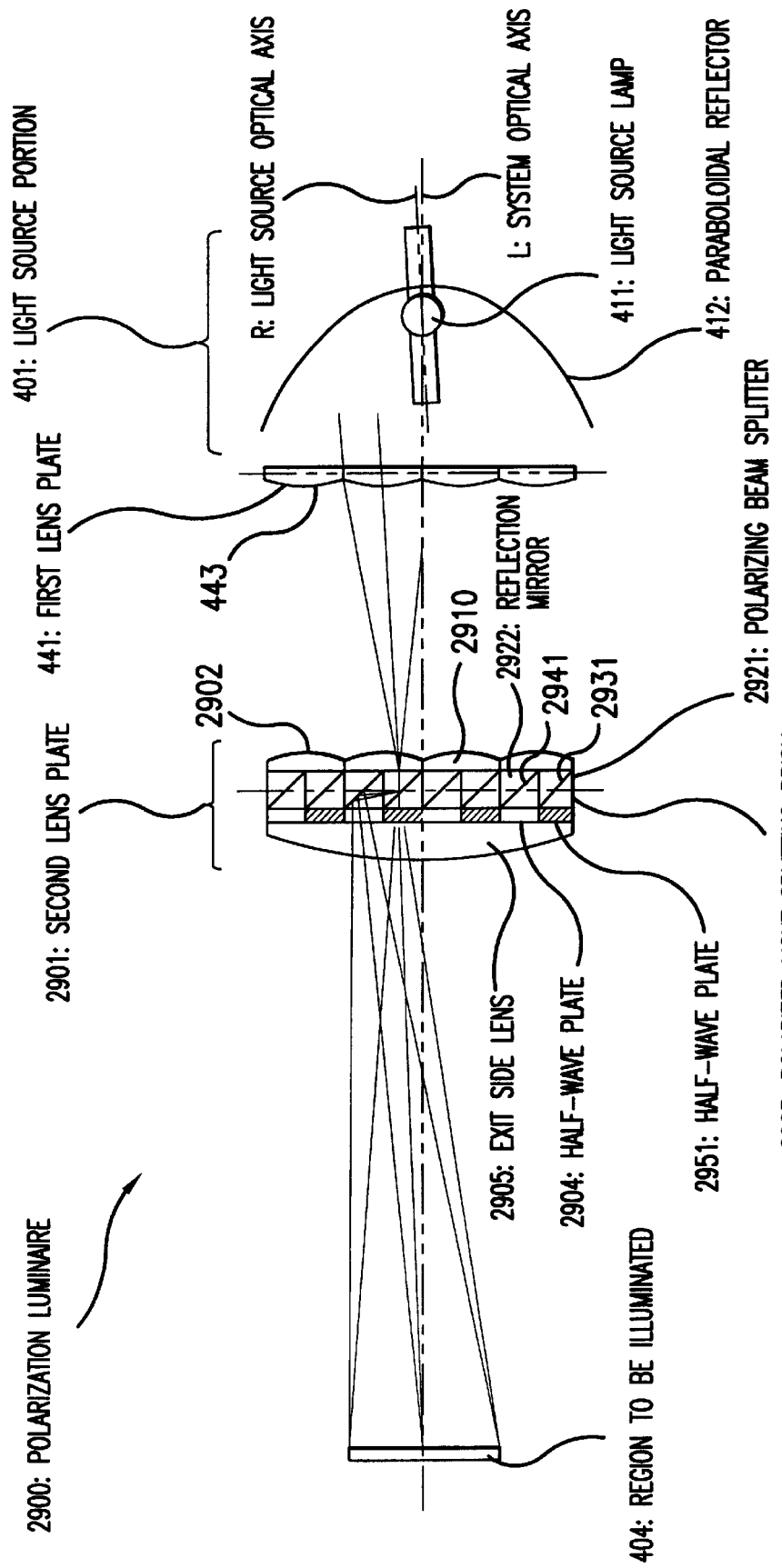
FIG. 29(A) is a schematic diagram for schematically illustrating the configuration of an optical system thereof.

FIG. 29 illustrates yet another example of the polarization luminaire of the present invention. The polarization luminaire 2900 of this embodiment is mostly composed of a light source portion 401, a first lens plate 441 and a second lens plate 2901, which are placed along the system optical axis L. A flux of lights radiated from the light source portion 401 are converged by the first lens plate 441 and then reach to the second lens plate 2901. During passing through the second lens plate 2901, the randomly-polarized lights are converted into polarized lights of a single kind, whose polarization directions are uniform. Then, the polarized lights of this single kind reach the rectangular region 404 to be illuminated.

The light source portion 401 is mostly composed of a light source lamp 411 and a paraboloidal reflector 412. Randomly-polarized lights, which are radiated from the light source lamp 411, are reflected by the paraboloidal reflector 412 in a single direction and thus become a nearly parallel luminous flux that is then incident on the first lens plate 441. Here, note that an ellipsoidal reflector or a spherical reflector may be used in place of the paraboloidal reflector 412.

The first lens plate 441 comprises a plurality of micro-condensing-lenses 443 disposed therein, each of which has a rectangular outside shape. Convergent light images, the number of which is equal to that of the micro-condensinglenses 443, are formed from flux of lights which is incident on the first lens plate 441, in a plane which is perpendicular to the system optical axis L, by the condensing action of the micro-condensing-lenses 443. The plurality of convergent light images are nothing else but projected images of the light source lamp. Thus, hereunder, the convergent light images will be referred to as secondary light source images.

The second lens plate 2901 of this embodiment is different from the second lens plate of each of the aforementioned embodiments and is a composite layered element comprising a condenser lens array 2902, a polarized light splitting prism array 2903, a half-wave plate 2904 and an exit side lens 2905. The second lens plate 2901 of this embodiment is placed in a plane, which is perpendicular to the system optical axis L, in the vicinity of a place at which a secondary light source image is formed by the first lens plate 441. This second lens plate 2901 has the functions as of the second lens plate of the system of the optical integrator, as of the polarized light splitting element and as of the polarized light conversion element.

The condenser lens array 2902 has a configuration similar to that of the first lens plate 441. Namely, the condenser lens array 2902 comprises a plurality of condenser lenses 2910 disposed therein, the number of which is equal to that of the micro-condensing-lenses composing the first lens plate 441. The condenser lens array 2902 is operative to condense light outputted from the first lens plate 441. Here, note that each of the micro-condensing-lenses 443 composing the first lens plate 441 does not necessarily have the same size, shape and lens characteristics as of each of the condenser lenses 2910 composing the condenser lens array 2902. It is preferable that each of the micro-condensing-lenses 443 and the condenser lenses 2910 is optimized according to the characteristics of light emitted from the light source portion 401. It is, however, ideal that the principal one of rays entering the polarized light prism array 2903 is parallel with the system optical axis L. From this point of view, it is frequent that a lens having the same lens characteristics as of the micro-condensing-lens 443 of the first lens plate 441 or a lens, which has a shape similar to that of the micro-condensing-lens 443 and the same lens characteristics as of the micro-condensing-lens 443, is employed as the condenser lens 2910. Thus, the condenser lens array 2902 corresponds to the second lens plate of the system of the optical integrator.

Figure 29B:
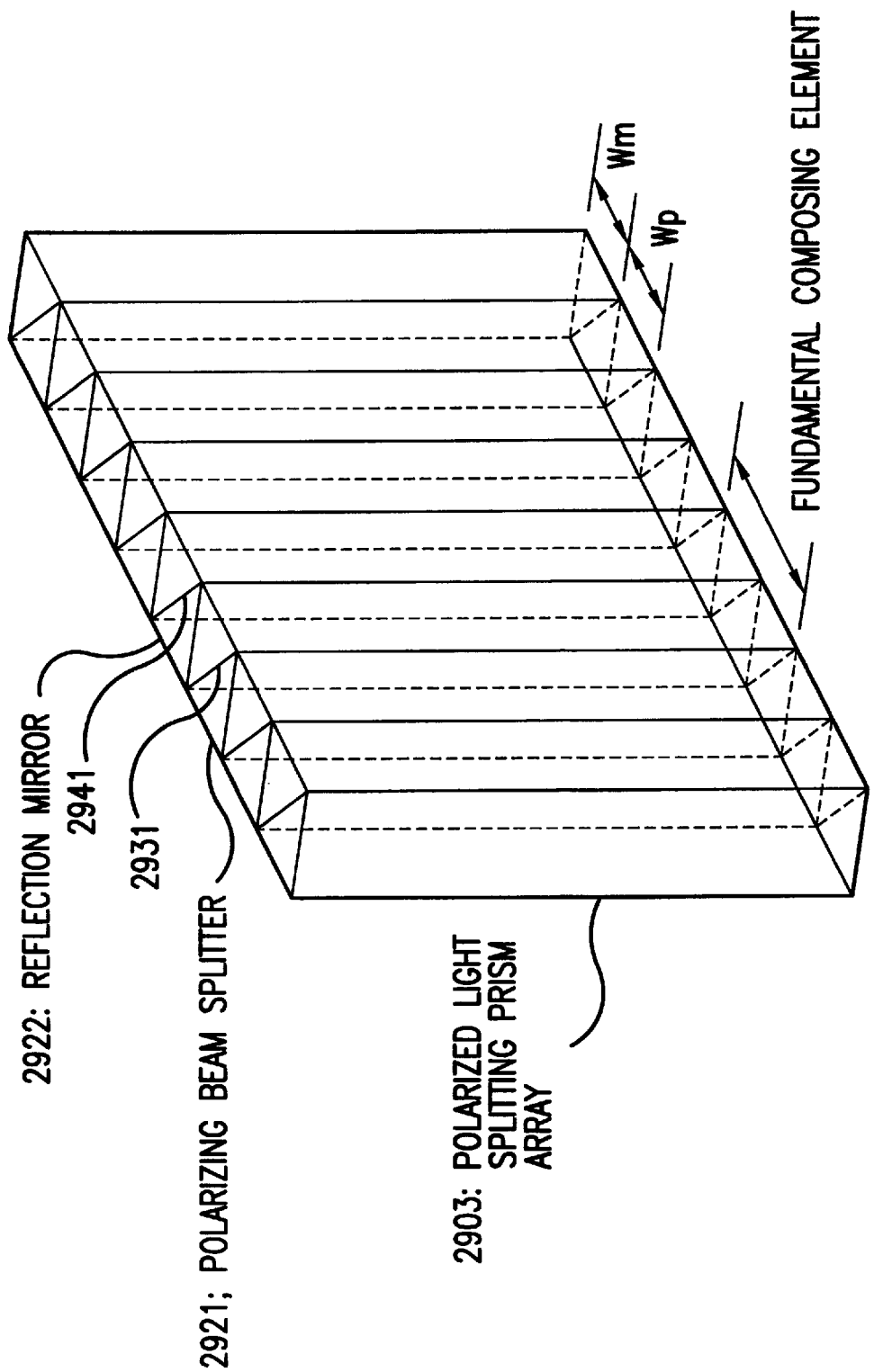
FIG. 29(B) is a diagram for illustrating the configuration of a polarized light splitting portion thereof.

The polarized light splitting prism array 2903, whose external view is illustrated in FIG. 29(B), has a pair of a square-pole-like polarizing beam splitter 2921 and a square-pole-like reflection mirror 2922 as a fundamental composing element. A plurality of such pairs are disposed in a plane (in which secondary light source images are formed) in the polarized light splitting prism array 2903 with regularity in such a manner that a pair of fundamental composing elements correspond to the condenser lens 2910 of the condenser lens array 2902. Further, the width Wp of one of the polarizing beam splitters 2921 is equal to the width Wm of one of the reflection mirrors 2922. Moreover, Wp and Wm are set at half of the width of one of the condenser lenses 2910 composing the condenser lens array 2902.

Here, the second lens plate 2901 including the polarized light prism array 2903 is placed in such a way that secondary light source images are formed in the polarizing beam splitter 2921 by the first lens plate 441. Thus, the light source portion 401 is disposed in such a manner that the light source optical axis R thereof is slightly inclined at a small angle.

Randomly-polarized light having been incident on the polarized light prism array 2921 is separated by the polarizing beam splitter 2921 into two kinds of polarized lights having different polarization directions, namely, the p-polarized lights and the s-polarized lights. Namely, the p-polarized light passes through the polarizing beam splitter without changing the traveling direction thereof. In contrast, the s-polarized light is reflected on the polarized light splitting surface 2931 of the polarizing beam splitter 2921, so that the traveling direction, in which the s-polarized light travels, is turned about 90 degrees. Then, the s-polarized light is reflected again on the reflection surface 2941 of the adjacent reflection mirror 2922 (of the pair), so that the traveling direction, in which the s-polarized light travels, is turned about 90 degrees. Finally, the s-polarized light goes out from the polarized light splitting prism array 2903 in such a manner as to be nearly in parallel with the p-polarized light.

The half-wave plate 2904, in which $\lambda/2$ retardation films 2951 are placed with regularity, is disposed on the exit surface of the polarized light splitting prism array 2903. Namely, the $\lambda/2$ retardation films 2951 are placed only in the exit surface portions of the polarizing beam splitters 2921 composing the polarized light splitting prism array 2903. However, the $\lambda/2$ retardation films 2951 are not placed in the exit surface portion of the reflection mirrors 2922. With such placement of the $\lambda/2$ retardation film 2951, the p-polarized light radiated from the polarizing beam splitter 2921 undergoes a rotatory polarization when passing through the $\lambda/2$ retardation film 2951, so that the p-polarized light is converted into s-polarized light. On the other hand, the s-polarized light reflected from the reflection mirror 2922 does not pass through the $\lambda/2$ retardation film 2951 and thus passes through the half-wave plate 2904 without undergoing the rotatory polarization. In summary, randomly-polarized light are converted by the polarized light splitting prism array 2903 and the half-wave plate 2904 into polarized light of a single kind (in this case, s-polarized light).

The flux of lights, which have been made to be s-polarized light, are led by the exit side lens 2905 to the region 404 to be illuminated. Further, images are formed from the s-polarized light and are superposed on the region 404 to be illuminated. Namely, images of image planes extracted by the first lens plate 441 are formed by the second lens plate 2901 in such a manner as to be superposed thereon. Simultaneously, the randomly-polarized light is spatially separated by the polarized light splitting prism array 2903 placed at a midpoint into two kinds of polarized lights. When passing through the half-wave plate 2904, the lights are converted into polarized lights of a single kind. Thus most of the lights reach the region 404 to be illuminated. Consequently, the region 404 to be illuminated is almost uniformly illuminated with the polarized lights, most of which are of the single kind.

As above described, in the case of the polarization luminaire 2900 of this embodiment, a randomly-polarized light radiated from the light source portion 401 is converged by the first lens plate 441 into predetermined micro-regions of the polarized light splitting prism array 2903 and is then spatially separated into two kinds of polarized lights, whose polarization directions are different from each other. Thereafter, each of the two kinds of polarized lights is led to a predetermined region of the half-wave plate 2904, whereupon a p-polarized light is converted into an s-polarized light. Thus, this embodiment exerts the effects in that the randomly-polarized lights radiated from the light source portion 401 can be applied to the region 404 to be illuminated, while most of the polarized lights are in a state in which these beams are made to be s-polarized lights. Moreover, in the process of converting the polarized light, the loss of light hardly occurs. Consequently, this embodiment has a characteristic feature in that the efficiency in utilizing light outputted from the light source is extremely high.

Further, in the case of this embodiment, in accordance with the shape of the region 404 to be illuminated, which is a laterally elongated rectangle, the micro-condensing-mirrors 443 of the first lens plate 441 are in the shape of a laterally elongated rectangle. Simultaneously, the two kinds of polarized lights radiated from the polarized light prism array 2903 are separated in the transverse direction. Thus, even in the case that the illumination region 404 to be illuminated, whose shape is a laterally elongated rectangle, is formed, the illumination efficiency can be increased without wasting a quantity of light.

Embodiment 23

In the case of Embodiment 22, the second lens plate 2901 including the polarized light prism array 2903 is placed in such a way that secondary light source images formed by the first lens plate 441 are placed in the polarizing beam splitter 2921. Thus, the light source portion 401 is required to be disposed in such a manner that the light source optical axis R thereof is slightly inclined at a small angle. However, the light source optical axis R can be made to coincide with the system optical axis L by providing the deviation prism in the luminaire. Consequently, the light source portion can be disposed therein without being inclined.

Figure 30:
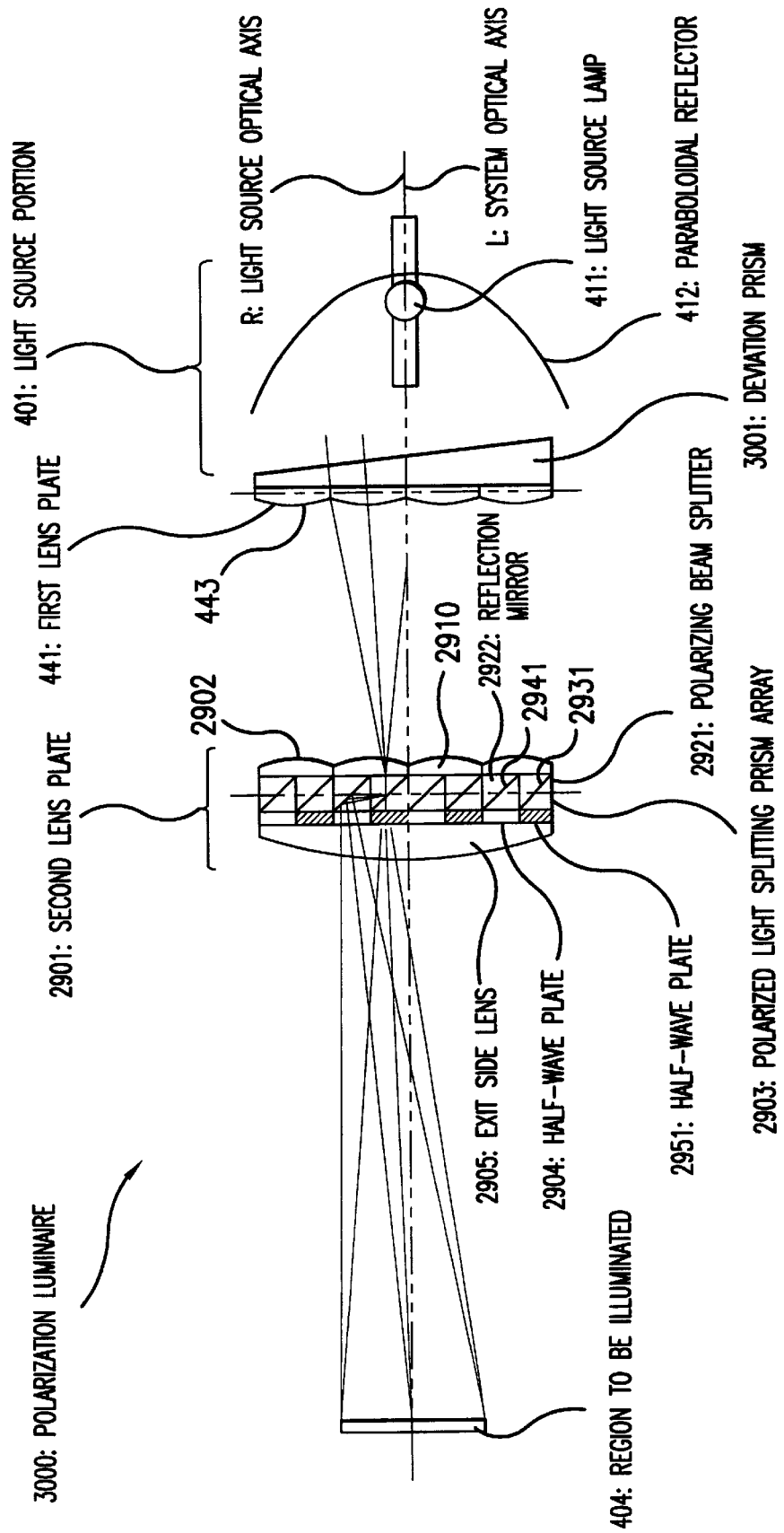
FIG. 30 is a schematic diagram for schematically illustrating an optical system of an example of the modification of a polarization luminaire embodying the present invention, namely, the modification of Embodiment 23 of the present invention.

Namely, the luminaire of the present invention may be configured as a polarization luminaire 3000 of Embodiment 23 illustrated in FIG. 30. In the case of the polarization luminaire 3000 of Embodiment 23 illustrated in FIG. 30, a deviation prism 3001 is placed between the light source 401 and the first lens plate 441. When a ray radiated from the light source portion 401 is incident on the deviation prism 3001, the traveling direction, in which the ray travels, is slightly turned by the deviation prism. Thus, the ray is then incident on the first lens plate 441 at an angle which is not a right angle. Thereafter, the ray reaches a predetermined position in the polarizing beam splitter 2921.

Namely, a place, at which a secondary image is formed by the first lens plate 441, can be arbitrarily set by providing the deviation prism 3001. Thus, the light source portion 401 can be disposed on the system optical axis L. Consequently, the optical system can be produced simply and easily.

Furthermore, the deviation prism 3001 can be formed in such a way as to be integral with the first lens plate 441. In such a case, the number of the interfaces between the deviation prism and the first lens plate 441 can be decreased. Consequently, light radiated from the light source 401 can be led to the second lens plate 2901 without any loss of the light.

Embodiment 24

The placement of the light source portion 401 on the system optical axis L can be realized by a method of using a decentered lens as the micro-condensing-lenses composing the first lens plate 441, other than the method employed in Embodiment 23 which has been previously described. A practical example of this is illustrated in FIG. 31 as the polarization luminaire 3100, namely, Embodiment 24.

Figure 31:
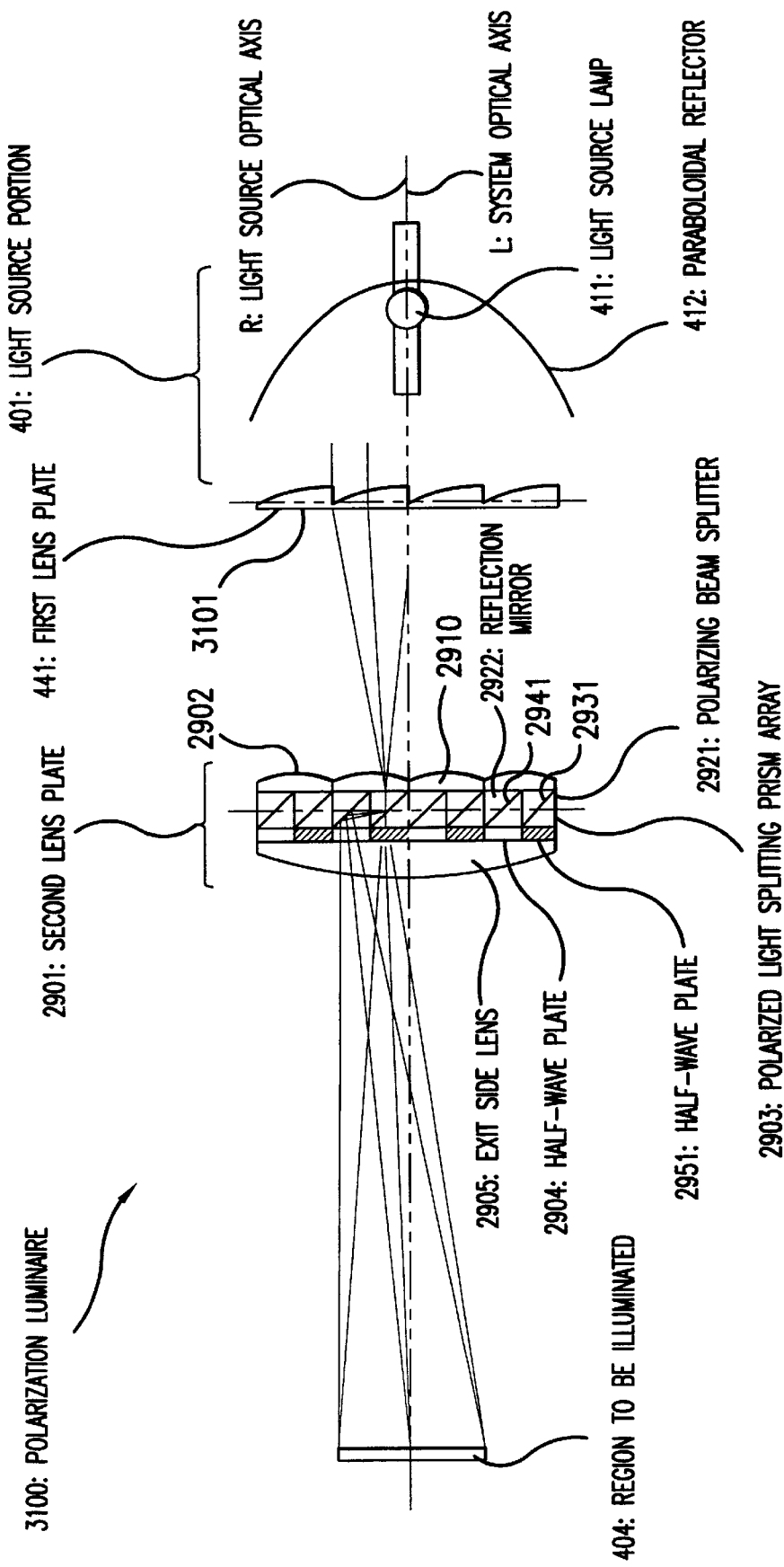
FIG. 31 is a schematic diagram for schematically illustrating an optical system of a polarization luminaire embodying the present invention, namely, Embodiment 24 of the present invention.

As illustrated in FIG. 31, in the case of the luminaire 3100 of this embodiment, the first lens plate 441 is constituted by the decentered micro-condensing-lenses 3101. The principal ray of a flux of lights radiated from the first lens plate 441 is slightly inclined in such a manner that a secondary light source image is formed at a predetermined place in the polarizing beam splitter 2921. Thus, the light source portion 401 can be placed on the system optical axis L.

Consequently, the manufacture of optical systems can be simplified and facilitated.

Embodiment 25

Any of the second lens plates 2901 used in the aforementioned Embodiment 22 to Embodiment 24 has the condenser lens array 2902 and the exit side lens 2905. As to rays entering the polarized light prism array 2903, it is ideal that the principal ray is parallel to the system optical axis L. Most of the condenser lens arrays 2902 are constituted by using lenses that are the same as the micro-condensing-lenses 443 composing the first lens plate 441. Further, the exit side lens 2905 is necessary for forming an image on the predetermined illumination region 404 from a flux of lights passing through different positions on the second lens plate 2901, which are away from the system optical axis L, in such a way as to be superposed thereon.

The exit side lens 2905, however, can be omitted by using a decentered lens as the condenser lens array 2902 and by regulating an installation angle of the reflection surface 2941 of the reflection mirror 2922. A practical example is illustrated in FIG. 32 as a polarization luminaire of Embodiment 25.

Figure 32:
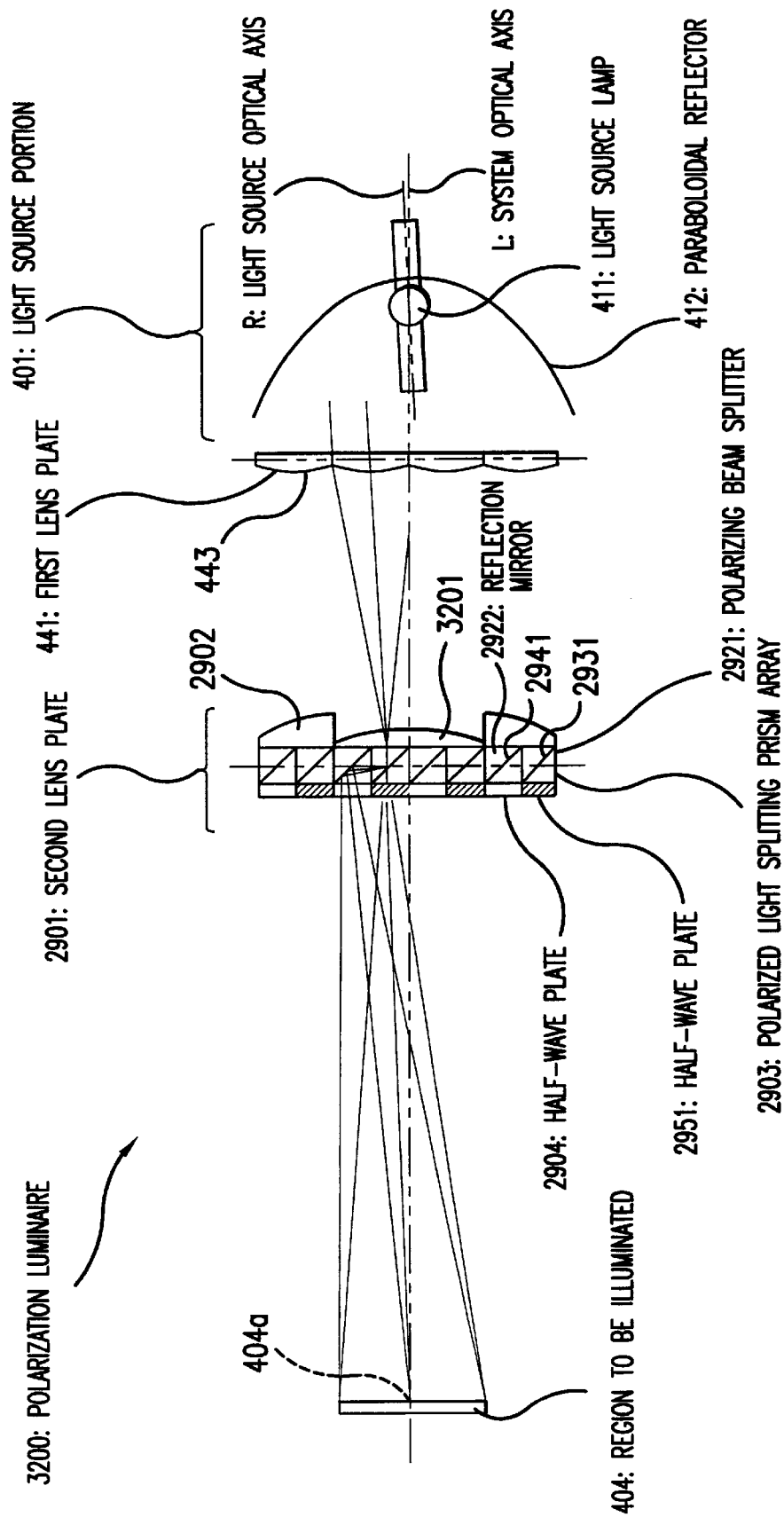
FIG. 32 is a schematic diagram for schematically illustrating an optical system of a polarization luminaire embodying the present invention, namely, Embodiment 25 of the present invention.

As shown in FIG. 32, the condenser lens array 2902 is constructed by using the decentered condenser lens 3202. Thus, in the condenser lens array 2902, the principal ray of the p-polarized light passing through the polarizing beam splitter 2921 can be directed to the center 404*a* of the region to be illuminated. This embodiment can deal with bundles of rays passing through the polarizing beam splitter 2921, which are placed away from the system optical axis L, by increasing the amount of eccentricity of the decentered condenser lens 3201.

On the other hand, the principal ray of the s-polarized lights, which goes out through the polarizing beam splitter 2921 and the reflection mirror 2922, can be directed to the center 404*a* of the illumination region by setting the installation angle of the reflection surface 2941 of the reflection mirror 2922 at a suitable value. Needless to say, in this case, it is necessary to individually optimize the installation angle of the reflection surface according to the distance thereof from the system optical axis L.

With the aforementioned configuration, the exit side lens 2905 becomes unnecessary. Thus, the cost of the optical system can be reduced.

Further, in the case of employing a configuration which does not use an exit side lens similarly as in the case of this embodiment, the place at which the condenser lens array 2902 is not limited to the light source side of the polarized light splitting prism array 2903. Moreover, the condenser lens array 2902 can be placed on the region-to-be-illuminated side of the polarized light splitting prism array 2903, in the case of employing some lens characteristics of the decentered condenser lenses 3201 composing the condenser lens array 2902 and some installation angles of the polarized light splitting surface 2931 and the reflection angle 2941 of the polarized light splitting prism array 2903.

Embodiment 26

In any of the aforementioned Embodiment 22 to Embodiment 25, the light source portion 401 and the first lens plate 441 are placed on the system optical axis L. Secondary light source images are formed at predetermined positions in the polarizing beam splitter 2921 by regulating the orientation of the light source portion 401 or the lens characteristics of the first lens plate 441. In contrast, if shifting both of the light source portion 401 and the first lens plate 441 in parallel with the system optical axis, similar advantages can be obtained.

Moreover, turning attention to the lateral size (namely, the width) of each of the condenser lenses 2910 composing the condenser lens array 2902 of the second lens plate 2901, as is understood from the fact that secondary light source images are always formed only on the polarizing beam splitter 2921, the condenser lens 2910 satisfactorily functions if the width thereof is equal to the width Wp of the polarizing beam splitter 2921.

Figure 33:
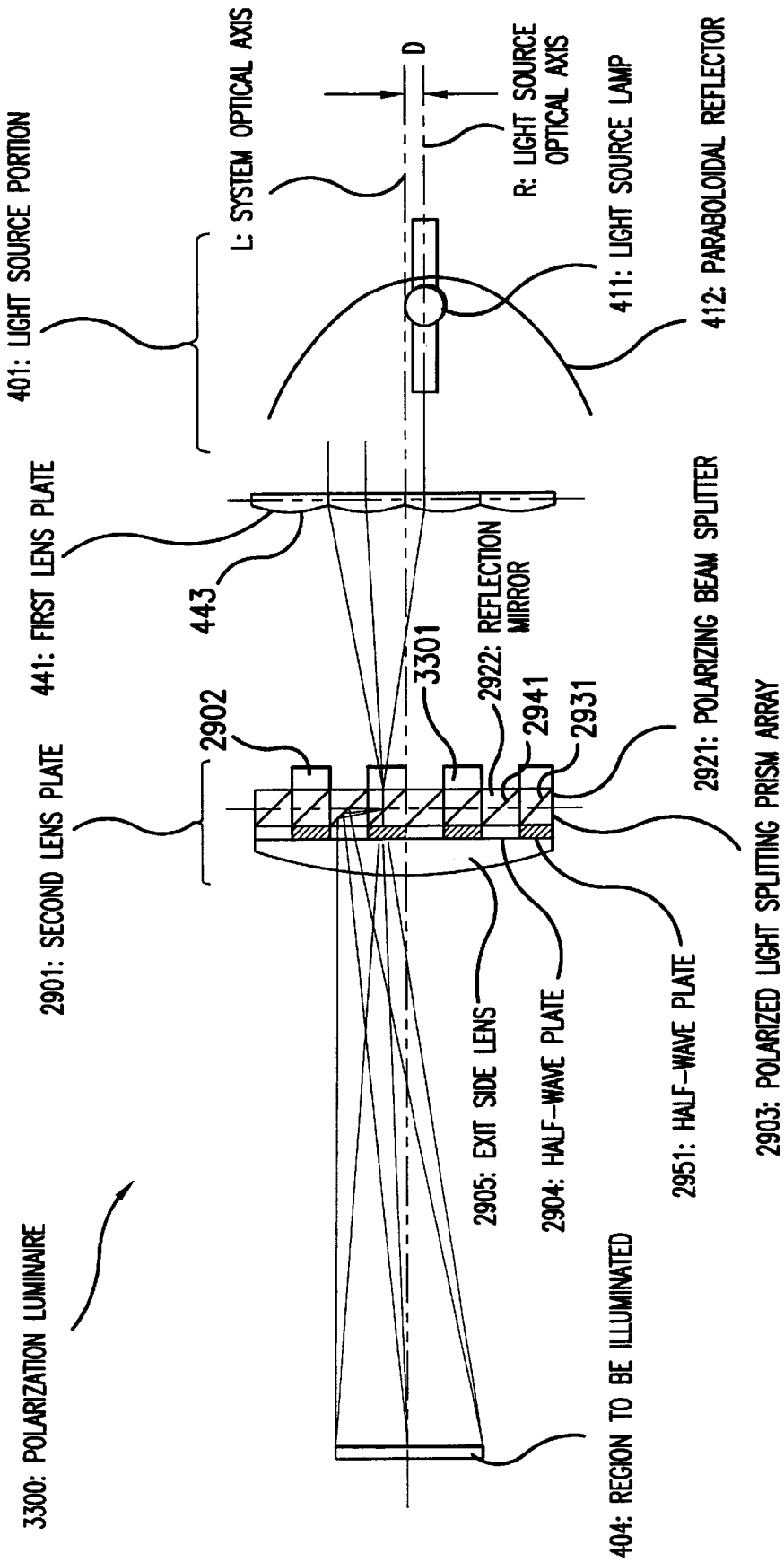
FIG. 33 is a schematic diagram for schematically illustrating an optical system of a polarization luminaire embodying the present invention, namely, Embodiment 26 of the present invention.

A practical example of this is illustrated in FIG. 33 as the polarization luminaire 3300 of Embodiment 26. In the case of this embodiment, the light source portion 401 and the first lens plate 441 are placed by being shifted in parallel with each other with respect to the system optical axis L in the direction (namely, the downward direction as viewed in this figure), in which the polarizing beam splitter 2921 is provided in the polarized light splitting prism array 2903, by a shifted distance (=D) corresponding to a half of the width Wp of the polarizing beam splitter 43. Furthermore, the condenser lens array 2902 of the second lens plate 2901 is constructed by using and placing condensing semi-transparent lenses 3301, each of which has a lens width (namely, a lateral width) equal to the width Wp of the polarizing beam splitter 292, correspondingly to the places at which the polarizing beam splitter is mounted.

With the aforementioned configuration, the designing of the optical system can be facilitated. Further, the cost of the optical system can be reduced.

Projection display Using Luminaire of Embodiment 24

Figure 34:
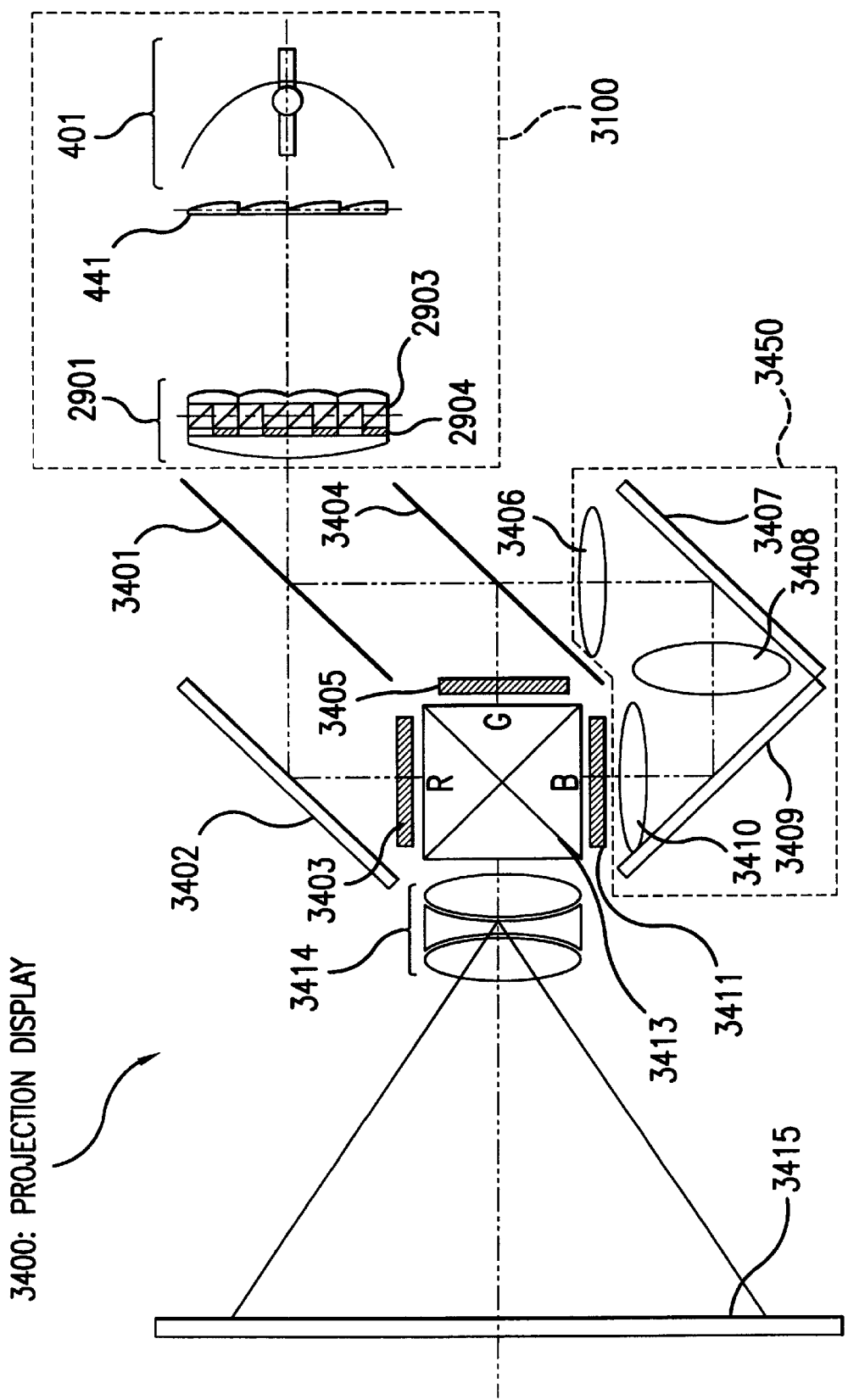
FIG. 34 is a schematic diagram for schematically illustrating an optical system of an example of a projection display provided with the polarization luminaire illustrated in FIG. 31.

FIG. 34 illustrates an example of a projection display using the polarization luminaire 3100 illustrated in FIG. 31, among the luminaires of Embodiment 23 to Embodiment 26.

As shown in FIG. 34, the light source portion 401 for radiating randomly-polarized light in a single direction is provided in the polarization luminaire 3100 of a device 3400 of this embodiment. A randomly-polarized light, which is radiated from this light source portion 401 and is condensed by the first lens plate 441, is led to a predetermined position in the second lens plate 2901. Thereafter, the randomly-polarized light is separated by the polarized light prism array 2903 of he second lens plate 2901 into two kinds of polarized lights. Between the two kinds of polarized lights, a p-polarized light is converted by the half-wave plate 2904 into an s-polarized light.

Among flux of lights radiated from this polarization luminaire 3100, first, a red rays are reflected by and blue and green rays are transmitted by a blue-and-green reflection dichroic mirror 3401. The red rays are reflected by a reflection mirror 3402 and subsequently, reach a first liquid crystal light valve 3403. On the other hand, between the blue and green rays, the green rays are reflected by a green reflection dichroic mirror 3404 and thus reach a second liquid crystal light valve 3405.

Here, note that blue rays have optical path length longer than that of any other two color rays. Thus, a light guiding means 3450 constituted by a relay lens system comprising an entrance side lens 3406, a relay lens 3408 and an exit side lens 3410 is provided for blue rays. Namely, after transmitted by a green reflection dichroic mirror 3404, the blue rays are first led to the relay lens 3408 through the lens 3406 and by way of a reflection mirror 3407. Then, after converged into this relay lens 3408, the blue rays are led to the exit side lens 3410 by way of a reflection mirror 3409. Thereafter, the blue rays reach a third liquid crystal light valve 3411. Hereat, the first to third liquid crystal light valves 3403, 3405 and 3411 modulate corresponding color rays and cause the color rays to contain corresponding image information. Subsequently, the modulated color rays are made to be incident on a dichroic prism (namely, a color synthesis means) 3413. The dichroic prism 3413 has a red reflection dielectric multi-layer film and a blue reflection dielectric multi-layer film that are arranged crosswise therein and synthesize bundles of modulated rays of such colors, respectively. The bundles of rays synthesized therein pass through a projection lens 3414 (namely, a projection means) and come to form images on a screen 3415.

The projection display 3400 configured in this way uses liquid crystal light valves, each of which is a light valve of the type that modulates polarized light of a single kind. Thus, the projection display 3400 of this embodiment resolves substantial part of the problems of a conventional luminaire in that if randomly-polarized light is led to a liquid crystal light valve by using the conventional luminaires -half of the randomly-polarized light is absorbed by a polarizing plate and is converted into heat and thus the efficiency in utilizing the light is low and in that a large cooling device which makes a great deal of noise for controlling heat emitted from the polarizing plate is needed.

Namely, in the case of the projection display 3400 of this embodiment, the rotatory polarization is exerted only on one of the two kinds of polarized light, for instance, p-polarized light by the half-wave plate 2904 in the polarization luminaire 3100 so that the plane of polarization thereof is made to extend in the same direction as in which the other kind of polarized light. Thus, the polarized lights, whose polarization directions are uniform, are led to the first to third liquid crystal light valves 3403, 3405 and 3411. Consequently, the efficiency in utilizing the light can be enhanced. Moreover, a bright projected image can be obtained. Further, the quantity of light absorbed by the polarizing plate (not shown) can be reduced. Thereby, a rise in temperature of the polarizing plate can be suppressed. Consequently, it is realized that a cooling device can be made small and its noise can be reduced.

Furthermore, in the polarization luminaire 3100, the two kinds of polarized lights are separated in the transverse direction by the second lens plate 2901 in accordance with the shape of the condenser lens 2911. Thus, the region to be illuminated, whose shape is a laterally elongated rectangle, can be formed without wasting any quantity of light. Consequently, the polarization luminaire 3100 is suitable for a laterally-elongated liquid crystal light valve which can project an image which is easy to see and appeals strongly.

As stated in the description of the aforementioned Embodiment 22, the polarization luminaire of this embodiment restrains the divergence of a flux of lights radiated from the polarization conversion prism array 2903 in spite of the fact that the polarization conversion optical elements are incorporated thereinto. This means that when illuminating the liquid crystal light valve, there is little light which is incident on the liquid crystal light valve at a large angle of incidence. Therefore, a bright projected image can be realized even if an extremely-large-diameter projection lens having a small F-number is not used.

In addition, this embodiment uses a dichroic prism 3413 as the color synthesis means. Thus, the size of the device can be reduced. Moreover, the length of the optical path between the projection lens 3414 and each of the liquid crystal light valves 3403, 3405 and 3411 is short. Thus, in the case of the device of this embodiment, a bright projected image can be realized even if a projection lens having a relatively small diameter is used. Further, in the case of this embodiment, the light guiding means 3450 constituted by the relay lens system comprising the entrance side lens 3406, the relay lens 3408 and the exit side lens 3410 is provided for blue rays.

Consequently, irregularities in colors or the like do not occur in projected images.

Incidentally, the projection display can be provided with an optical system using mirrors which uses three dichroic mirrors as the color synthesis means. Needless to say, in such a case, the polarization luminaire of this example can be incorporated into the projection display. Consequently, similarly as in the case of this example, a bright high-quality projected image can be formed with good efficiency in utilizing light.

Other Embodiments

Incidentally, in the case of most of the aforementioned embodiments, for example, the p-polarized light is converted into the s-polarized light in the polarized light conversion means. Needless to say, the uniform polarization direction, which the polarized lights should have, may be either of the two polarization directions of the s-polarized light and the p-polarized light. Further, the planes of polarization of the polarized lights may be made to extend in the same direction by exerting the rotatory polarization on both of the p-polarized light and the s-polarized light through the retardation layers.

On the other hand, in the case of each of the aforementioned embodiments, it is assumed that the half-wave plate and the quarter-wave plate are retardation films made of ordinary high-polymer films. These retardation films, however, may be made of twisted nematic liquid crystals (namely, TN liquid crystals). In the case of using TN liquid crystals, the dependence on wavelength of the retardation film can be lowered. Thus, in comparison with the case of using ordinary high-polymer films, the polarization conversion performance of the half-wave plate and the quarter-wave plate can be enhanced.

INDUSTRIAL APPLICABILITY

A polarization luminaire of the present invention having a system of the optical integrator is provided with polarized light splitting means for splitting a light radiated from a light source into two kinds of polarized lights whose polarization directions are perpendicular to each other and whose traveling directions are apart from each other by an angle of less than 90 degrees, and polarization conversion means for causing the two kinds of polarized lights to have the same polarization direction. Moreover, this polarization luminaire of the present invention employs a configuration in which the polarized light splitting means is placed on one of an entrance side and an exit side of a first lens plate of the system of the optical integrator, or is placed in a second lens plate.

Thus, in the case of the polarization luminaire of the present invention, polarized lights, whose polarization directions are uniform, can be applied to a region to be illuminated. Therefore, in the case of using the polarization luminaire of the present invention in a projection display which uses a liquid crystal light valve, polarized lights, whose planes of polarization extend in the same direction, can be supplied to the liquid crystal light valve. The efficiency in utilizing light is enhanced. Further, the brightness of a projected image can be enhanced. Moreover, the quantity of light absorbed by a polarizing plate is reduced, so that a rise in temperature of the polarizing plate is suppressed. Consequently, it is realized a cooling device can be made small and its noise can be reduced.

Furthermore, in accordance with the present invention, the spatial divergence of polarized lights due to the separation thereof is avoided by utilizing a process of generating micro-secondary light source images, which is a characteristic feature of the system of the optical integrator. Thus, the size of the luminaire of the present invention can be prevented from exceeding the sizes of conventional luminaires.

Furthermore, in the case that a prism beam splitter is used as the polarized light splitting means, the ability of a polarized light splitting portion to split polarized light is thermally stable, because a thermally stable dielectric multi-layer film is used as the polarized light splitting film. The polarized light splitting portion, therefore, exerts the stable polarized light splitting ability at all times even in the case of the projection display required to output a large quantity of light.

In the case of employing a configuration in which a prism beam splitter is placed on the entrance side of the first lens plate, the good separation characteristics for separating p-polarized light from s-polarized light can be obtained. This is because of the fact that the polarized light separating characteristics of a prism beam splitter depend on the angle of incidence of light and thus the polarized light separating characteristics thereof can be made to be more favorable and stable by causing rays, which have been made by a reflector to be nearly parallel rays, to entered the prism beam splitter.

Further, the size of the luminaire can be further reduced by employing a configuration in which the prism beam splitter is placed on the exit side of the first lens plate, because the gap between the first lens plate and the second lens plate can be narrowed.

What is claimed is:

1. A polarization luminaire comprising:
   a light source emitting light having random polarization directions: and an optical integrator, the optical integrator including:
   a first lens plate having a first plurality of lenses;
   a second lens plate having a second plurality of lenses the light emitted from the light source being projected through the first lens plate on an entrance plane of each of the second plurality of lenses of the second lens plate to form a secondary light source image therein an object being radiated with light emitted from the second lens plate, polarized light splitting means disposed on one of an entrance side and an exit side of the first lens plate of the optical integrator for splitting the light emitted from the light source into two kinds of polarized lights, polarization directions of the two kinds of the polarized lights being perpendicular to each other and traveling directions of the two kinds of polarized lights being separated by a first angle of less than 90 degrees; and
   polarization conversion means for modifying the polarization directions of the two kinds of polarized lights to have a same polarization direction, wherein the polarized light splitting means has an optical axis and comprises:
   a prism substrate;
   a glass substrate; and
   a liquid crystal layer sandwiched between the prism substrate and the glass substrate, wherein an interface between the liquid crystal layer and the prism substrate is formed as a multi-stage surface inclined at a second angle of less than 90 degrees relative to the optical axis, wherein the light emitted from the light source is split by the interface between the liquid crystal layer and the prism substrate into the two kinds of polarized lights.

2. A projector, comprising:
   a luminaire;

modulation means for modulating polarized light of a luminous flux outputted from the luminaire, the modulation means including a liquid crystal light valve that modulates the light based on image information; and a projection optical system that projects the modulated luminous flux onto a screen to display an image therein, wherein the luminaire includes:

a light source emitting a light having random polarization directions; and an optical integrator, the optical integrator including:

a first lens plate having a first plurality of lenses;

a second lens plate having a second plurality of lenses, the light emitted from the light source being projected through the first lens plate on a plane of incidence of each of the second plurality of lenses of the second lens plate to form a secondary light source image therein an object being radiated with light emitted from the second lens plate;

polarized light splitting means disposed on one of an entrance side and an exit side of the first lens plate of the optical integrator for splitting the light emitted from the light source into two kinds of polarized lights, polarization directions of the two kinds of polarized lights being perpendicular to each other and traveling directions of the two kinds of polarized lights being separated by a first angle of less than 90 degrees; and polarization conversion means for modifying the polarization directions of the two kinds of polarized lights to be the same, wherein the polarized light splitting means comprises:

a prism substrate;

a glass substrate; and a liquid crystal layer, the liquid crystal layer being sandwiched between the prism substrate and the glass substrate, wherein an interface between the liquid crystal layer and the prism substrate is formed as a multi-stage surface inclined at an angle of less than 90 degrees relative to an optical axis of the polarized light splitting means.

* * * * *